(12) United States Patent
Abbas et al.

(10) Patent No.: US 11,090,629 B2
(45) Date of Patent: Aug. 17, 2021

(54) SELENIUM NANOMATERIALS AND METHODS OF MAKING AND USING SAME

(71) Applicant: Regents of the University of Minnesota, Minneapolis, MN (US)

(72) Inventors: Abdennour Abbas, Saint Paul, MN (US); Snober Ahmed, North Saint Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 83 days.

(21) Appl. No.: 15/768,389

(22) PCT Filed: Oct. 13, 2016

(86) PCT No.: PCT/US2016/056850
§ 371 (c)(1),
(2) Date: Apr. 13, 2018

(87) PCT Pub. No.: WO2017/066453
PCT Pub. Date: Apr. 20, 2017

(65) Prior Publication Data
US 2019/0193048 A1    Jun. 27, 2019

Related U.S. Application Data

(60) Provisional application No. 62/240,764, filed on Oct. 13, 2015.

(51) Int. Cl.
| | |
|---|---|
| *B01J 27/057* | (2006.01) |
| *B01J 20/02* | (2006.01) |
| *A01N 59/02* | (2006.01) |
| *C02F 1/28* | (2006.01) |
| *B01J 20/28* | (2006.01) |
| *B01J 20/32* | (2006.01) |
| *C01B 19/02* | (2006.01) |
| *B01D 53/02* | (2006.01) |
| *C02F 101/20* | (2006.01) |
| *C02F 103/00* | (2006.01) |

(52) U.S. Cl.
CPC .......... *B01J 20/0262* (2013.01); *A01N 59/02* (2013.01); *B01D 53/02* (2013.01); *B01J 20/28007* (2013.01); *B01J 20/28045* (2013.01); *B01J 20/3204* (2013.01); *B01J 20/3206* (2013.01); *B01J 20/3212* (2013.01); *B01J 20/3234* (2013.01); *C01B 19/02* (2013.01); *C02F 1/281* (2013.01); *C02F 1/288* (2013.01); *B01D 2253/10* (2013.01); *B01D 2253/25* (2013.01); *B01D 2257/602* (2013.01); *C01P 2002/82* (2013.01); *C01P 2004/01* (2013.01); *C01P 2004/03* (2013.01); *C01P 2004/32* (2013.01); *C01P 2004/52* (2013.01); *C01P 2004/62* (2013.01); *C02F 2101/20* (2013.01); *C02F 2103/007* (2013.01); *C02F 2305/08* (2013.01); *Y02W 10/37* (2015.05)

(58) Field of Classification Search
CPC ................. B01J 20/3234; B01J 20/324; B01J 20/28007
See application file for complete search history.

(56) References Cited

U.S. PATENT DOCUMENTS

| | | | |
|---|---|---|---|
| 4,009,249 A | 2/1977 | Buckley | |
| 4,122,030 A | 10/1978 | Smith et al. | |
| 8,003,071 B2 | 8/2011 | Prokisch et al. | |
| 8,221,711 B1 | 7/2012 | Lee | |
| 8,445,026 B2 | 5/2013 | Gao et al. | |
| 8,491,865 B2 | 7/2013 | Hurt et al. | |
| 8,506,923 B2 | 8/2013 | Hurt et al. | |
| 8,747,676 B2 * | 6/2014 | Hughes | B01J 20/02 210/688 |
| 2011/0052463 A1 | 3/2011 | Hurt et al. | |
| 2011/0053766 A1 | 3/2011 | Hurt et al. | |
| 2012/0018384 A1 | 1/2012 | Sawyer | |
| 2013/0045149 A1 | 2/2013 | Miller | |

FOREIGN PATENT DOCUMENTS

| | | |
|---|---|---|
| CN | 100389058 C | 10/2005 |
| JP | 2009220102 A | 1/2009 |
| WO | WO 2009108220 A1 | 9/2009 |
| WO | WO 2011034791 A1 | 3/2011 |
| WO | WO 2013039479 A1 | 3/2013 |
| WO | WO 2017066453 A1 | 4/2017 |

OTHER PUBLICATIONS

International Search Report (ISR) and Written Opinion dated Feb. 13, 2017, International Patent Application No. PCT/US2016/056850 filed Oct. 13, 2016; 13 pages.
International Preliminary Report on Patentability (IPRP) dated Apr. 26, 2018, International Patent Application No. PCT/US2016/056850 filed Oct. 13, 2016; 8 pages.
"Mercury Removal Sponge, Technology #20150326" TechConnect World Innovation Conference, May 22-25, 2016.
"Selenium Nanoparticles Synthesis Technology #20150326-1" available on the World Wide Web at http://license.umn.edu/technologies/20150326-1_selenium-nanoparticles-synthesis; retrieved on Apr. 29, 2019; first available Feb. 15, 2016.
Abbas, "Sponge Technology to Remove Mercury from Wastewater/Surface Waters" Environmental and Natural Resources Trust Fund 2016 Request for Proposals (RFP), Proposal 41-B, Legislative-Citizen Commission on Minnesota Resources (LCCMR), available online at https://www.lccmr.leg.mn/proposals/2016/original/041-b.pdf. 6 pgs.

(Continued)

*Primary Examiner* — Stuart L Hendrickson
(74) *Attorney, Agent, or Firm* — Padda Law Group

(57) ABSTRACT

Selenium nanomaterials and methods of making and using selenium nanomaterials are disclosed herein. In some embodiments, the selenium nanomaterials can advantageously be used, for example, for removing mercury from air and/or water.

15 Claims, 40 Drawing Sheets

(56) References Cited

OTHER PUBLICATIONS

Abbas, "Autonomous Chemical Sensor for Water Toxicants Monitoring" Environmental and Natural Resources Trust Fund 2015 Request for Proposals (RFP), Proposal 46-B, Legislative-Citizen Commission on Minnesota Resources (LCCMR), available online at https://www.lccmr.leg.mn/proposals/2015/original/046-b.pdf. 6 pgs.
Abdelwahed, "Freeze-drying of nanoparticles: formulation, process and storage considerations" 2006 *Advanced Drug Delivery Reviews*, 58:1688-1713.
Ahmed, "Sponge-Supported Synthesis of Colloidal Selenium Nanospheres" Oct. 17, 2016 *Nanotechnology*, 27(46):465601. 11 pgs.
Ahmed, "A Nanoselenium Sponge for Instantaneous Mercury Removal to Undetectable Levels" 2017 *Adv Functional Matls.*, 1606572. 11 pgs.
Ahmed, "Sorbent Nanotechnologies for Water Cleaning" Dissertation, Jul. 2017.
Alkilany, "Colloidal stability of citrate and mercaptoacetic acid capped gold nanoparticles upon lyophilization: effect of capping ligand attachment and type of cryoprotectants" 2014 *Langmuir*, 30(46):13799-13808.
Atwood, "Mercury Removal from Water" In: *Recent Developments in Mercury Science*. Springer Berlin Heidelberg: Berlin, Heidelberg, 2006. Cover page, publisher page, index, and pp. 163-181.
Bao, "Selenite-Induced Toxicity in Cancer Cells Is Mediated by Metabolic Generation of Endogenous Selenium Nanoparticles" 2015 *Journal of Proteome Research*, 14:1127-1136.
Bellanger, "Economic benefits of methylmercury exposure control in Europe: Monetary value of neurotoxicity prevention" 2013 *Environmental Health*, 12:3. 10 pages.
Billinge, "Mercury Binding Sites in Thiol-Functionalized Mesostructured Silica" 2005 *Journal of the American Chemical Society*, 127(23): 8492-8498.
Borovikova, "Stabilizing selenium nanoparticles with chymotrypsin: The effect of pH and nanoparticle-enzyme concentration ratios on the stability of nanocomplexes" 2013 *Russian Journal of Physical Chemistry A*, 87(6):998-1001.
Branco, "Mercury and selenium interaction in vivo: Effects on thioredoxin reductase and glutathione peroxidase" 2012 *Free Radical Biology and Medicine*, 52(4): 781-793.
Byrne, "Removal of trace level aqueous mercury by adsorption and photocatalysis on silica-titania composites" 2009 *Journal of Hazardous Materials*, 170(2-3): 915-919.
Carvalho, "Effects of selenite and chelating agents on mammalian thioredoxin reductase inhibited by mercury: implications for treatment of mercury poisoning" 2011 *The FASEB Journal*, 25(1): 370-381.
Chaudhary, "Selenium Nanomaterials: Applications in Electronics, Catalysis and Sensors" 2014 *Journal of Nanoscience and Nanotechnology*, 14:1658-1674.
Chen, "L-Cysteine-Assisted Controlled Synthesis of Selenium Nanospheres and Nanorods" 2009 *Crystal Growth & Design*, 9:1327-1333.
Crump, "Mercury-induced reproductive impairment in fish" 2009 *Environmental Toxicology and Chemistry*, 28(5): 895-907.
"Database WPI Week 200966, Thomson Scientific, London, GB; AN 2009-P26583, XP002765638, & JP 2009 220102 A (Kobe Steel Ltd) Oct. 1, 2009 (Oct. 1, 2009)."
Debieux, "A bacterial process for selenium nanosphere assembly" 2011 *Proceedings of the National Academy of Sciences*, 108(33):13480-13485.
Dong, "Colloidally stable selenium@copper selenide core@shell nanoparticles as selenium source for manufacturing of copper-indium-selenide solar cells" 2014 *Journal of Colloid and Interface Science*, 415:103-110.
Driscoll, "Mercury as a Global Pollutant: Sources, Pathways, and Effects" 2013 *Environ. Sci. Technol.* 47:4967-4983.
Dwivedi, "Biomimetic Synthesis of Selenium Nanospheres by Bacterial Strain JS-11 and Its Role as a Biosensor for Nanotoxicity Assessment: A Novel Se-Bioassay" 2013 *PLoS One*, 8, e57404. 10 pgs.
Eisenberg, "Glass transition temperatures in amorphous selenium" 1963 *Journal of Polymer Science Part B: Polymer Letters*, 1(4):177-179.
Esworthy, "Analysis of glutathione-related enzymes" In: Costa (Eds.), *Current Protocols in Toxicology*. Wiley, USA. 7.1.1-7.1.32; 1999. 32 pgs.
Fang, "Functionalized nanoparticles with long-term stability in biological media" 2009 *Small*, 5(14):1637-1641.
Faulconer, "Optimization of magnetic powdered activated carbon for aqueous Hg(II) removal and magnetic recovery" 2012 *Journal of Hazardous Materials*, 199-200:9-14.
Forootanfar, "Antioxidant and cytotoxic effect of biologically synthesized selenium nanoparticles in comparison to selenium dioxide" 2014 *Journal of Trace Elements in Medicine and Biology*, 28(1):75-79. (Accepted MS).
Fraser, "Peru's gold rush prompts public-health emergency" 2016 *Nature*, 534(7606):162.
Gates, "Synthesis and Characterization of Uniform Nanowires of Trigonal Selenium" 2002 *Advanced Functional Materials*, 12:219-227.
Guo, "Biocompatibility selenium nanoparticles with an intrinsic oxidase-like activity" 2016 *Journal of Nanoparticle Research*, 18:74. 10 pgs.
Habashi, "Metallurgical plants: how mercury pollution is abated" 1978 *Environmental Science & Technology*, 12(13):1372-1376.
Hagan, "Economic Benefits of Reducing Mercury Deposition in Minnesota" 1999. Minnesota Pollution Control Agency and The Legislative Commission on Minnesota Resources. 51 pgs.
He, "Technology Evaluation for Waterborne Mercury Removal at the Y12 National Security Complex" 2011 Technical Report ORNL/TM-2010/268.2010. Available online at: http://www.esd.ornl.gov/romic_afrc/documents/Waterborne_Mercury_Treatment_O_RNL_TM-final.pdf.
Huang, "Selective cellular uptake and induction of apoptosis of cancer-targeted selenium nanoparticles" 2013 *Biomaterials*, 34(29):7106-7116.
Huang, "Preparation of a Novel Supported Selenium Nanoparticles Adsorbent and Its Application for Copper Removal from Aqueous Solution" 2015 *Journal of Chemical & Engineering Data* 2015, 60(1): 151-160.
Ingole, "Green synthesis of selenium nanoparticles under ambient condition" 2010 *Chalcogenide Letters*, 7:485-489.
Jain, "Extracellular polymeric substances govern the surface charge of biogenic elemental selenium nanoparticles" Dec. 23, 2014. *Environmental Science & Technology*, 49:1713-1720.
Jain, "Adsorption of zinc by biogenic elemental selenium nanoparticles" 2015 *Chemical Engineering Journal*, 260:855-863. (Available online Sep. 22, 2014.).
Jeong, "Synthesis and Crystallization of Monodisperse Spherical Colloids of Amorphous Selenium" 2005 *Advanced Materials*, 17:102-106.
Jiang, "Mercury capture into biogenic amorphous selenium nanospheres produced by mercury resistant *Shewanella putrefaciens* 200" 2012 *Chemosphere*, 87:621-624.
Johnson, "Mercury Vapor Release from Broken Compact Fluorescent Lamps and In Situ Capture by New Nanomaterial Sorbents" 2008 *Environmental Science & Technology*, 42(15):5772-5778.
Kabiri, "Graphene-Diatom Silica Aerogels for Efficient Removal of Mercury Ions from Water" Apr. 2, 2015 *ACS Applied Materials & Interfaces*, 7(22):11815-11823.
Karatza, "Study of mercury absorption and desorption on sulfur impregnated carbon" 2000 *Experimental Thermal and Fluid Science*, 21(1-3):150-155.
Ke, "Thiol-functionalization of metal-organic framework by a facile coordination-based postsynthetic strategy and enhanced removal of $Hg^{2+}$ from water" 2011 *Journal of Hazardous Materials*, 196:36-43.
Keating, "Mercury study report to Congress: United States Environmental Protection Agency; 1997" Report No. EPA-452/R-97-003.

(56) References Cited

OTHER PUBLICATIONS

Khalid, "Intrinsic fluorescence of selenium nanoparticles for cellular imaging applications" Jan. 11, 2016 *Nanoscale*, 8:3376-3385.
Khan, "Mercury-selenium compounds and their toxicological significance: Toward a molecular understanding of the mercury-selenium antagonism" 2009 *Environmental Toxicology and Chemistry*, 28(8): 1567-1577.
Kumar, "Synthesis of selenium particles with various morphologies" 2014 *Journal of Colloid and Interface Science*, 416:119-123.
Lamborg, "A global ocean inventory of anthropogenic mercury based on water column measurements" 2014 *Nature*, 512(7512): 65-68.
Lannes, "Intramolecular Hg···π interactions of d-character with non-bridging atoms in mercury-aryl complexes" 2016 *Dalton Transactions*, 45(36): 14035-14038.
Li, "High-yield synthesis of selenium nanowires in water at room temperature" 2006 Chemical Communication 2006:1006-1008.
Li, "Functionalized selenium nanoparticles with nephroprotective activity, the important roles of ROS-mediated signaling pathways" 2013 *Journal of Materials Chemistry B*, 1(46):6365-6372.
Li, "Mercury nano-trap for effective and efficient removal of mercury(II) from aqueous solution" 2014 *Nat Commun.*, 5:5537. 7 pgs.
Liu, "Alkenyl/Thiol-Derived Metal—Organic Frameworks (MOFs) by Means of Postsynthetic Modification for Effective Mercury Adsorption" Sep. 10, 2014 *Chemistry—A European Journal*, 20(43):14090-14095.
Luo, "Selenium@Mesoporous Carbon Composite with Superior Lithium and Sodium Storage Capacity" 2013 *ACS Nano*, 7(9):8003-8010.
Malhotra, "In vitro and in vivo antioxidant, cytotoxic, and antichronic inflammatory arthritic effect of selenium nanoparticles" May 20, 2015 *Journal of Biomedical Materials Research Part B: Applied Biomaterials*.
Mattigod, "A Thiol-functionalized Nanoporous Silica Sorbent for Removal of Mercury from Actual Industrial Waste," Chapter 11 in *Environmental Applications of Nanomaterials: Synthesis, Sorbents and Sensors*. 2007. Title page, publisher's page, and pp. 275-283.
McCann, "Mercury Levels in Blood from Newborns in the Lake Superior Basin 2011," Minnesota Department of Health Report No. GLNPO ID 2007-942. 181 pgs.
Monson, "Effectiveness of Stormwater Ponds/Constructed Wetlands in the Collection of Total Mercury and Production of Methylmercury" 2007. Minnesota Pollution Control Agency. 41 pgs.
Monson, "Minnesota National Lakes Assessment Project: Water Mercury Concentrations in Minnesota Lakes" 2008 Minnesota Pollution Control Agency. Report No. wq-nlap-02. 15 pgs.
Nie, "Facile synthesis of highly uniform selenium nanoparticles using glucose as the reductant and surface decorator to induce cancer cell apoptosis" 2016 *Journal of Materials Chemistry B*, 4(13):2351-2358.
Oremland, "Structural and spectral features of selenium nanospheres produced by Se-respiring bacteria" 2004 *Applied and Environmental Microbiology*, 70:52-60.
Peng, "Size effect of elemental selenium nanoparticles (Nano-Se) at supranutritional levels on selenium accumulation and glutathione S-transferase activity" 2007 *Journal of Inorganic Biochemistry*, 101(10): 1457-1463.
Peng, "Reduced graphene oxide encapsulated selenium nanoparticles for high-power lithium-selenium battery cathode" Apr. 25, 2015 *Journal of Power Sources*, 288:214-220.
Prasad, "Microbial selenium nanoparticles (SeNPs) and their application as a sensitive hydrogen peroxide biosensor" Aug. 29, 2015 *Appl Biochem Biotechnol*, 177:1386-1393.
Ralston, "Nanomaterials: Nano-selenium captures mercury" 2008 *Nat Nano.*, 3(9):527-528.
Ralston, "Selenium Health Benefit Values: Updated Criteria for Mercury Risk Assessments" 2016 *Biological Trace Element Research*, 171:262-269. (Published online Oct. 13, 2015.).
Ramos, "Cytotoxicity of selenium nanoparticles in rat dermal fibroblasts" 2012 *International Journal of Nanomedicine*, 7:3907-3914.
Roberts, "Removal of mercury from aqueous solutions by nitrogen-containing chemically modified cotton" 1973 *Environmental Science & Technology*, 7(6):552-555.
Samiey, "Organic-Inorganic Hybrid Polymers as Adsorbents for Removal of Heavy Metal Ions from Solutions: A Review" Jan. 27, 2014 *Materials*, 7(2):673-726.
Saper, "Amino-acid Composition of Sclero-protein of the Sponge *Hippospongia equina*" 1958 *Nature*, 181:285-286.
Shah, "Acid-induced synthesis of polyvinyl alcohol-stabilized selenium nanoparticles" 2007 *Nanotechnology* 18 385607. 7 pgs.
Shaker, "Kinetics of the Reduction of Se(IV) to Se—Sol" 1996 *Journal of Colloid and Interface Science*, 180(1):225-231.
Shin, "Synthesis and stabilization of selenium nanoparticles on cellulose nanocrystal" 2007 *Materials Letters*, 61:4297-4300.
Shirsat, "Selenium nanostructures: microbial synthesis and applications" Oct. 9, 2015 *RSC Advances*, 5:92799-92811.
Sohrabi, "Preconcentration of mercury(II) using a thiol-functionalized metal-organic framework nanocomposite as a sorbent" 2014 *Microchimica Acta*, 181(3):435-444. (Published online Dec. 6, 2013.).
Sonkusre, "Biogenic selenium nanoparticles inhibit *Staphylococcus aureus* adherence on different surfaces" 2015 *Colloids and Surfaces B: Biointerfaces*, 136:1051-1057. (Available online Nov. 10, 2015.).
Stolzoff, "Reducing bone cancer cell functions using selenium nanocomposites" 2016 *Journal of Biomedical Materials Research Part A*, 104:476-482. (Published online: Oct. 29, 2015.).
Stone, "Determination of methyl mercury in dental-unit wastewater" 2003 *Dental Materials*, 19(7): 675-679.
Stroyuk, "Structural and optical characterization of colloidal Se nanoparticles prepared via the acidic decomposition of sodium selenosulfate" 2008 *Colloids and Surfaces A: Physicochemical and Engineering Aspects*, 320:169-174.
Su, "Plastic instability in amorphous selenium near its glass transition temperature" 2010 *Journal of Materials Research*, 25(6):1015-1019.
Tonini, "Achieving low mercury concentrations in chlor-alkali wastewaters" 2003 *Environmental Progress*, 22(3):167-173.
Tran, "Antimicrobial selenium nanoparticle coatings on polymeric medical devices" 2013 *Nanotechnology*, 24(15):155101. 7 pgs.
Tran, "Opportunities for nanotechnology-enabled bioactive bone implants" 2009 *Journal of Materials Chemistry*, 19:2653-2659.
Tran, "Selenium nanoparticles inhibit *Staphylococcus aureus* growth" 2011 *Int J Nanomedicine*, 6:1553-1558.
Tran, "Low cytotoxic trace element selenium nanoparticles and their differential antimicrobial properties against *S. aureus* and *E. coli*" 2016 *Nanotechnology*, 27(4):045101. 10 pgs. (Available online Dec. 11, 2015.).
UNEP, 2013 Global Mercury Assessment 2013: Sources, Emissions, Releases and Environmental Transport. UNEP Chemicals Branch, Geneva, Switzerland: UNEP; 2013. 44 pgs.
USEPA, "Treatment Technologies for Mercury in Soil, Waste, and Water" Aug. 2007. 133 pgs.
Walcarius, "Mesoporous organosilica adsorbents: nanoengineered materials for removal of organic and inorganic pollutants" 2010 *Journal of Materials Chemistry*, 20(22):4478-4511.
Wang, "Elemental selenium at nano size possesses lower toxicity without compromising the fundamental effect on selenoenzymes: comparison with selenomethionine in mice" 2007 *Free Radical Biology and Medicine*, 42(10):1524-1533.
Wang, "Nanostructured selenium for preventing biofilm formation on polycarbonate medical devices" 2012 *Journal of Biomedical Materials Research Part A*, 100A(12):3205-3210.
Wang, "Red selenium nanoparticles and gray selenium nanorods as antibacterial coatings for PEEK medical devices" 2016 *Journal of Biomedical Materials Research Part B: Applied Biomaterials*, 104B(7):1352-8. (Published online Jul. 2, 2015.).
Xu, "Regenerable Ag/graphene sorbent for elemental mercury capture at ambient temperature" Jul. 2015 Colloids and Surfaces A: Physicochemical and Engineering Aspects, 476:83-89. (Available online Mar. 27, 2015.).

(56) References Cited

OTHER PUBLICATIONS

Yee, "Effective Mercury Sorption by Thiol-Laced Metal—Organic Frameworks: in Strong Acid and the Vapor Phase" 2013 *Journal of the American Chemical Society*, 135(21): 7795-7798.

Yu, "X-ray-responsive selenium nanoparticles for enhanced cancer chemo-radiotherapy" 2016 *Colloids and Surfaces B: Biointerfaces*, 139:180-189. (Available online Dec. 9, 2015.).

Yu, "A facile and fast synthetic approach to create selenium nanoparticles with diverse shapes and their antioxidation ability" 2016 *New Journal of Chemistry*, 40:1118-1123. (Available online Dec. 15, 2015.).

Yuan, "Adsorption of Cd(II) from aqueous solution by biogenic selenium nanoparticles" Jan. 26, 2016 *RSC Advances*, 6(18):15201-15209.

Zhang, "Synthesis of selenium nanoparticles in the presence of polysaccharides" Aug 2004 *Materials Letters*, 58(21):2590-2594.

Zhang, "Comparison of short-term toxicity between Nano-Se and selenite in mice" 2005 *Life Sciences*, 76(10):1099-1109.

Zhang, "Creation of highly stable selenium nanoparticles capped with hyperbranched polysaccharide in water" 2010 *Langmuir*, 26:17617-17623.

Zhang, "Selenium in Soil Inhibits Mercury Uptake and Translocation in Rice (*Oryza sativa* L.)" 2012 *Environmental Science & Technology*, 46(18):10040-10046.

Zhang, "New Insights into Traditional Health Risk Assessments of Mercury Exposure: Implications of Selenium" 2014 *Environmental Science & Technology*, 48(2):1206-1212. (Published online Dec. 30, 2013.).

Zhong, "Inhibition Mechanism of Calcium Oxalate Crystal Growth by Cooperation Influence of Colloidal Selenium Nanoparticles and Bovine Serum Albumin" Mar. 2015 *Crystal Growth & Design*, 15(4):1602-1610.

Lv, Y. et al. "Silver nanoparticle-decorated porous ceramic composite for water treatment", Journal of Membrane Science, Elsevier BV NL, vol. 331, No. 1-2, Apr. 1, 2009, pp. 50-56.

Xi-Lin, Wu et al. "Biomass-Derived Sponge-like Carbonaceous Hydrogels and Aerogels for Supercapacitors", ACS Nano, vol. 7, No. 4, Apr. 2, 2013, pp. 3589-3597.

Zhuang, Yu-Ting et al. "A three-dimensional magnetic carbon framework derived from Prussian blue and amylopectin impregnated polyurethane sponge for lead removal", Carbon, Elsevier Oxford, GB, vol. 108, Jul. 2, 2016, pp. 190-198.

\* cited by examiner a b c d e

SELENIUM NANOMATERIALS AND METHODS OF MAKING AND USING SAME

CONTINUING APPLICATION DATA

This application is the § 371 U.S. National Stage of International Application No. PCT/US2016/056850, filed Oct. 13, 2016, which claims the benefit of U.S. Provisional Application Ser. No. 62/240,764, filed Oct. 13, 2015, each of which is incorporated by reference herein in its entirety.

BACKGROUND

In recent years, selenium nanoparticles (SeNP) or nanospheres (SeNS) have gained increasing attention due to their versatile biological activity and lower toxicity as compared to other forms of selenium. Since selenium is a good photoconducting material, SeNS have been integrated in high-power batteries, solar cells, and electronics. One focus of SeNS applications has been their biological activity including antimicrobial properties (e.g., the prevention of biofilm formation), antioxidant abilities, and anti-inflammatory effects. SeNS can increase the susceptibility of cancer cells to drugs, thereby acting as a good anti-tumoral and a chemopreventive agent. SeNS are also used in a variety of chemical and analytical processes including controling crystal growth, sensing, biocatalysis, and cellular imaging applications due to their intrinsic fluorescence and enzyme-like properties.

Due to their high adsorption capacity and strong affinity for heavy metals and other toxic elements such as zinc, cadmium, and mercury, SeNS are also used in water remediation. An urgent need for cost-effective mercury removal technologies is clearly justified by the major threat that mercury causes not only to aquatic life, but also to human health by entering the food chain. Mercury contamination of lake waters results in mercury accumulation in fish. A number of technologies have been developed to remove mercury from water. However, many of these technologies have costs that hamper their operation on a large scale, and some of the materials used in these technologies may themselves result in a health risk if leaked into the environment.

The need remains for practical and efficient technologies for removing mercury from air and water.

SUMMARY

The present disclosure provides selenium nanomaterials, including, in some embodiments, selenium nanomaterials bound to a substrate; methods of preparing selenium nanomaterials; and methods of using selenium nanomaterials.

In one aspect, this disclosure provides a method of preparing a selenium nanomaterial including treating a material with a selenous acid solution, and heating the material to form the selenium nanomaterial on a surface of the material. In some embodiments, the method includes treating the material with a reducing agent.

In another aspect, this disclosure describes a method of preparing a selenium nanomaterial including combining an aqueous solution of selenous acid with an aqueous solution of a reducing agent in the presence of a material under conditions effective to form the selenium nanomaterial on a surface of the material. In some embodiments, the method includes heating the material. In some embodiments, conditions effective to form selenium nanomaterials comprise a temperature in a range of 35° C. to 170° C.

In some embodiments, heating the material includes heating the material at a temperature greater than 35° C. In some embodiments, heating the material includes heating the material at a temperature greater than the glass transition temperature of selenium. In some embodiments, the method includes heating the material at a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C.

In some embodiments, the surface comprises a hydroxylated surface. In some embodiments, the surface is capable of providing nucleation sites for selenium. In some embodiments, the surface is provided by a saccharide comprising a monosaccharide, a disaccharide, and/or a polysaccharide treated material. A saccharide can include, for example, sucrose, fructose, or a combination thereof.

In some embodiments, the method includes treating the surface to form a hydroxylated surface. In some embodiments, the method includes forming a saccharide coating on the surface.

In some embodiments, the selenium nanomaterial is prepared in the substantial absence of a polymeric stabilizer or proteinaceous stabilizer.

In some embodiments, the reducing agent comprises an acidic compound. In some embodiments, the acidic compound is selected from the group consisting of hydroquinone, acetic acid, glutathione, and combinations thereof. In some embodiments, the reducing agent includes hydroquinone at a concentration of 0.1 M to 6 M in an aqueous solution.

In some embodiments, at least one of the material and the reducing agent is at a temperature greater than the glass transition temperature of selenium. In some embodiments, at least one of the material and the reducing agent is at a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C.

In some embodiments, the surface includes an organic material, an inorganic material, or a combination thereof. In some embodiments, the surface includes activated carbon. In some embodiments, the surface includes a sponge, a film, a fabric, a non-woven material, or a metal-organic framework (MOF), or a combination thereof. A film can be selected from the group consisting of a silicon substrate, glass, an activated carbon, a metal film, a polymeric film, and combinations thereof.

In some embodiments, the sponge includes polyamide. In some embodiments, the sponge includes a hydrophilic surface. In some embodiments, the sponge includes fibers having a diameter in a range of 10 μm to 30 μm.

In some embodiments, the sponge includes polyurethane.

In some embodiments, the selenium nanomaterials include nanospheres, nanofilms, nanorods, nanowires, nanostars, nanodomes, or combinations thereof.

In some embodiments, the surface has a water contact angle of less than 90 degrees. In some embodiments, the surface has a water contact angle of greater than 90 degrees.

In some embodiments, the method includes treating the material with an aqueous solution. In some embodiments, treating the material with an aqueous dispersion provides a dispersion of the selenium nanomaterials.

In some embodiments, the material includes bound selenium nanomaterials.

In another aspect, this disclosure provides a selenium nanomaterial prepared by the methods described herein.

In some embodiments, a selenium nanomaterial includes a selenium nanosphere having a hydrodynamic diameter of at least 500 nm.

In some embodiments, a selenium nanomaterial exhibits a maximal removal capacity of at least 1000 milligrams mercury per gram selenium (mg/g), at least 1200 mg/g, at least 1500 mg/g, at least 1600 mg/g, at least 1700 mg/g, at least 1800 mg/g, or at least 1900 mg/g. In some embodiments, a selenium nanomaterial exhibits a maximal removal capacity of up to 1900 mg/g.

In another aspect this disclosure provides articles that include selenium nanomaterials described herein.

In a further aspect this disclosure provides an article including a material having a selenium nanomaterial bound to the surface thereof and within the material, wherein the article does not include a polymeric stabilizer or a proteinaceous stabilizer. In some embodiments, the selenium nanomaterial includes selenium nanospheres.

In some embodiments, the material includes a polyurethane. In some embodiments, the material is a sponge. In some embodiments, the material includes an activated carbon. In some embodiments, the material has a distribution coefficient, $K_d$, of at least $1*10^8$ mL·g$^{-1}$, at least $5*10^8$ mL·g$^{-1}$, or at least $1*10^9$ mL·g$^{-1}$.

In another aspect this disclosure describes a material having unbound selenium nanospheres within the material. In some embodiments, the article does not include a polymeric stabilizer. In some embodiments, the article does not include a proteinaceous stabilizer.

In yet another aspect, this disclosure describes an aqueous dispersion including selenium nanospheres. In some embodiments, the aqueous dispersion does not include a polymeric stabilizer. In some embodiments, the aqueous dispersion does not include a proteinaceous stabilizer.

In a further aspect, this disclosure describes a composition including non-agglomerated selenium nanospheres. In some embodiments, the composition does not include a polymeric stabilizer. In some embodiments, the composition does not include a proteinaceous stabilizer.

In some embodiments, the selenium nanospheres have an average particle size of 100 nm to 1.2 micrometers. In some embodiments, the selenium nanospheres have an average diameter of at least 500 nm. In some embodiments, the selenium nanospheres exhibit a maximal removal capacity of at least 1000 milligrams mercury per gram selenium (mg/g), at least 1200 mg/g, at least 1500 mg/g, at least 1600 mg/g, at least 1700 mg/g, at least 1800 mg/g, or at least 1900 mg/g.

In some embodiments, the selenium nanomaterial or selenium nanospheres exhibit substantially irreversible binding with mercury.

In another aspect, this disclosure describes a method of removing mercury from air or water, the method including exposing the air or water to any one of the articles, dispersions, or compositions described herein.

In a further aspect, this disclosure describes a method of killing or inhibiting the growth of microorganisms, the method including exposing the microorganisms to any one of the articles, dispersions, or compositions described herein.

Definitions

As used herein, "selenium nanomaterials" are meant to encompass selenium materials having at least one dimension less than 1 micrometer. Selenium nanomaterials can exist in a variety of forms including, for example, nanospheres, nanofilms, nanorods, nanowires, nanostars, nanodomes, or combinations thereof.

As used herein, "unbound selenium nanomaterials" is meant to encompass selenium nanomaterials within a material that are unbound or loosely bound to a surface of the material. Typically, unbound selenium nanomaterials can be removed from the surface of the material by treating (e.g., rinsing or washing) the selenium nanomaterials within the material with an aqueous liquid.

As used herein, "selenium nanomaterials bound to a surface" is meant to encompass selenium nanomaterials within a material that are tightly bound to a surface of the material. Typically, selenium nanomaterials bound to a surface cannot be readily removed from the surface of the material by treating (e.g., rinsing or washing) the selenium nanomaterials within the material with an aqueous liquid.

The terms "comprises" and variations thereof do not have a limiting meaning where these terms appear in the description and claims.

As used herein, "a," "an," "the," "at least one," and "one or more" are used interchangeably.

Also herein, the recitations of numerical ranges by endpoints include all numbers subsumed within that range (e.g., 1 to 5 includes 1, 1.5, 2, 2.75, 3, 3.80, 4, 5, etc.).

The above brief description of various embodiments of the present invention is not intended to describe each embodiment or every implementation of the present invention. Rather, a more complete understanding of the invention will become apparent and appreciated by reference to the following description and claims in view of the accompanying drawings. Further, it is to be understood that other embodiments may be utilized and structural changes may be made without departing from the scope of the present invention.

DETAILED DESCRIPTION OF ILLUSTRATIVE EMBODIMENTS

Figure 1:
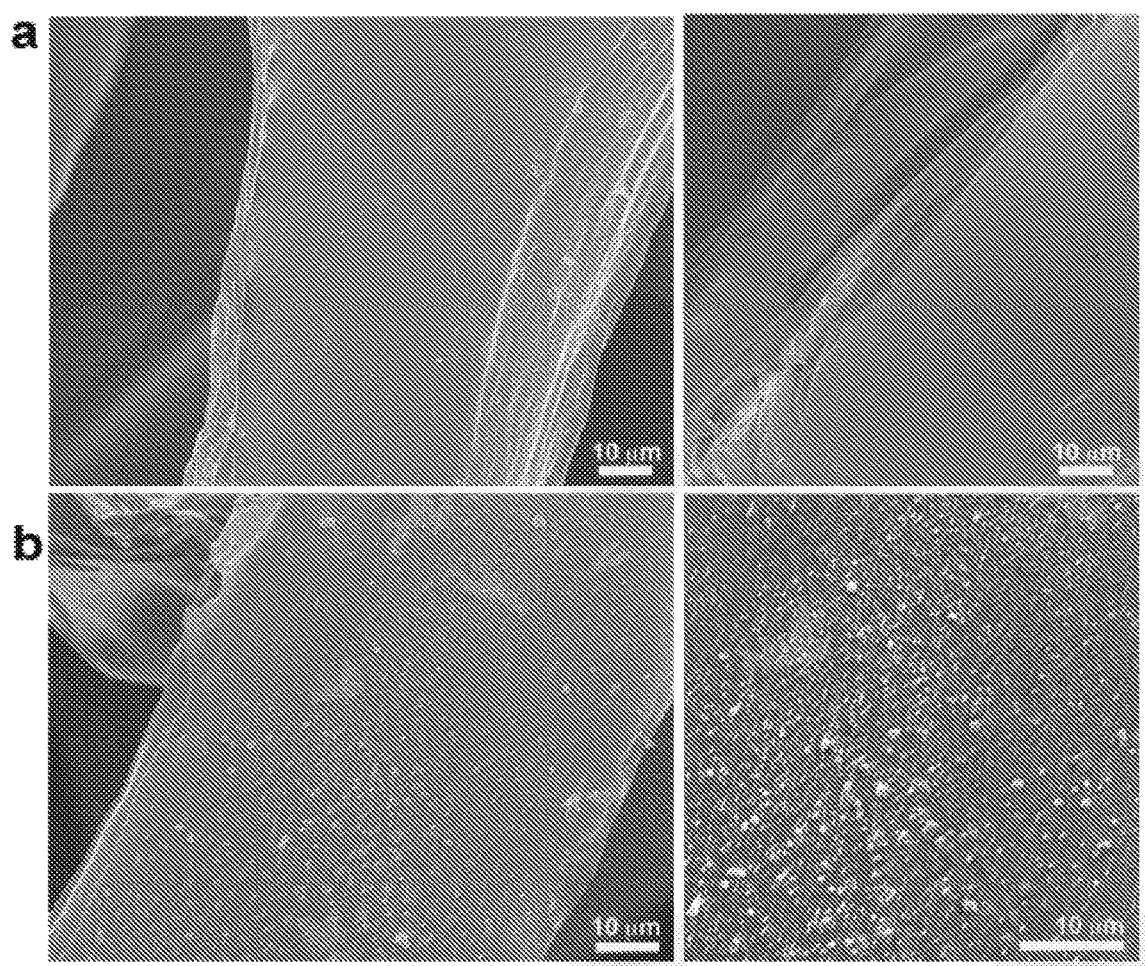
FIG. 1 shows scanning electron microscopy images of an exemplary sponge before (a) and after (b) immersion in nanoselenium (NanoSe) solution, as described in Example 1. Materials shown in (b) were obtained from Method #1 of Example 1.

The present disclosure provides selenium nanomaterials, including, in some embodiments, selenium nanomaterials bound to a surface; methods of preparing selenium nanomaterials; and methods of using selenium nanomaterials.

In some embodiments, the selenium nanomaterials and methods described herein allow for the synthesis and storage of colloidal selenium nanospheres directly on a substrate including, for example, a natural honeycomb sponge or a material including activated carbon. The methods described herein can yield nanoparticles from 10 nm to 1000 nm in diameter, enabling production of nanoparticles sized to meet the needs of a variety of biomedical, chemical, and electronic applications. In addition, the selenium nanomaterials and methods described herein allow for the preservation of nanoparticle properties for over 8 months of storage without nanoparticle lyophilization that requires cryoprotectants or a time-consuming and costly freeze-dry process, and without specific coatings or solvents that may interfere with nanoparticle functionality, functionalization, and/or biocompatibility.

In some embodiments, the selenium nanomaterials described herein can be used as a mercury sorbent, exhibiting a mercury removal capacity of up to 1900 milligram (mg) Hg per gram (g) Se.

With increasing biomedical and engineering applications of selenium nanospheres (SeNS), new efficient methods are needed for the synthesis and long-term preservation of these nanomaterials. Currently, SeNS are mostly produced through the biosynthesis route using microorganisms or by using wet chemical reduction, both of which have several limitations in terms of nanoparticle size, yield, production time and long-term stability of the nanoparticles.

A number of different ways to synthesize, prepare and store selenium nanomaterials have been proposed, but a number of challenges face an artisan seeking to synthesize selenium nanomaterials and, in particular, SeNS including the ability to efficiently produce a nanoparticle, the ability to control the size of a nanoparticle, the ability to produce a nanoparticle with minimum use of stabilizing agents, and the ability to produce nanoparticles with long term stability. Size control is important not only because it allows tuning the optical properties of the nanospheres but also because the biological activity of SeNS can be dependent on their size (Peng et al., *Journal of Inorganic Biochemistry*, 2007, 101, 1457-1463). Without stabilizing agents, the production and long-term stability of single nanospheres (and not aggregates) has proved challenging.

At the time of the invention, selenium nanospheres were produced using a number of methods. Many reports used microbes, such as Pseudomonas alcaliphila, with metabolic systems that can reduce selenium sources to elemental selenium (Oremland et al. *Microbiology*, 2004, 70, 52-60; Shirsat et al., *RSC Advances*, 2015, 5, 92799-92811).

Although the microbial route of selenium nanospheres (SeNS) synthesis is eco-friendly, the synthesis requires several hours to several days for cell growth, yields polydisperse particles ranging from 50 nm to 500 nm, and the nanoparticles are produced with a natural coating of extracellular polymeric substances (Jain et al. *Environmental Science & Technology*, 2015, 49, 1713-1720). This polymeric coating, while it helps stabilize the particles, can also hinder the activity of the particles and limit their use in certain applications like mercury capture where the surface of the nanoparticles needs to be accessible (Johnson et al., *Environmental Science & Technology*, 2008, 42, 5772-5778).

Chemical reduction of selenous acid is another method used to prepare SeNS in the presence of a reducing reagent (e.g., hydrazine, hydroquinone, glucose, glutamic acid, and cysteine). Some methods, including some chemical reduction methods, used to prepare SeNS also include stabilizing agents such as polyvinyl alcohol, polyethylene glycol, sodium dodecyl sulfate (SDS), bovine serum albumin (BSA), trypsin, and saccharides/polysaccharides. The reported sizes of nanoparticles achieved by such methods range from 5 nm to 300 nm. Other less common methods include hydrothermal and microwave-assisted syntheses. Table 3 provides a comparison of the performance and limitations of these different methods.

In contrast, and as further described below, the present disclosure provides selenium nanomaterials and methods for making those selenium nanomaterials that allow for a larger range of nanoparticle sizes, for the preparation and storage of the selenium nanomaterials without the use of a polymeric or proteinaceous stabilizing agent, and for higher mercury sorption capacity.

Although numerous other materials and methods have been developed for mercury (Hg) removal from water, high costs of the material and/or the long contact time needed for mercury removal represent serious limitations for large scale implementation.

At the time of the invention, adsorption was the most widely used method to remove mercury from water, and activated carbon was the commercially leading material, providing the ability to remove aqueous Hg to less than 0.2 µg/L. Although some commercially available technologies based on sulfur-impregnated activated carbon claim a decrease of mercury concentrations from industrial wastewater to levels below 0.1 ppb, to achieve such results, the influent flow needs to be pretreated by adjusting the pH, for example, and the flow rate reduced to increase the adsorption contact time to 90 minutes (Tonini et al. *Environmental Progress* 2003, 22(3): 167-173).

To increase the number of available adsorption sites and enhance the loading capacity, others have used nanomaterials such as graphene-based composites, Mesoporous organosilica adsorbents, silica-titania composites, and functionalized metal organic frameworks (MOFs). Although some recently developed sulfur-functionalized MOFs can achieve good removal rates, the high cost of the material and the long contact time needed for mercury removal represent serious limitations for large scale implementation.

In addition to the long contact time, the removal rate is important to meeting regulatory requirements. While currently available technologies are useful for reducing mercury in industrial wastewater where the concentration ranges from 10 parts per trillion (ppt) to 50 parts per billion (ppb), they are unable to completely clean the waters, and small amounts of mercury are still discharged into the environment. Moreover, these technologies are not suitable for cleaning rain and surface waters where mercury concentrations range from 0.01 ppt to 100 ppt, and where acceptable standard limits can be extremely low (e.g., 1.3 ng/L in the Lake Superior Basin).

In addition to the performance, the hazardous nature of the sorbent waste can increase the cost of disposal and limit the sustainability of existing technologies including the widely used sulfur-functionalized sorbents. Despite the very high binding constants ($10^{15}$-$10^{17}$) of sulfur-mercury (S—Hg) complexes, the S—Hg interaction is reversible under certain conditions, and can undergo ligand exchange reactions in aqueous solutions or biological systems (Karatza et al. *Experimental Thermal and Fluid Science* 2000, 21(1-3): 150-155), which represents a health risk if the sorbent waste is released into the environment.

Selenium is known to capture mercury with exceptionally high binding affinity with a constant of $10^{45}$, one-million-fold higher than the binding affinity between mercury and sulfur (Khan et al. *Environmental Toxicology and Chemistry* 2009, 28(8): 1567-1577). As a result, the interaction between Se and Hg yields a biologically stable SeHg precipitates, with extremely low solubility ($10^{-58}$ to $10^{-65}$) as compared to that of HgS precipitates ($10^{-52}$). Yet, in one instance only 7% of the potential mercury removal capacity of selenium nanoparticles was achieved, and the need to use nanoparticle aggregates instead of single nanoparticles further reduced the surface area and removal rate (Johnson et al. *Environmental Science & Technology* 2008, 42(15): 5772-5778; U.S. Pat. No. 8,491,865). Other attempts to use SeNPs-based sorbents relied on first synthesizing and then adsorbing SeNPs on solid supports by soaking (Johnson et al. *Environmental Science & Technology* 2008, 42(15): 5772-5778; U.S. Patent Application No. 2012/0018384 A1; U.S. Pat. No. 8,221,711; Huang et al. *Journal of Chemical & Engineering Data* 2015, 60(1): 151-160). These processes result in anisotropic aggregates, poor surface coverage and increased risk of leaching under acidic conditions, which could represent a secondary pollutant at high Se concentrations.

In contrast, and as further described below, the present disclosure provides selenium nanomaterials bound to a surface and methods for making those selenium nanomaterials that allow for efficient removal of mercury, are suitable for cleaning rain and surface waters, and have a decreased risk of leaching under acidic conditions.

Selenium Nanomaterials

In one aspect, the present disclosure provides selenium nanomaterials, compositions including selenium nanoparticles, and articles including selenium nanoparticles. Selenium nanomaterials can have a wide variety of forms such as nanospheres, nanofilms, nanorods, nanowires, nanostars, nanodomes, or combinations thereof.

In some embodiments, the selenium nanomaterials preferably include selenium nanospheres (SeNS). In some embodiments, a selenium nanosphere can have a hydrodynamic diameter of at least 5 nm, at least 10 nm, at least 25 nm, at least 50 nm, at least 100 nm, at least 150 nm, at least 200 nm, at least 300 nm, at least 400 nm, at least 500 nm, at least 600 nm, at least 700 nm, at least 800 nm, at least 900 nm, or at least 1 micrometer. In some embodiments, a selenium nanosphere can have an average particle size of up to 10 nm, up to 15 nm, up to 25 nm, up to 50 nm, up to 100 nm, up to 150 nm, up to 200 nm, up to 300 nm, up to 400 nm, up to 500 nm, up to 600 nm, up to 700 nm, up to 800 nm, up to 900 nm, up to 1 micrometer, up to 1.1. micrometers, or up to 1.2 micrometers.

In some embodiments, the selenium nanomaterials can be crystalline. In some embodiments, the selenium nanomaterials can be amorphous. In some embodiments, a majority of the selenium nanomaterials can be amorphous. In some embodiments, the proportion of selenium nanomaterials that are amorphous increases as the size (e.g., hydrodynamic diameter) of the selenium nanomaterials increases.

In some embodiments, the selenium nanomaterials include less than 5% of a monosaccharide, a disaccharide, and/or a polysaccharide; less than 3% of a monosaccharide, a disaccharide, and/or a polysaccharide; or less than 1% of a monosaccharide, a disaccharide, and/or a polysaccharide. In some embodiments, a monosaccharide, a disaccharide, and/or a polysaccharide is present in the selenium nanomaterials in an amount insufficient to act as a stabilizer.

In some embodiments, the selenium nanomaterials can exhibit a strong affinity for mercury. In some embodiments, the selenium nanomaterials preferably exhibit a maximal load or maximal removal capacity of at least 1000 milligrams mercury per gram selenium (mg/g), at least 1200 mg/g, at least 1500 mg/g, at least 1600 mg/g, at least 1700 mg/g, at least 1800 mg/g, or at least 1900 mg/g. In some embodiments, the selenium nanomaterials preferably exhibit a maximal load or maximal removal capacity of up to 1800 milligrams mercury per gram selenium (mg/g), up to 1900 mg/g, up to 2000 mg/g, up to 3000 mg/g, or up to 4000 mg/g.

In some embodiments, the maximal load or maximal removal capacity can be calculated using the following equation:

$$Q_e = \frac{C_i - C_f}{m} \times V$$

where $C_i$ is the initial concentration of mercury ions in the solution (mg/L), $C_f$ is the final concentration of mercury ions in the solution (mg/L), m is the mass of adsorbent (g/L), V is the volume of the solution (L), and $Q_e$ is the amount of metal ion adsorbed in gram per gram of adsorbent at equilibrium (g/g).

In another aspect, the present disclosure provides an aqueous dispersion including selenium nanospheres, wherein the aqueous dispersion does not include a polymeric stabilizer or a proteinaceous stabilizer. In some embodiments, the aqueous dispersion includes less than 5% of a monosaccharide, a disaccharide, and/or a polysaccharide; less than 3% of a monosaccharide, a disaccharide, and/or a polysaccharide; or less than 1% of a monosaccharide, a disaccharide, and/or a polysaccharide. In some embodiments, a monosaccharide, a disaccharide, and/or a polysaccharide is present in the aqueous dispersion in an amount insufficient to act as a stabilizer.

In another aspect, the present disclosure provides a composition including non-agglomerated selenium nanospheres, wherein the composition does not include a polymeric stabilizer or a proteinaceous stabilizer. In some embodiments, the composition including non-agglomerated selenium nanospheres includes less than 5% of a monosaccharide, a disaccharide, and/or a polysaccharide; less than 3% of a monosaccharide, a disaccharide, and/or a polysaccharide; or less than 1% of a monosaccharide, a disaccharide, and/or a polysaccharide. In some embodiments, a monosaccharide, a disaccharide, and/or a polysaccharide is present in the composition in an amount insufficient to act as a stabilizer.

In some embodiments, selenium nanospheres—either alone or bound to the surface of a material, as further described below—exhibit substantially irreversible binding with mercury. As used herein, "substantially irreversible binding" is meant to encompass selenium nanomaterials that, when bound to mercury, releases less than 10%, more preferably, less than 8%, and, even more preferably, less than 6% of the adsorbed mercury when exposed to harsh chemical treatments conventionally used for sorbent regeneration from mercury, including the use of thiourea, sodium hydroxide, and/or 12 M hydrochloric acid.

Material Having a Surface

In some embodiments, the selenium nanomaterials are formed on and/or are associated with a surface of a material. In some embodiments, the selenium nanomaterials are bound to the surface of the material. In some embodiments, the selenium nanomaterials are preferably unbound to the surface of the material, that is the selenium nanomaterials can be removed from the surface of the material by treating (e.g., rinsing or washing) the selenium nanomaterials within the material with an aqueous liquid.

In some embodiments, the selenium nanomaterials can be present within an article including a material having unbound selenium nanospheres within the material. In some embodiments, the selenium nanomaterials can be present within an article including a material having selenium nanomaterials bound to the surface thereof. In some embodiments, the article does not include a polymeric stabilizer. In some embodiments, the article does not include a proteinaceous stabilizer. In some embodiments, the article includes less than 5% of a monosaccharide, a disaccharide, and/or a polysaccharide; less than 3% of a monosaccharide, a disaccharide, and/or a polysaccharide; or less than 1% of a monosaccharide, a disaccharide, and/or a polysaccharide. In some embodiments, a monosaccharide, a disaccharide, and/or a polysaccharide is present in the article and/or the material in an amount insufficient to act as a stabilizer.

In some embodiments, the article includes less than 50% w/w, less than 40% w/w, less than 30% w/w, less than 20% w/w, less than 10% w/w, less than 5% w/w, less than 4% w/w, less than 3% w/w, less than 2% w/w, or less than 1% w/w of selenium nanomaterials. In some embodiments, the article includes at least 0.5% w/w, at least 1% w/w, at least 2% w/w, at least 3% w/w, at least 4% w/w, at least 5% w/w, at least 10% w/w, at least 20% w/w, at least 30% w/w, or at least 40% w/w of selenium nanomaterials. In some embodiments, the article and/or the material preferably include activated carbon.

In some embodiments, the material preferably provides a porous solid support including, for example a sponge. In some embodiments, the surface of the material is capable of providing nucleation sites for formation of the selenium nanomaterial.

Suitable materials can be selected from a wide variety of materials including organic materials, inorganic materials, and combinations thereof. Exemplary materials include, but are not limited to, sponges, films, fabrics, non-woven materials, metal-organic frameworks (MOF), activated carbon, and combinations thereof. Exemplary films include, but are not limited to, silicon substrates, glass, metal films, activated carbons, polymeric films, and combinations thereof.

In some embodiments, the material includes an activated carbon. The activated carbon can be in any useful form including, for example, a pellet, a scrubber, or a filter.

In some embodiments, the material preferably includes a polyamide. In some embodiments, the material includes a scleroprotein including, for example, a spongin. In some embodiments, the material preferably includes a natural honeycomb marine sponge (e.g., a member of the phylum Porifera, including, for example, a member of the Demospongiae class).

Optionally, the surface can be a hydroxylated surface. Exemplary materials having a hydroxylated surface include, but are not limited to, materials treated with a monosaccharide, a disaccharide (e.g., sucrose), and/or a polysaccharide. In some embodiments, the hydroxylated surface is preferably provided by a saccharide containing fructose including, e.g., fructose, sucrose, lactulose, turanose etc.

In some embodiments, the material preferably includes a homogeneous saccharide coating on a surface, and even more preferably, a homogenous coating of sucrose.

In some embodiments, the material can include a surface having a water contact angle less than 90 degrees or, more preferably, less than 80 degrees. In some embodiments, such surfaces can be capable of providing nucleation sites to provide unbound selenium nanomaterials. A wide variety of materials having a water contact angle less than 90 degrees can be used. Exemplary materials having a water contact angle less than 90 degrees include, but are not limited to, hydrophilic materials such as polyamide materials which can be, for example, in the form of a natural honeycomb sponge. Certain natural honeycomb sponges that have a polyamide content of about 60 wt.-% have been determined to have a water contact angle of 77 degrees±5 degrees.

One of skill in the art would recognize that water contact angles can be readily measured using well known methods to determine if the water contact angle is less than 90 degrees or greater than 90 degrees. Exemplary methods include, but are not limited to, goniometry.

In some embodiments, the material can include a surface having a water contact angle greater than 90 degrees. In some embodiments, such surfaces can be capable of providing nucleation sites to provide selenium nanomaterials bound to a surface. A wide variety of materials having a water contact angle greater than 90 degrees can be used. Exemplary materials having a water contact angle greater than 90 degrees include, but are not limited to, hydrophobic materials such as polyurethane materials which can be, for example, in the form of a synthetic sponge. Certain polyurethane synthetic sponges have been determined to have a water contact angle of 140±5 degrees.

In some embodiments, a material having selenium materials bound to a surface thereof can exhibit a distribution coefficient, $K_d$ of at least $1*10^8$ mL·g$^{-1}$, at least $5*10^8$ mL·g$^{-1}$, or at least $1*10^9$ mL·g$^{-1}$, where ($K_d$) is defined as:

$$K_d = \frac{(C_0 - C_f)}{C_f} \times \frac{V}{m}$$

where $C_0$ is the initial Hg$^{2+}$ concentration, $C_f$ is the final equilibrium Hg$^{2+}$ concentration. Since removal rate for a NanoSe sponge is, in some embodiments, 100%, the concentration of 0.2 ng·L$^{-1}$ was taken as $C_f$ since it represents the limit of detection of the equipment used for mercury detection. V is the volume of the solution in mL, and m is the mass of sorbent in g. In some embodiments, including, for example, where the material is a polyurethane sponge, the $K_d$ can be at least $1*10^9$ mL·g$^{-1}$. In one embodiment, $K_d$ can be $1.67 \times 10^9$ mL·g$^{-1}$, two orders of magnitude higher than the best values reported for Hg$^{2+}$ sorbents at the time of the invention (Zhang et al. *Nat. Commun.* 2014, 5:5537).

In some embodiments, this $K_d$ is preferably achieved without pretreatment including, for example, pH modification.

In some embodiments, a material having selenium materials bound to a surface thereof can achieve up to 60%, up to 65%, up to 70%, up to 75%, or up to 80%, of its maximal removal capacity within 1 second. In some embodiments, a material having selenium materials bound to a surface thereof can achieve up to 85%, up to 90%, up to 95%, up to 98%, or up to 99% of its maximal removal capacity within 500 seconds. In some embodiments, a material having selenium materials bound to a surface thereof can achieve up to 85%, up to 90%, up to 95%, up to 98%, up to 99%, or up to 100% of its maximal removal capacity within 3600 seconds (1 hour).

In some embodiments, the material can include fibers. In some embodiments, the fibers can have a diameter of at least 5 μm, at least 10 μm, or at least 15 μm. In some embodiments, the fibers can have a diameter of up to 15 μm, up to 20 μm, up to 25 μm, up to 30 μm, up to 40 μm, or up to 50 μm. In some embodiments, the fibers preferably have a diameter in a range of 10 μm to 30 μm.

In some embodiments, the material can have a surface roughness of at least 5 nm, at least 10 nm, at least 15 nm, at least 20 nm, at least 30 nm, at least 40 nm, or at least 50 nm. In some embodiments, the material can have a surface roughness of up to 15 nm, up to 20 nm, up to 30 nm, up to 40 nm, up to 50 nm, or up to 100 nm. In some embodiments, the material preferably has a surface roughness in a range of 10 nm to 20 nm.

In some embodiments, the material has a high surface to volume ratio. In some embodiments, the material preferably permits bulk diffusion of mercury into the material.

In some embodiments, and as further described below, using selenium nanomaterials that are formed on and/or are associated with a surface of a material can increase long term stability of the nanomaterials. In some embodiments, the long-term stability can be determined by measuring the change in nanoparticle size, zeta potential, and/or monodispersity over time. In some embodiments, the nanomaterials described herein are stable for at least 3 months, at least 5 months, at least 6 months, at least 7 months, at least 8 months, at least 9 months, at least 12 months, or at least 24 months. In some embodiments, the nanomaterials described herein are stable for up to 8 months, up to 9 months, up to 12 months, up to 24 months, or up to 36 months. In some embodiments, a nanomaterial that is "stable" can be defined as a nanomaterial that exhibits a change in the average size of the nanomaterials of less than 10%, less than 8%, or less than 5%. In some embodiments, a nanomaterial that is "stable" can be defined as a nanomaterial that exhibits a change in zeta potential of less than 15%, less than 10%, or less than 5% over a defined period of time. In some embodiments, a nanomaterial that is "stable" can be defined as a nanomaterial that exhibits a change in the polydispersity index (PDI) of the nanomaterial of less than 15%, less than 13%, less than 12%, or less than 10% over a defined period of time.

In some embodiments, and as further described below, using selenium nanomaterials that are formed on and/or are associated with a surface of a material can increase Se—Hg interactions.

Methods of Making Selenium Nanomaterials

In another aspect, the present disclosure provides methods of preparing selenium nanomaterials including, for example, selenium nanoparticles.

In some embodiments, the methods of preparing a selenium nanomaterial include: treating a material with a selenous acid solution, and heating the material to form the selenium nanomaterial on a surface of the material.

In some embodiments, the methods of preparing a selenium nanomaterial include combining an aqueous solution of selenous acid with an aqueous solution of a reducing agent in the presence of a material under conditions effective to form the selenium nanomaterial on a surface of the material.

The material can include any of the materials described in this disclosure. The selenium nanomaterial can include any of the selenium nanomaterials described in this disclosure.

In some embodiments, the method includes treating the surface to form a hydroxylated surface. In some embodiments, immobilizing selenous acid on a material includes treating the material by soaking it and/or immersing it in a saccharide solution. In some embodiments, the method includes forming a saccharide coating on a surface of the material. In some embodiments, the saccharide coating is preferably homogeneous.

A saccharide can include, for example, monosaccharide (e.g., fructose), a disaccharide (e.g., sucrose), and/or a polysaccharide. In some embodiments, the hydroxylated surface is preferably provided by a saccharide containing fructose including, e.g., fructose, sucrose, lactulose, turanose etc.

Exemplary saccharide solutions can have a concentration of at least 1 percent (%) saccharide, at least 5% saccharide, at least 10% saccharide, at least 15% saccharide, at least 20% saccharide, at least 25% saccharide, at least 30% saccharide, at least 40% saccharide, or at least 50% saccharide. Exemplary saccharide solutions can have a concentration of up to 5% saccharide, up to 10% saccharide, up to 15% saccharide, up to 20% saccharide, up to 25% saccharide, up to 30% saccharide, up to 40% saccharide, up to 50% saccharide, up to 60% saccharide, up to 80% saccharide, or up to 95% saccharide. In some embodiments, including, the saccharide solution can have a concentration in a range of 20% to 30% saccharide or, in some embodiments, a concentration of 25% saccharide.

The material may be treated with a saccharide solution for a wide range of times, as desired. For example, the material may be treated for at least 1 minute, at least 3 minutes, at least 5 minutes, at least 7 minutes, at least 9 minutes, at least 10 minutes, at least 12 minutes, at least 15 minutes, at least 20 minutes, or at least 30 minutes. For example, the material may be heated for up to 10 minutes, up to 15 minutes, up to 20 minutes, up to 25 minutes, up to 30 minutes, up to 40 minutes, up to 50 minutes, or up to 60 minutes. In some embodiments, the material can be treated with a saccharide solution for a time in a range of 10 minutes to 30 minutes or, in some embodiments, for 15 minutes.

In some embodiments, the method can further include removing excess solution from the material after treatment to form a hydroxylated surface. For example, in embodiments when the material is a sponge, the sponge can be squeezed.

In some embodiments, treating the material with a selenous acid solution includes immobilizing selenous acid on a material. In some embodiments, treating the material with a selenous acid solution includes forming a thin film of selenous acid on a material. In some embodiments, the selenous acid solution is preferably an aqueous solution. In some embodiments, an aqueous selenous acid solution can have a concentration of at least 0.1 M, at least 0.5 M, at least 1 M, at least 2 M, at least 3M. In some embodiments, an aqueous selenous acid solution can have a concentration of up to 1 M, up to 2 M, up to 3M, up to 4 M, up to 5 M, up to 6M, or up to 7M, In some embodiments, an aqueous selenous acid solution can have a concentration in a range of 0.1 M to 6 M. In some embodiments, an aqueous selenous acid solution may preferably have a concentration of 1.4 M. In some embodiments, the material can be immersed in the selenous acid solution. Without wishing to be bound by theory, it is believed that a hydroxylated surface including, for example, a homogeneous sucrose coating on the surface of the material, allows isotropic immobilization of the selenous acid ions by interaction with hydroxyl groups, thus promoting a homogenous growth of nanomaterials. For example, in some embodiments, a homogeneous sucrose coating on a sponge can immobilize selenous acid ions by interaction with sucrose hydroxyl groups, promoting a homogenous growth of nanoparticles.

The material may be treated with a selenous acid solution for a wide range of times, as desired. For example, the material may be treated for at least 1 minute, at least 3 minutes, at least 5 minutes, at least 7 minutes, at least 9 minutes, at least 10 minutes, at least 12 minutes, at least 15 minutes, at least 20 minutes, or at least 30 minutes. For example, the material may be heated for up to 10 minutes, up to 15 minutes, up to 20 minutes, up to 25 minutes, up to 30 minutes, up to 40 minutes, up to 50 minutes, or up to 60 minutes. In some embodiments, the material can be treated with a selenous acid solution for a time in a range of 20 minutes to 40 minutes or, in some embodiments, for 25 minutes or for 30 minutes.

The method of preparing a selenium nanomaterial can be carried out at a wide range of pH conditions as desired. In some embodiments, however, the pH of a selenous acid solution is preferably less than 3, more preferably less than 2.5, or even more preferably less than 2. In some embodiments, the pH of a selenous acid solution is preferably 1.6.

In some embodiments, the conditions effective to form selenium nanomaterials comprise a temperature of 35° C. to 170° C. In some embodiments, a method of preparing selenium nanomaterials includes heating and/or drying the material. In some embodiments, the material may be dried in an oven including, for example, a vacuum oven. The material may be heated at a wide range of temperatures as desired. In some embodiments, the material is preferably heated at a temperature greater than the glass transition temperature of amorphous selenium (31° C.±0.5° C.). In some embodiments, the material may be heated at a temperature and time sufficient to form selenium nanomaterials having an average size of 50 nm to 150 nm. In some embodiments, the material may be heated at a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C. In some embodiments, the material may be heated at a temperature of up to 40° C., up to 45° C., up to 50° C., up to 55° C., up to 60° C., up to 65° C., up to 70° C., up to 75° C., up to 80° C., up to 90° C., up to 100° C., up to 110° C., up to 120° C., up to 130° C., up to 140° C., up to 150° C., up to 170° C., or up to 200° C. The material may be treated with heat for a wide range of times, as desired. For example, the material may be heated for at least 1 minute, at least 3 minutes, at least 5 minutes, at least 7 minutes, at least 9 minutes, at least 10 minutes, at least 12 minutes, at least 15 minutes, at least 20 minutes, or at least 30 minutes. For example, the material may be heated for up to 10 minutes, up to 15 minutes, up to 20 minutes, up to 25 minutes, up to 30 minutes, up to 40 minutes, up to 50 minutes, or up to 60 minutes. In some embodiments including, for example, when the material is a natural honeycomb sponge, the material may be dried in a vacuum oven (at −2.6 kPa) for 10 minutes at 110° C. In some embodiments including, for example, when the material is a polyurethane sponge, the material may be dried in an oven or 2 minutes at 100° C.

In some embodiments, including, for example, when a nanoparticle having an average size of 150 nm or less is desired, the temperature is preferably in a range of 110° C. to 120° C. In some embodiments, increases in temperature or in the time the material is heated or both result in an increase in nanoparticle size. In some embodiments, increases in temperature or in the time the material is heated or both result in an increase in selenium content in the material.

Without wishing to be bound by theory, it is believed that when the selenous acid treated material is heated, the selenium ions present are reduced to elemental selenium ($Se^0$). While the reduction is believed to primarily be caused by the heating, mild vacuum conditions can expedite evaporation of water including, for example, when the material is a sponge. The reduced selenium ions then diffuse and crystalize on the surface of the material under the effect of heat and rapid water evaporation. Surface diffusion of the reduced selenium ions can result in instantaneous growth of 5 nm to 10 nm crystalline SeNS. SeNS having a diameter of 50 nm to 150 nm can be observed after about 5 minutes of treatment. In certain embodiments, increasing the time during which the material is exposed to heat has been found to result in increasing the size of selenium nanomaterials (e.g., spherical particles).

In certain embodiments, the methods include treating the material with a reducing agent. In some embodiments, treating with a reducing agent can form and/or increase the size of the selenium nanomaterials. In some embodiments, the reducing agent is preferably in a solution. For example, the material may be immersed in a solution including a reducing agent including, for example, an aqueous solution.

In some embodiments, for example, initiating or maintaining nanomaterial growth on the material can include immersing the material in a reducing agent solution. A wide variety of reducing agents can be used. Useful reducing agents include, for example, acidic compounds. Exemplary reducing agents include, but are not limited to, hydroquinone, acetic acid, glutathione, and combinations thereof. In some embodiments, the reducing agent solution preferably includes hydroquinone.

Useful concentrations of reducing agents will depend on the reaction conditions and the specific reducing agent being used. For example, when the reducing agent includes hydroquinone, hydroquinone concentrations of 0.1 M to 6 M in the solution can be used. For example, the concentration of the reducing agent can be in a range of 0.1 M to 6 M including, for example, at least 0.1 M, at least 0.2 M, at least 0.3 M, at least 0.4 M, at least 0.5 M, at least 0.6 M, at least 0.7 M, at least 1.0 M, at least 1.5 M, at least 2.0 M, at least 3.0 M, at least 4.0 M, at least 5.0M, at least 5.5 M, or at least 6 M or up to 0.2 M, up to 0.2 M, up to 0.3 M, up to 0.4 M, up to 0.5 M, up to 0.6 M, up to 0.7 M, up to 1.0 M, up to 1.5 M, up to 2.0 M, up to 3.0 M, up to 4.0 M, up to 5.0M, up to 5.5 M, up to 6 M, or up to 7 M. In certain embodiments, increasing concentrations of reducing agent (e.g., hydroquinone) have been found to result in increasing sizes of selenium nanomaterials (e.g., spherical particles), as shown where the reducing agent is hydroquinone in FIG. 26.

In some embodiments, treating with a reducing agent preferably includes heating the material and the reducing agent at a temperature greater than the glass transition temperature of amorphous selenium (31° C.±0.5° C.). For example, the material while placed in a solution including reducing agent can be heated on a hot plate, in a water bath, and/or in an incubator. In some embodiments, the reducing agent may be preheated before being added to the material to a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C. When the reducing agent is hydroquinone, a hydroquinone solution may preferably be preheated to a temperature greater than the crystallization temperature of hydroquinone. In some embodiments, a hydroquinone solution may preferably be preheated to a temperature of at least 65° C.

In some embodiments, the material may be heated at a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C. In some embodiments, the material may be heated at a temperature of up to 40° C., up to 45° C., up to 50° C., up to 55° C., up to 60° C., up to 65° C., up to 70° C., up to 75° C., up to 80° C., up to 90° C., up to 100° C., up to 110° C., up to 120° C., up to 130° C., up to 140° C., up to 150° C., up to 170° C., or up to 200° C. In some embodiments, increases in temperature or in the time the material is heated or both result in an increase in nanoparticle size. In some embodiments, increases in temperature or in the time the material is heated or both result in an increase in selenium content in the material.

In some embodiments, the material may be heated to a temperature of at least 30° C., at least 31° C., at least 35° C., at least 40° C., at least 45° C., at least 50° C., at least 55° C., at least 60° C., at least 65° C., at least 70° C., at least 75° C., at least 80° C., at least 90° C., at least 100° C., at least 110° C., or at least 120° C. In some embodiments, the material may be heated to a temperature of up to 40° C., up to 45° C., up to 50° C., up to 55° C., up to 60° C., up to 65° C., up to 70° C., up to 75° C., up to 80° C., up to 90° C., up to 100° C., up to 110° C., up to 120° C., up to 130° C., up to 140° C., up to 150° C., up to 170° C., or up to 200° C.

The material may be treated with a reducing agent and/or heated for a wide range of times, as desired. For example, the material may be heated for at least 1 minute, at least 3 minutes, at least 5 minutes, at least 7 minutes, at least 9 minutes, at least 10 minutes, at least 12 minutes, at least 15 minutes, or at least 20 minutes. For example, the material may be heated for up to 10 minutes, up to 15 minutes, up to 20 minutes, up to 25 minutes, or up to 30 minutes.

In an exemplary embodiment, a sponge can be treated with a 2.2 M hydroquinone solution for 5 minutes at 65° C.

Without wishing to be bound by theory, it is believed that treating the materials at a temperature greater than the glass transition temperature of selenium can be improve or increase the binding selenium to the material and/or can produce nanoselenium materials that favors high subsurface and bulk diffusion of mercury. The high subsurface and bulk diffusion of mercury increase the loading capacity of the material including, for example, by allowing at least 70% of selenium atoms to interact with and capture (bind to) mercury.

In some embodiments, the method further includes immersing the material in a composition including selenium ions during and/or after the material has been treated with a reducing agent. In some embodiments, the material can be immersed in a selenous acid solution. In some embodiments, the material can be immersed in a selenous acid solution after being treated with a reducing agent. In some embodiments, the material can be treated in a solution that includes selenous acid and a reducing agent at temperatures greater than 35° C. In some embodiments, the selenous acid solution can be preheated to a temperature greater than 35° C. before being placed in contact with the material. The selenous acid solution can in some embodiments be identical to the selenous acid solution used on the material before the material was treated with a reducing agent. The selenous acid solution can in some embodiments be the same selenous acid solution used on the material before the material was treated with a reducing agent.

In certain embodiments, conditions effective to form the selenium nanomaterials include the substantial absence of a polymeric stabilizer. As used herein, the "substantial absence" of a polymeric stabilizer means that a polymeric stabilizer has not been intentionally added, and, if present, is preferably present at less than 5 wt.-%. Methods of preparing selenium nanomaterials known in the art have used polymeric stabilizers such as polyvinyl alcohol, polysaccharides, and chitosan.

In certain embodiments, conditions effective to form the selenium nanomaterials include the substantial absence of a proteinaceous stabilizer. As used herein, the "substantial absence" of a proteinaceous stabilizer means that a proteinaceous stabilizer has not been intentionally added, and, if present, is preferably present at less than 5 wt.-%. Methods of preparing selenium nanomaterials known in the art have used proteinaceous stabilizers such as BSA.

In certain embodiments, conditions effective to form the selenium nanomaterials include the use of a monosaccharide, a disaccharide, and/or a polysaccharide. In certain embodiments, conditions effective to form the selenium nanomaterials include the substantial absence of a saccharide/polysaccharide stabilizer. As used herein, the "substantial absence" of a saccharide/polysaccharide stabilizer means that a saccharide has not been added to act as a stabilizer, and, if present, is preferably present at less than 5 wt.-%. In some embodiments, a monosaccharide, a disaccharide, and/or a polysaccharide is present in the material in an amount insufficient to act as a stabilizer.

Selenium nanomaterials formed by the methods disclosed herein can have a wide variety of forms such as nanospheres, nanofilms, nanorods, nanowires, nanostars, nanodomes, or combinations thereof.

In a further aspect, the present disclosure provides a method of preparing selenium nanomaterials including combining an aqueous solution of selenous acid with an aqueous solution of a reducing agent in the presence of a surface capable of providing nucleation sites under conditions effective to form selenium nanomaterials.

In some embodiments, methods of preparing selenium nanomaterials can further include preparing a dispersion of selenium nanomaterials (e.g., selenium nanospheres). In one embodiment, the method includes treating the material with an aqueous liquid to provide a dispersion of the selenium nanomaterials. In some embodiments, the material preferably has unbound selenium nanomaterials within the material prior to treatment with the aqueous liquid.

In some embodiments, methods of preparing selenium nanomaterials can further include includes quenching and/or washing the material including, for example, in an ice bath or with nanopure water. In some embodiments, the material preferably has bound selenium nanomaterials.

In some embodiments, the method further includes separating the dispersion of selenium nanomaterials by size. A variety of techniques may be used to separate nanomaterials of different sizes including, for example, centrifugation or filtration.

In some aspects, the present disclosure provides a method of preparing unbound selenium nanomaterials. In one embodiment, the method includes combining an aqueous solution of selenous acid with an aqueous solution of a reducing agent in the presence of a surface capable of providing nucleation sites under conditions effective to form selenium nanomaterials, wherein the surface capable of providing nucleation sites is provided by a material having a water contact angle of less than 90 degrees.

In another aspect, the present disclosure provides a method of preparing selenium nanomaterials bound to a surface. In one embodiment, the method includes: combining an aqueous solution of selenous acid with an aqueous solution of a reducing agent in the presence of a surface capable of providing nucleation sites under conditions effective to form selenium nanomaterials, wherein the surface capable of providing nucleation sites is provided by a material having a water contact angle of greater than 90 degrees.

Methods of Using Selenium Nanomaterials Bound to a Surface

In another aspect, the present disclosure provides methods for using the selenium nanomaterial described herein.

Mercury Removal

In one aspect, the present disclosure provides a method for removing mercury from air or water, the method includes exposing the air or water to any one of the articles, dispersions, or compositions comprising selenium nanomaterials disclosed herein.

In some embodiments, the method includes removing at least 95%, at least 98%, at least 99%, at least 99.5%, at least 99.9%, and/or up to 100% of mercury from contaminated water. For example, a method could include removing mercury from water contaminated having 10 ppm mercury to yield water having less than 0.004 ppm mercury.

Anti-Microbial Applications

In another aspect, the present disclosure provides a method of killing or inhibiting the growth of microorganisms, the method including exposing the microorganisms to any one of the articles, dispersions, or compositions comprising selenium nanomaterials disclosed herein.

For example, a material including selenium nanomaterials can be used in building systems (e.g., joints, ventilation systems, pipes, humid areas) to prevent the growth of molds. In some embodiments, a sponge or other material including selenium nanomaterials described herein can be used for surface cleaning.

The present invention is illustrated by the following examples. It is to be understood that the particular examples, materials, amounts, and procedures are to be interpreted broadly in accordance with the scope and spirit of the invention as set forth herein.

EXAMPLES

Example 1

I. Invention and Products Disclosed:
 a. Methods of growing nanoselenium (NanoSe films or nanostructures) on different supports including porous materials (sponges, metal-organic frarneworks, . . . ), thin films and surfaces (glass, silicon, . . . ).
 b. Devices that can be used to remove mercury from wastewater, stormwater ponds, wetlands and from surface waters such as lakes and rivers.
 c. Products treated with our methods to provide new properties or functionalities
 d. Methods for producing colloidal selenium nanospheres (SeNS)

II. Supported Growth of NanoSe Materials and Application for Mercury Removal
 1. Summary Selenium (Se) interacts strongly with mercury (Hg) and forms inert and non-toxic precipitates (SeHg).[1] The use of selenium nanomaterials can significantly increase the surface area of this interaction and enable enhanced mercury removal from contaminated water and gas. Here, we report novel methods to grow nanoselenium (NanoSe), including selenium nanoparticles (SeNP) and selenium nanofilms (SeNF) directly on organic or inorganic supports (sponge, metal organic frameworks, and other porous materials). This development will lead to the design of new systems and devices for mercury removal from water and flue gases. A proof of concept have been demonstrated by the development of a NanoSelenium Sponge capable of removing over 99.95% of mercury from water within few minutes and before even we optimize the process. Beyond mercury removal, the developed SeNP and SeNF processes can find applications in catalysis, solar cells, surface coating and other industries where selenium is used.

2. Statement of Need and Significance:

The urgent need for cost-effective mercury removal technologies is clearly justified by the major ad global threat that mercury causes to aquatic life but also to human health by entering the food chain. Two thirds of the waters on Minnesota's 2004 Impaired Waters List are impaired because of mercury contamination that ranges from 0.27 to 12.43 ng/L (the EPA limit is 2 ng/L).[2] Mercury contamination of lake waters results in mercury accumulation in fish, leading the Minnesota Department of Health to establish fish consumption guidelines. A number of fish species store-bought or caught in Minnesota lakes are not advised for consumption more than once a week or even once a month. In Minnesota's North Shore, 10% of tested newborns had mercury concentrations above the EPA reference dose for methylmercury (the form of mercury found in fish).[3] This means that some pregnant women in the Lake Superior region, and in Minnesota, have mercury exposures that need to be reduced.

3. State of the Art in Mercury Removal

A number of technologies have been developed to remove mercury from water, including Precipitation/coprecipitation, adsorption, membrane filtration, and biological treatment[4]

In 2007, a company named Pacific Northwest National Laboratory (PNNL) developed a new method on pilot scale. They prepared Thiols Self-Assembled Monolayers on Mesoporous Silica (Thiol SAMMS) to remove mercury from industrial waste. Their method showed efficiency around 0.2 ppm [5]. The role of thiols in capturing mercury is very well documented. With the increased interest in metal organic frameworks and porous organic polymers (MOFs and POPs), numerous groups have prepared thiol containing MOFs and POPs to capture mercury from water and vapors [6-10]. However, beside the high cost of these technologies to operate on a large scale, they are based on capturing mercury with instable complexes that could represent health risk when leaked into the environment. The novel sponge technology is extremely cost-effective and is based on the formation of permanent and non-toxic complexes of mercury with other materials.

4. Technology Description 4.1. Concept and Innovative Aspects

To the best of our knowledge, this work is the first to grow nanoselenium materials directly on solid supports including sponge and other porous materials and surfaces. Most reported research in literature synthesize their selenium nanoparticles first and then immerse the material to be coated in the nanoparticle solution. This also the first use of nanoselenium sponge to remove mercury from water. Another innovative aspect is the production of large colloidal selenium nanospheres (50-500 nm) with chemical synthesis, without using microbial processes as it is currently done.

4.2. Competitive Advantages of Using NanoSe

The most commonly used mercury sorbents are based on thiol-functionalized materials such as activated carbon. However, despite the very high formation constants ($10^{15}$-$10^{17}$) of thiol-mercury (S—Hg) complexes, [64] the S—Hg interaction is extremely labile and can undergo rapid ligand exchange reactions in aqueous solutions or biological systems [67-70], which causes a high risk if the activated carbon materials are released into the environment. Selenium is known to capture mercury with exceptionally high binding affinity with a constant of $10^{45}$; one-million-fold higher than the binding affinity between Hg and sulfur which is largely used in mercury sorbents.[11] As a result, the interaction between Se and Hg yields a biologically inert and stable SeHg precipitates, with extremely low solubility ($10^{-59}$ to $10^{-65}$) as compared to that of HgS precipitates ($10^{-52}$),[1] and thus present a much lower health risk. The use of NanoSe significantly increases the surface area for Se—Hg interaction and thus improves the removal capacity for mercury.

4.3. Advantages of Growing NanoSe Directly on Solid Supports

Easy, rapid and cheap growth procedures

Homogenous coverage

No leakage of selenium particles after washing or during use

Monodisperse nanostructures

A variety of shapes including nanoparticles, microspeheres and nanodomes

Possibility to produce nanoselenium thin films

In the case of mercury capture, the nanoselenium sponge will make it easy to collect mercury and dispose it for further treatment without a risk of leakage into the environment.

Today, nanoselenium is used in form of aggregates for mercury capture (sometimes called unstabilized nanoselenium).[12, 13]. When single selenium nanoparticle are stabilized by coating them with a ligand, the nanoparticles become ineffective for mercury capture, probably due to inaccessibility of mercury to the selenium surface. Growing selenium nanoparticles on solid supports such sponge allows the use of single nanoparticles (not aggregates) and thus dramatically increases the surface area for mercury capture.

4.4. Experimental Procedures and Results a. Conventional Procedure for Nanoselenium Synthesis Conventional synthesis of nanoselenium particles was performed according to Kumar et al [14]. By using selenous acid (100 mL, 1.4 mol dm3) and hydroquinone (50 mL, 2.2 mol dm3). Both solutions were prepared by dissolving the respective compounds in deionized water.

Hydroquinone was heated at 65° C. with stirring and after maintaining the selenous acid 65° C. for 10 min, the selenous acid was added quickly to the hydroquinone. While holding the temperature at 65° C., the stirring was continued for 30 more minutes to ensure the complete reduction of selenium.

b. Adsorption of NanoSe on Sponge

1. Sponge was weighed (0.37 g), washed with nanopure water and dried in oven at 110° C. for 30 min.
2. It was then soaked in 25% sucrose solution for 15 min,
3. The sponge was squeezed to remove excess sucrose.
4. Sponge was soaked in as prepared NanoSe solution from the procedure mentioned above for 15 min.
5. Sponge was then taken out and squeezed and put in oven for drying
6. After drying, the sponge was washed many times with large quantities of nanopure water until no leaking of NanoSe was observed in water.
7. Sponge was dried in oven and used to test mercury capture efficiency.

c. Sponge-Supported Growth of NanoSe

Commercially available sponge (0.37 g) was treated as follows:

Method #1

1. Sponge was washed with nanopure water and dried in oven at 110° C. for 30 min.
2. It was soaked in 25% sucrose solution for 15 min,
3. Then it was taken out and squeezed to remove excess sucrose.
4. Sponge was soaked in selenous acid for 30 min.
5. When hydroquinone, for synthesis of NanoSe was ready, this sponge alongwith rest of solution was put into this solution. After that synthesis procedure was followed till end.
6. Sponge was taken out and squeezed and put in oven for drying 7. After that it was washed many times with large nanopure water until no leaking of NanoSe was seen in water.

8. The sponge was dried in oven and used for testing mercury capture efficiency.

Method #2

1. Sponge was washed with nanopure water and dried in oven at 110° C. for 30 min.

2. It was soaked in 25% sucrose solution for 15 min,

3. Then it was taken out and squeezed to remove excess sucrose.

4. Sponge was soaked in selenous acid for 30 min.

5. Then sponge was taken out without squeezing and put in oven to dry.

6. Once dry, the sponge was immersed in hydroquinone solution and heated for 10 min at 65° C.

7. Then, more selenous acid was added to the mixture to allow NanoSe synthesis

8. Sponge was taken out and squeezed and put in oven for drying

9. After that it was washed many times with nanopure water until no leaking of NanoSe was seen in water.

10. The sponge was dried in oven and used for testing mercury capture efficiency.

Method #3

1. Sponge was washed with nanopure water and dried in oven at 110° C. for 30 min.

2. It was soaked in 25% sucrose solution for 15 min,

3. Then it was taken out squeezed to remove excess sucrose.

4. Sponge was soaked in selenous acid for 15 min.

5. Hydroquinone solution is heated at 65° C. for 10 min, then the sponge along with the rest of selenous acid solution was added to the heated hydroquinone solution. When solution turns orange (approximately after 15 min), the beaker was placed on ice immediately and left for 30 min to stop the reaction.

6. After that, the sponge was taken out and squeezed to remove excess selenous acid, put in oven at 110° C. until it turns brown (approximately after 30 min).

7. It was washed many times with nanopure water until no leaking of NanoSe was seen in water.

8. The sponge was dried in oven and used for testing mercury capture efficiency.

Method #4

9. Sponge was washed with nanopure water and dried in oven at 110° C. for 30 min.

10. It was soaked in 25% sucrose solution for 15 min,

11. Then it was taken out squeezed to remove excess sucrose.

12. Sponge was soaked in selenous acid for 15 min.

13. Hydroquinone solution is heated at 65° C. for 10 min, then the sponge was squeezed and released to uptake hydroquinone. Sponge was taken out and put in oven at 110° C. After 30 min, 1 mL of selenous acid was added to the sponge and it was squeezed and released to uptake solution and then left in oven for 1.30 h.

14. After that, the sponge was taken out and squeezed to remove excess selenous acid and then put in oven at 110° C. for 30 min (until it dries)

15. It was washed many times with nanopure water until no leaking of NanoSe was seen in water.

16. The sponge was dried in oven and used for testing mercury capture efficiency.

d. Mercury Removal Efficiency using NanoSe Materials Grown with Different Methods Mercuric ion removal efficiency was verified by preparing 7-8 ppm solution of $HgCl_2$. The sponges were then soaked in the Hg solution (volume equivalent to uptake capacity of sponge) for 30 min. The water was retrieved by squeezing, and then analyzed for mercury content at the Soil Testing Lab at the University of Minnesota. The results are shown in Table 1.

Figure 2:
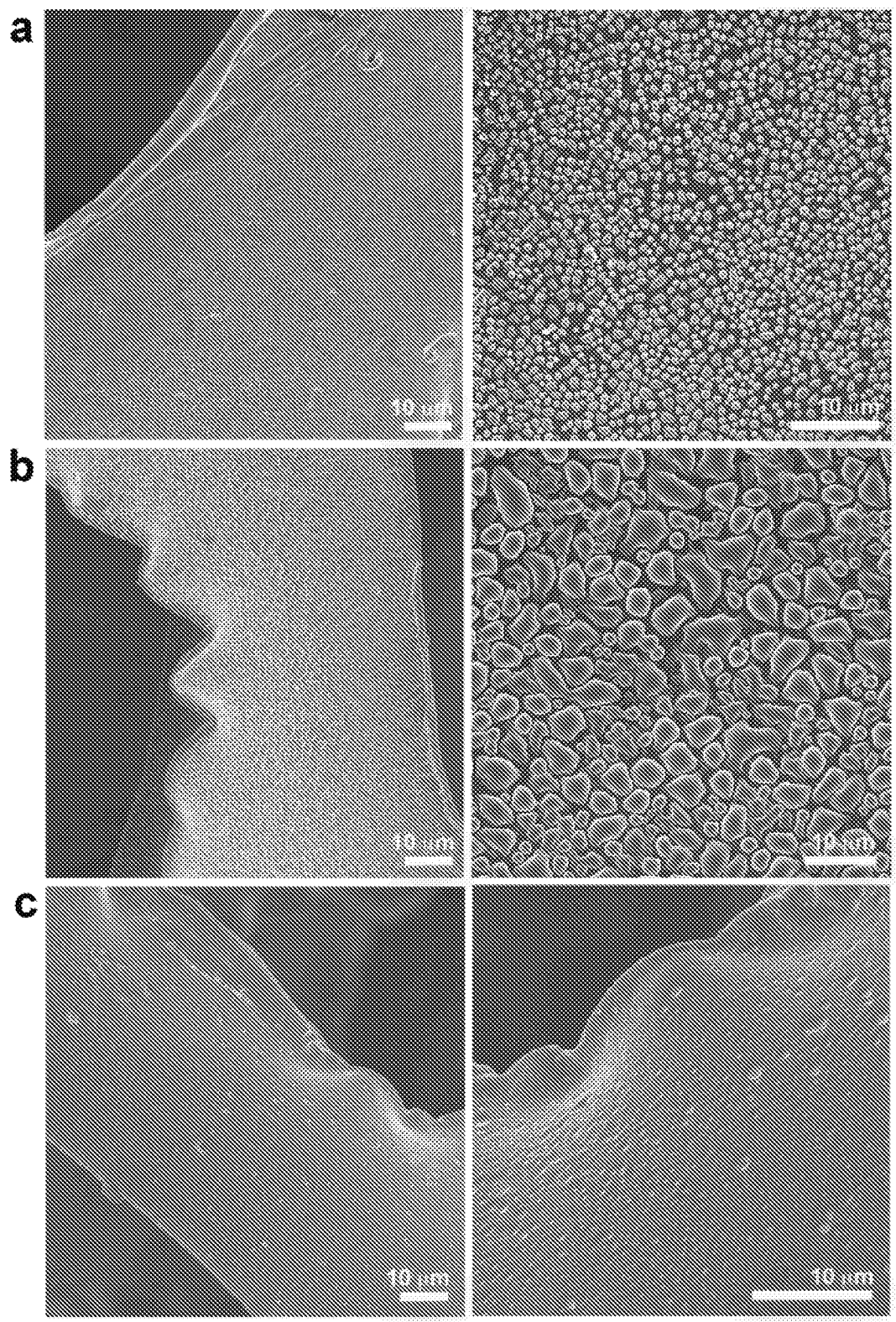
FIG. 2 shows scanning electron microscopy images (SEMs) of an exemplary cellulose sponge obtained using (a) Method #1, (b) Method #2, and (c) Method #3 of Example 1.
Figure 3:
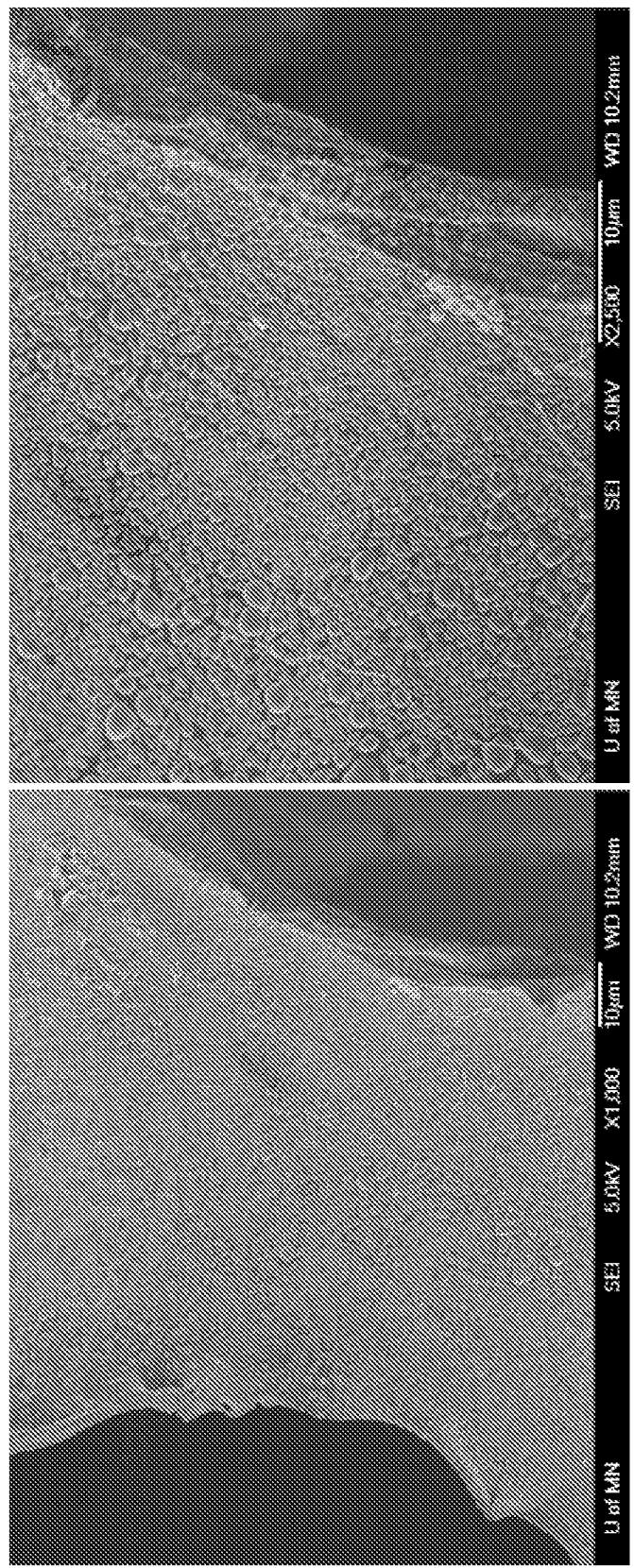
FIG. 3 shows scanning electron microscopy (SEM) images of an exemplary cellulose sponge obtained using Method #4 of Example 1.
Figure 4:
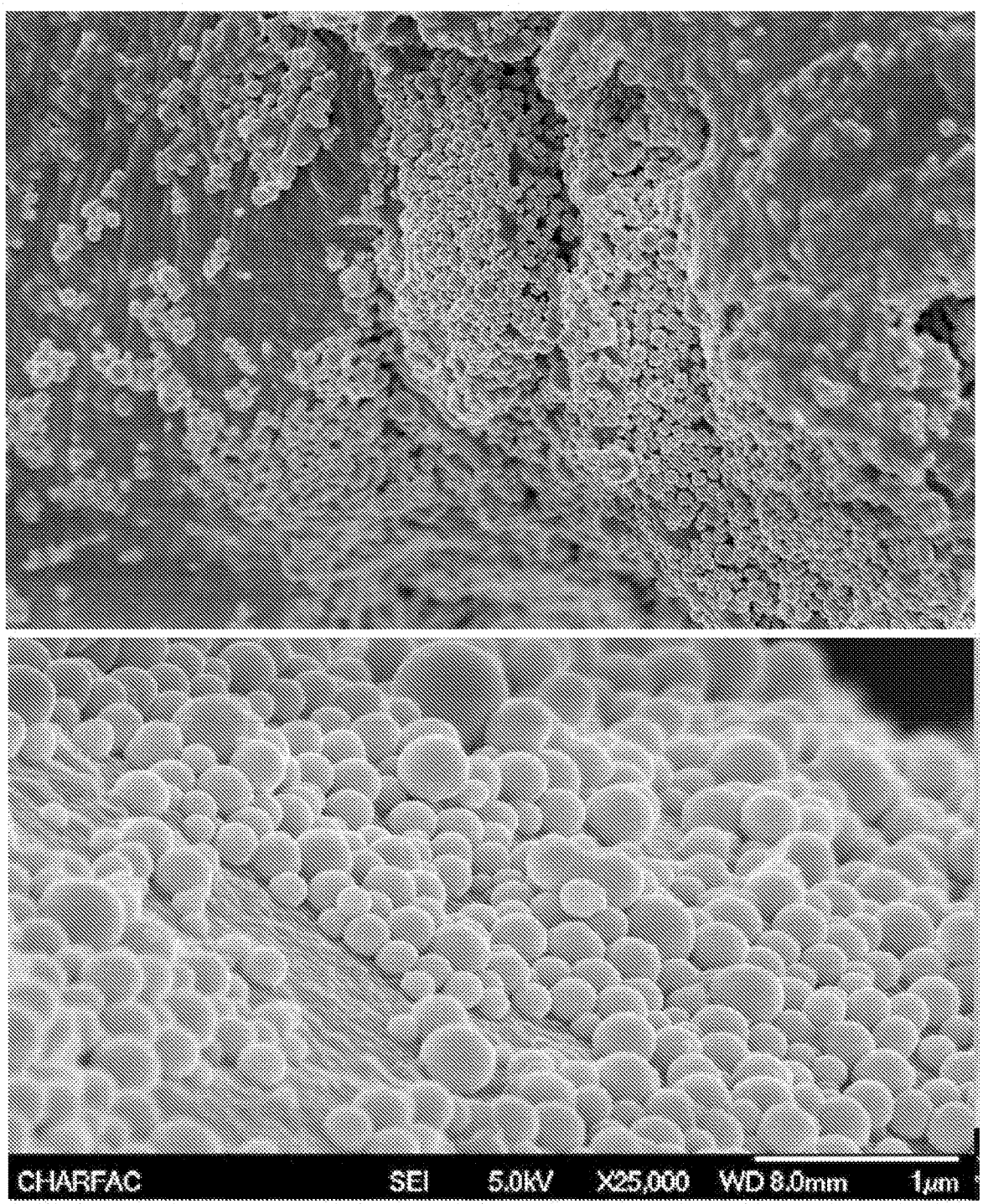
FIG. 4 shows growth of monodisperse selenium nanospheres (50 nm to 500 nm) on an exemplary natural honeycomb sponge.

Results: The results showed that selenium adsorbed and as well as grown on sponge was very efficient in removing mercury (Hg). Even with very high concentration of Hg, total mercury was detected in parts per billion (ppb) which is well below the EPA limit for drinking water (2 ppb) and fish contamination. Although all the different treatments that were done on the sponges showed results in ppb, the sponge which was treated with Method #2 showed impressive results by decreasing mercury content from 8 ppm to 0.0046 pm (Table 1), which corresponds to 99.95% removal efficiency, higher than the state of the art mercury adsorbents.[9, 10] The SEM images also showed that the sponge treated with method #3 and #4 exhibits better control on particle size (monodispersity), coverage and distribution on the surface of the sponge as compared to other methods (FIGS. 1, 2 and 3).

TABLE 1

Efficiency of mercury removal by NanoSe sponge prepared with different methods

| Sponge treatment | Total mercury in (ppm) left in water after treating with NanoSe sponge. (original Hg concentration: 8 ppm) |
|---|---|
| Adsorbed NanoSe | 0.76 |
| Method # 1 | 1.02 |
| Method # 2 | 0.0046 |
| Method # 3 | 0.18 |
| Method # 4 | 0.33 |

IV. Market of Mercury Removal 5.1. Current Needs

Mercury Removal from Water

Mercury capture from rain water using wetlands (EPA)

Mercury removal from water in the mining and petroleum industries

Mercury removal from surface waters such as lakes and rivers (currently not done because of lack of suitable technological solutions)

Mercury removal in waste water treatment plants

Mercury Removal from Gas Emissions

Coal-fired plants; In the US only, they are over 1,100 coal-fired plants, which emit around 48 tons of mercury per year.

Cement industry, petroleum and gas industries

III. Methods for Chemical Synthesis of Colloidal Selenium Nanospheres

1. State of the Art and Novelty

A number of companies including Sigma-Aldrich, American Elements and Nanocs commercialize selenium nanoparticles with a diameter<200 nm (limited size). So far, the only method that provide good quality selenium nanospheres up to 500 nm diameter uses bacteria and other microorganisms that produce the nanospheres after a few days of cell culture.[17, 18]. A patent on the bacterial process was published in 2010. [19]. Here we report a simple, rapid and cheap chemical method that produces perfectly spherical nanospeheres (50-500 nm) in less than an hour.

2. Technology Description

The use of method #3 to grow nanoselenium on a natural honeycomb sponge leads to the synthesis of monodisperse and perfectly spherical selenium nanospheres (SeNS) (FIG.

4). The same nanospheres can be grown on other sponges or materials by modifying the surface tension and control the interface forces of the material. The SeNP can be retrieved in solution to obtain colloidal SeNP by using one of the 3 methods:
- Sonicating the sponge in the presence of a surfactant
- Coating the sponge with a hydrosoluble or thermosoluble film before the growth of nanoselenium particles.
- Dissolve the cellulose composing the sponge to release the nanoparticles 3. Applications:

Recent reports revealed that selenium nanoparticles have a number of useful properties including:
- Optoelectric properties (converting light into electricity), [20] which could be useful in the fabrication of solar cells, photosensor detectors and photocopiers
- Antimicrobial properties, which can have applications in coating medical devices or surfaces.[21, 22]
- Bioprotective activity, such as nephroprotection [23].
- Antitumoral activity, which could be used for cancer treatment by inducing apoptosis in tumor cells[24]

REFERENCES

1. Zhang, H., et al., *Selenium in Soil Inhibits Mercury Uptake and Translocation in Rice (Oryza sativa L.).* Environmental Science & Technology, 2012. 46(18): p. 10040-10046.
2. Monson, B. and S. Heiskary, *Water Mercury Concentrations in Minnesota Lakes.* 2008, Minnesota Pollution Control Agency.
3. McCann, P., *Mercury Levels in Blood from Newborns in the Lake Superior Basin* 2011, Minnesota Department of Health
4. Agency, U.S.E.P., *Treatment Technologies for Mercury in Soil, Waste, and Water* 2007.
5. Mattigod S V, G. F., and K E Parker, *A Thiol-functionalized Nanoporous Silica Sorbent for Removal of Mercury from Actual Industrial Waste*, in Environmental Applications of Nanomaterials: Synthesis, Sorbents and Sensors. 2007. p. 275-283.
6. Liu, T., et al., *Alkenyl/Thiol-Derived Metal-Organic Frameworks (MOFs) by Means of Postsynthetic Modification for Effective Mercury Adsorption.* Chemistry—A European Journal, 2014. 20(43): p. 14090-14095.
7. Samiey, B., C.-H. Cheng, and J. Wu, *Organic-Inorganic Hybrid Polymers as Adsorbents for Removal of Heavy Metal Ions from Solutions: A Review.* Materials, 2014. 7(2): p. 673-726.
8. Sohrabi, M., *Preconcentration of mercury(II) using a thiol-functionalized metal-organic framework nanocomposite as a sorbent.* Microchimica Acta, 2014. 181(3-4): p. 435-444.
9. Yee, K.-K., et al., *Effective Mercury Sorption by Thiol-Laced Metal-Organic Frameworks: in Strong Acid and the Vapor Phase.* Journal of the American Chemical Society, 2013. 135(21): p. 7795-7798.
10. Li, B., et al., *Mercury nano-trap for effective and efficient removal of mercury(II) from aqueous solution.* Nat Commun, 2014. 5.
11. Khan, M. A. K. and F. Wang, *Mercury-selenium compounds and their toxicological significance: Toward a molecular understanding of the mercury-selenium antagonism.* Environmental Toxicology and Chemistry, 2009. 28(8): p. 1567-1577.
12. Johnson, N. C., et al., *Mercury Vapor Release from Broken Compact Fluorescent Lamps and In Situ Capture by New Nanomaterial Sorbents.* Environmental Science & Technology, 2008. 42(15): p. 5772-5778.
13. Hurt, R. H., et al., *Nanostructured sorbent materials for capturing environmental mercury vapor.* 2013, Google Patents.
14. Ajeet Kumar, I. S., Dan V. Goia, *Synthesis of selenium particles with various morphologies.* Journal of Colloid and Interface Science, 2006. 416: p. 119-123.
15. Sawyer, J., *Mercury removal from water.* 2012, Google Patents.
16. Lee, K., *Nanosorbents and methods of use thereof.* 2012, Google Patents.
17. Debieux, C. M., et al., *A bacterial process for selenium nanosphere assembly.* Proceedings of the National Academy of Sciences, 2011. 108(33): p. 13480-13485.
18. Oremland, R. S., et al., *Structural and Spectral Features of Selenium Nanospheres Produced by Se-Respiring Bacteria.* Applied and Environmental Microbiology, 2004. 70(1): p. 52-60.
19. Prokisch, J. and M. A. Zommara, *Process for producing elemental selenium nanospheres.* 2010, Google Patents.
20. Dong, H., et al., *Colloidally stable selenium@copper selenide core@shell nanoparticles as selenium source for manufacturing of copper-indium-selenide solar cells.* Journal of Colloid and Interface Science, 2014. 415(0): p. 103-110.
21. Tran, P. A. and T. J. Webster, *Antimicrobial selenium nanoparticle coatings on polymeric medical devices.* Nanotechnology, 2013. 24(15): p. 155101.
22. Wang, Q. and T. J. Webster, *Nanostructured selenium for preventing biofilm formation on polycarbonate medical devices.* Journal of Biomedical Materials Research Part A, 2012. 100A(12): p. 3205-3210.
23. Li, Y., et al., *Functionalized selenium nanoparticles with nephroprotective activity, the important roles of ROS-mediated signaling pathways.* Journal of Materials Chemistry B, 2013. 1(46): p. 6365-6372.
24. Huang, Y., et al., *Selective cellular uptake and induction of apoptosis of cancer-targeted selenium nanoparticles.* Biomaterials, 2013. 34(29): p. 7106-7116.

Example 2

Figure 5:
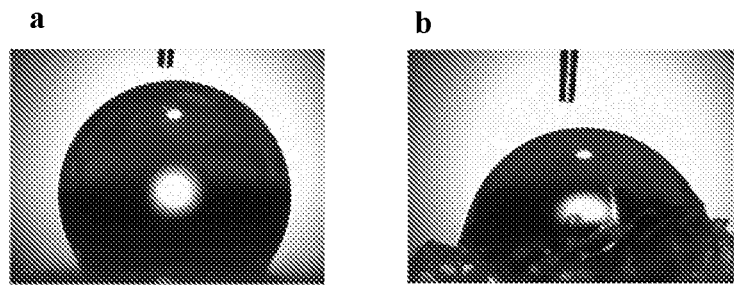
FIG. 5 shows images of a water droplet on (a) an exemplary polyurethane sponge ("Sponge PU") and (b) an exemplary natural honeycomb sponge ("Sponge PA"). The images are illustrative of the average contact angle.
Figure 6:
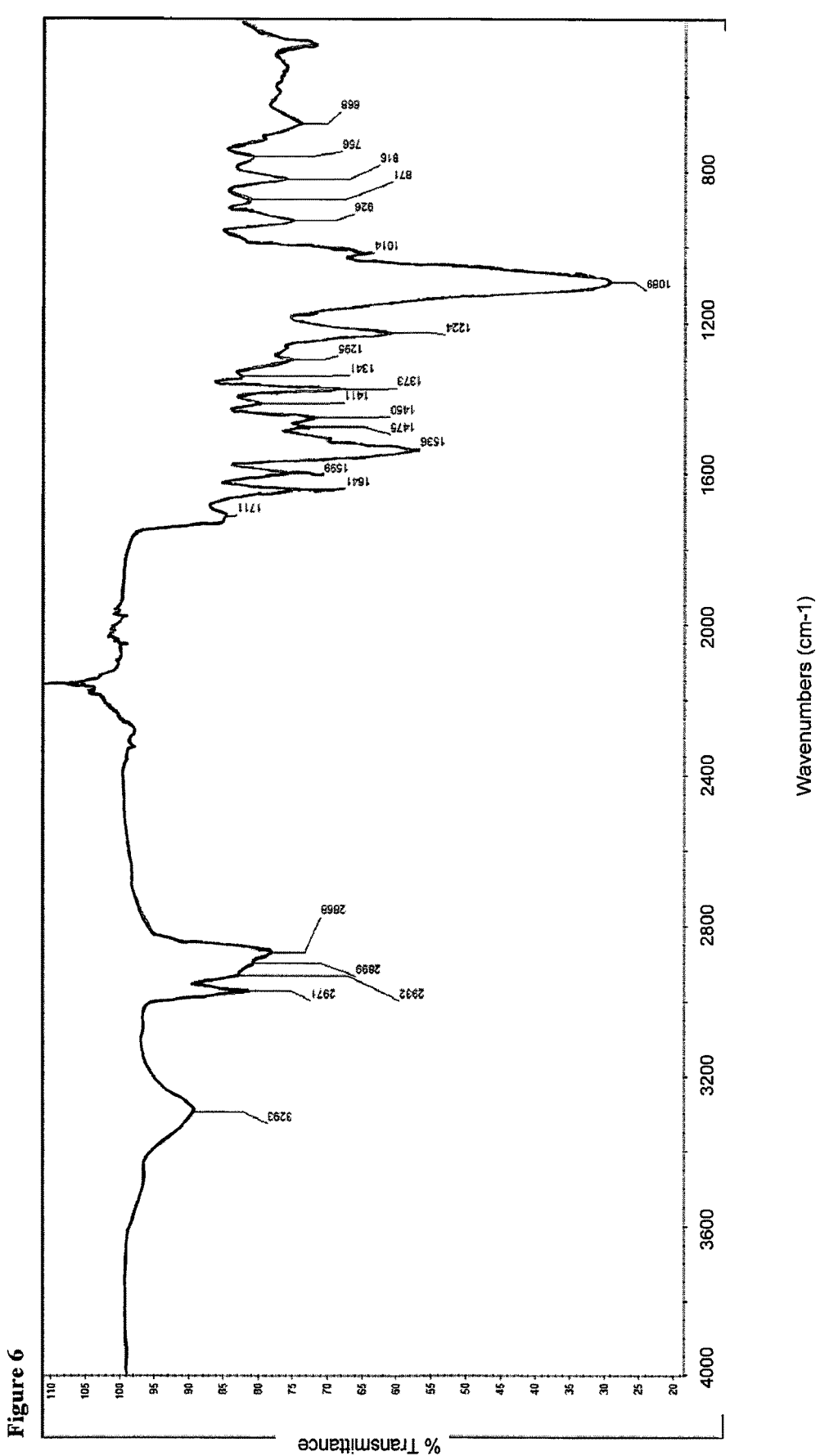
FIG. 6 shows a Fourier transform infrared spectroscopy (FTIR) spectrum of Sponge PU of FIG. 5.
Figure 7:
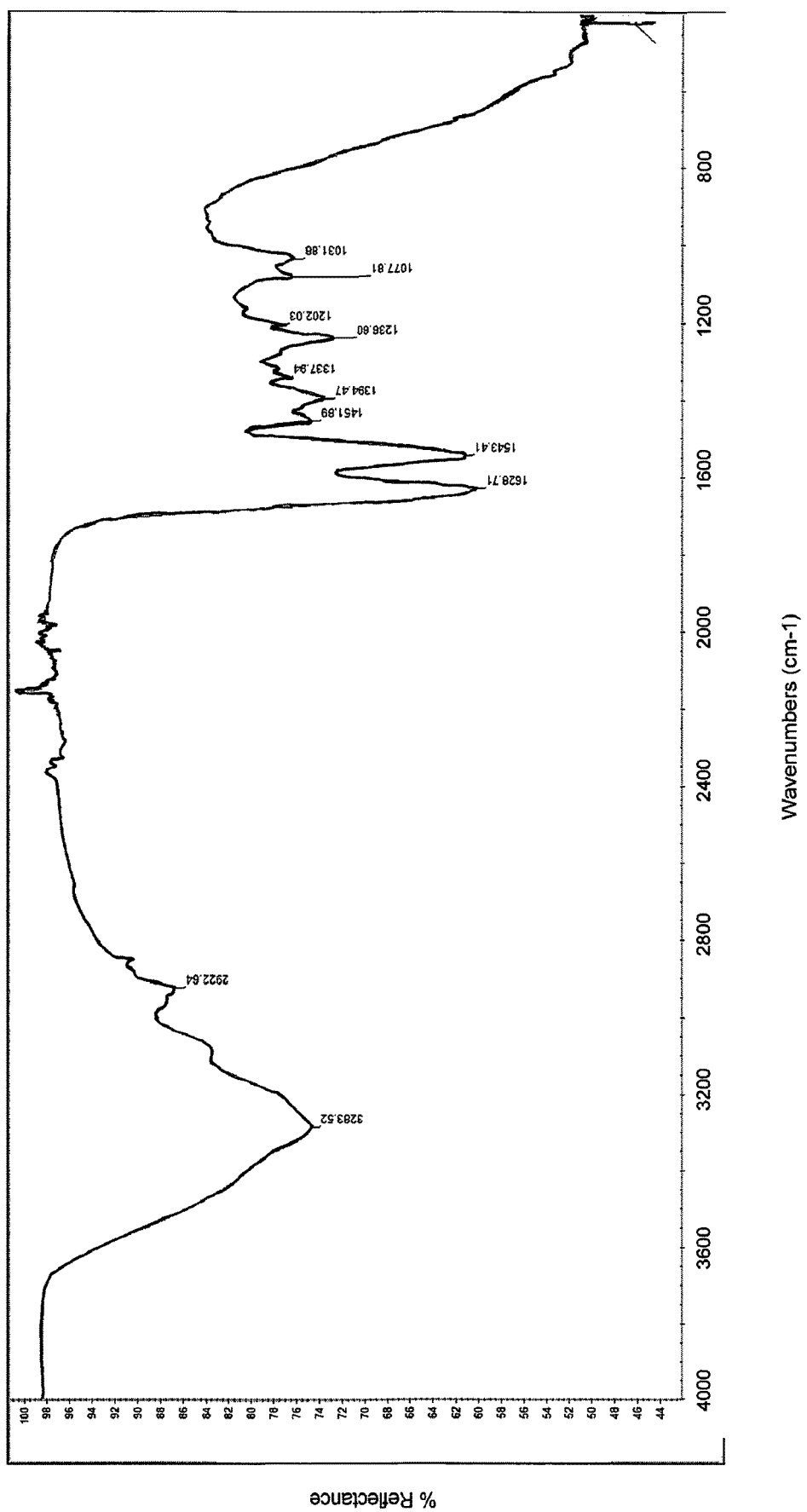
FIG. 7 shows a Fourier transform infrared spectroscopy (FTIR) spectrum of Sponge PA of FIG. 5.

Images illustrating the contact angles of the sponges described in Table 2 are shown in FIG. 5. Results of the Fourier transform infrared spectroscopy (FTIR) analysis of the sponges are shown in FIG. 6 and FIG. 7.

TABLE 2

Characterization of the sponges.

| Sponge type | Average Contact Angle (degree) | Chemical Composition (Spectroscopic analysis by FTIR) | Application/Product |
|---|---|---|---|
| Synthetic sponge (Sponge PU) | 140 ± 5 (highly hydrophobic) | Polyurethane (PU) and its derivatives | Nanoselenium-coated sponge as filters for mercury capture |
| Natural Honeycomb sponge (Sponge PA) | 77 ± 5 (Hydrophilic) | Polyamide (PA) and its derivatives | Synthesis and storage of colloidal selenium nanospheres with a diameter range of 100 nm to 1 micrometer) |

Example 3

This example demonstrates that a selenium nanomaterial can grow on a gold surface, that is, a substrate without hydroxyl (—OH) groups, or a silicon surface.

Figure 8:
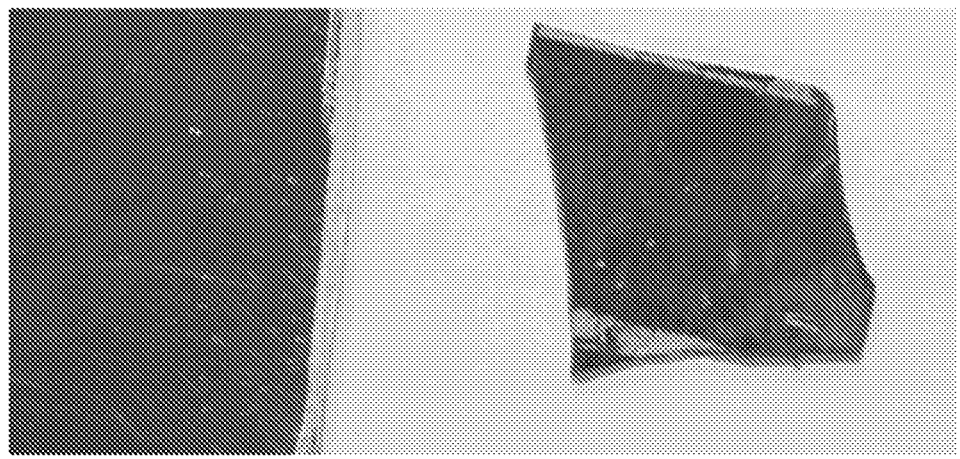
FIG. 8 shows a photograph of an exemplary gold plated surface before (left) and after (right) coating with selenium nanomaterials.
Figure 9:
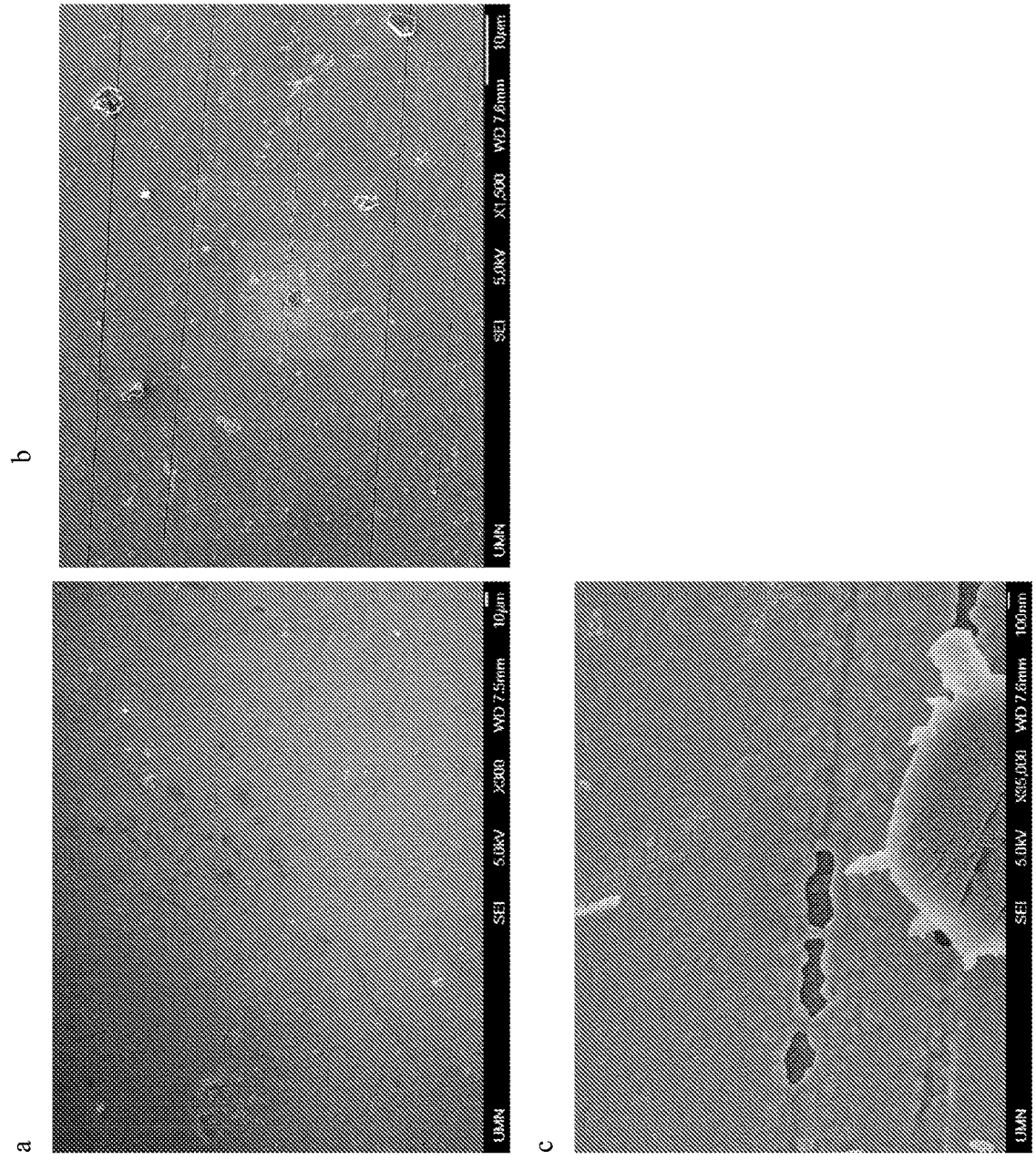
FIG. 9 shows scanning electron microscopy (SEM) images of an exemplary gold plated surface before (a) and after (b,c) coating with selenium nanomaterials.

In a modification of Method #3 of Example 1, a selenium nanofilm was formed on a gold surface by placing gold-coated glass in a 1.4 M selenous acid (SA) solution for 15 minutes, then exposing the surface to 0.7 M a hydroquinone solution for 10 minutes. Growth was stopped by placing the surface on ice when the hydroquinone solution turned orange. A photograph of a representative nanofilm is shown in FIG. 8, and scanning electron microscopy (SEM) images are shown in FIG. 9.

Figure 10:
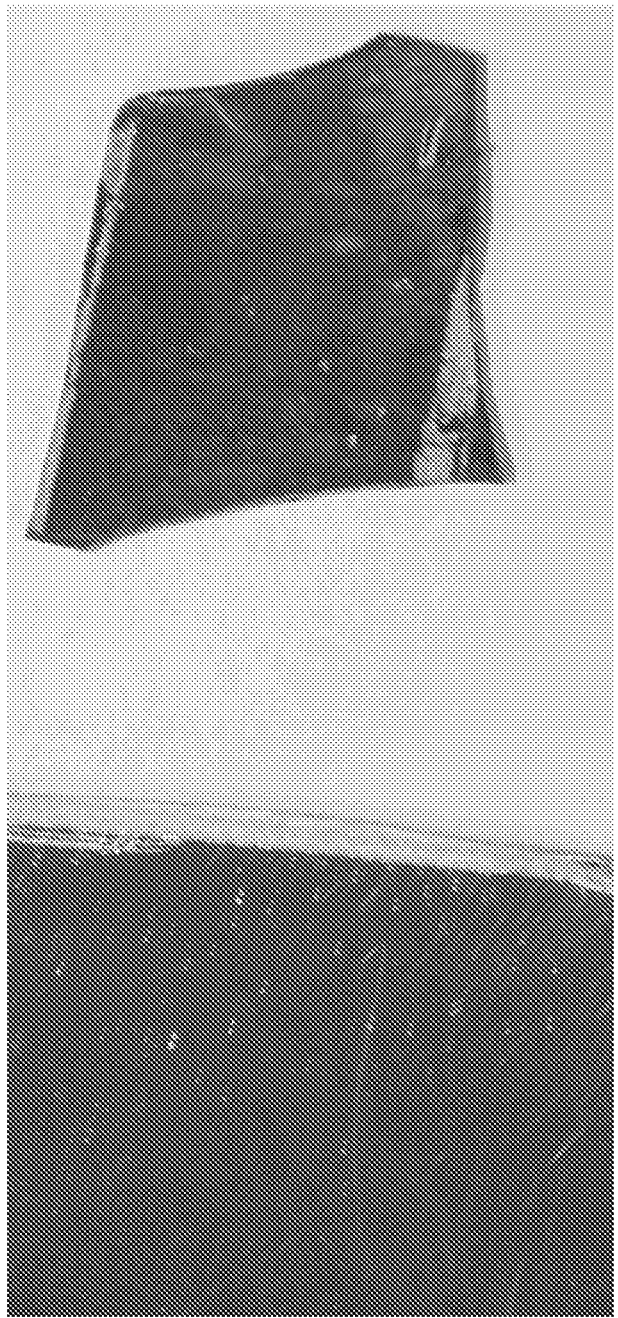
FIG. 10 shows an exemplary gold plated glass before (left) and after (right) coating with a selenium nanofilm.
Figure 11:
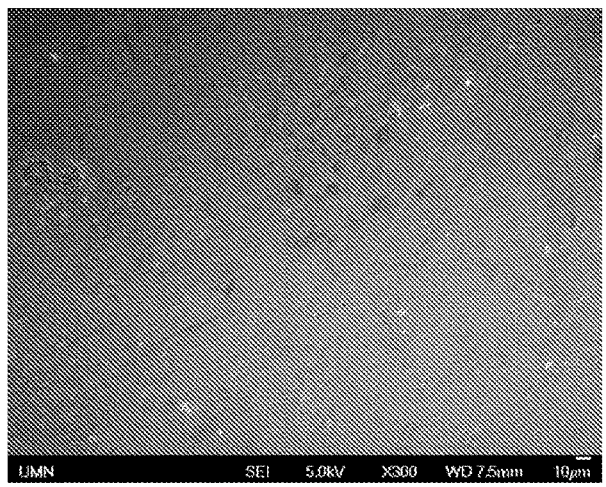
FIG. 11 shows scanning electron microscopy (SEM) images of (a) an exemplary gold plated glass, and an exemplary gold plated surface treated with selenous acid as described in Example 3 (b,c) without and (d, e) with sucrose.
Figure 11:
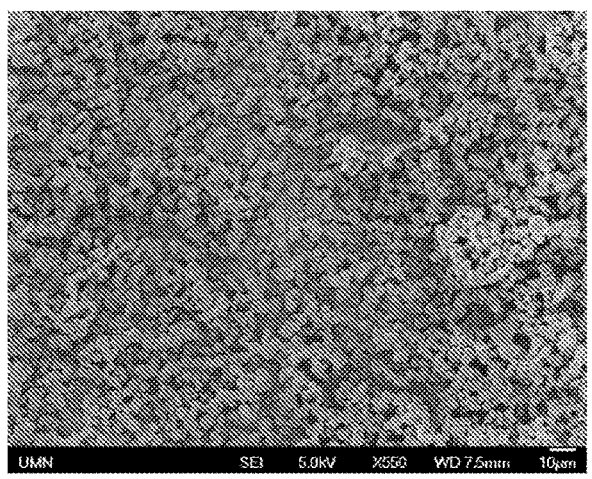
Figure 11:
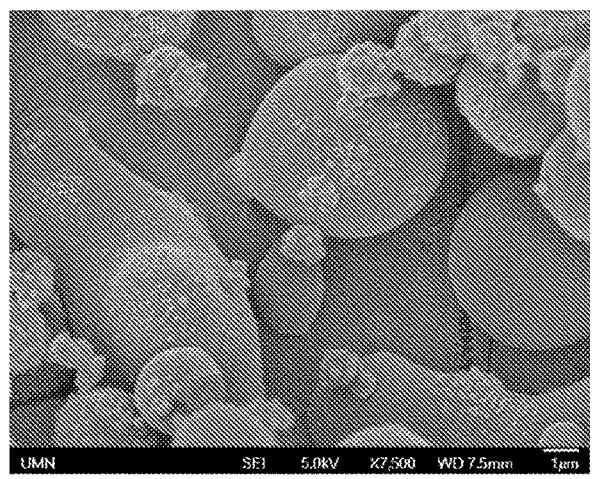
Figure 11:
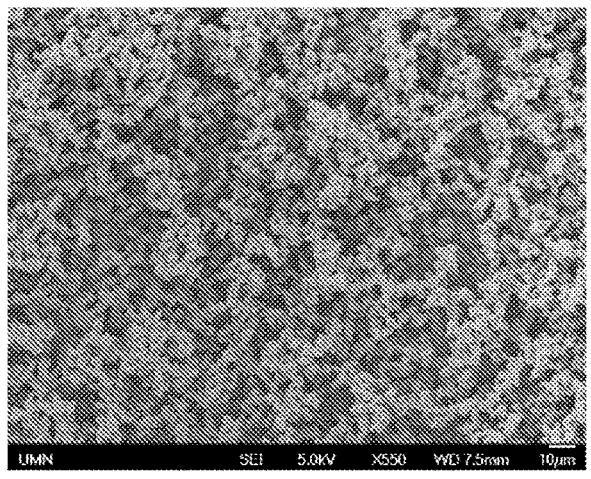
Figure 11:
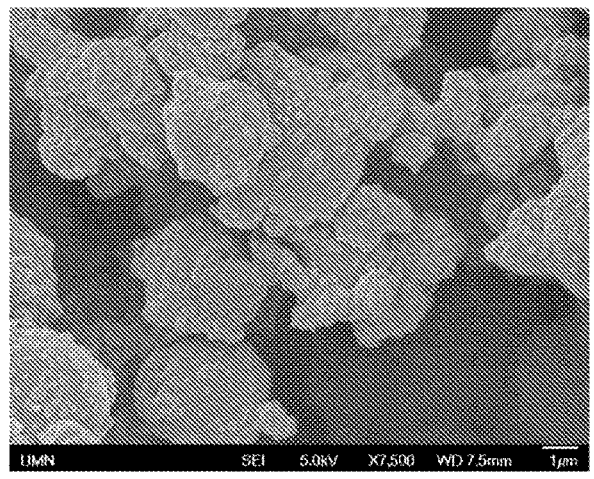

In a modification of Method #7, described below, gold-coated glass was placed in a 25% sucrose solution for 15 minutes. Gold-coated glass was then placed in a 1.4 M SA solution for 30 minutes. The plate was dried in oven at 110° C. for 15 minutes. The plate was then placed in a 0.7 M HQ solution for 10 minutes. More selenous acid (0.7 M) was added after exposure to HQ and the sponge was treated for an additional 20 minutes. The sponge was then dried in an oven at 100° C. until dry, usually 30 to 45 minutes. The resulting films are shown in FIG. 10 and FIG. 11.

Figure 12:
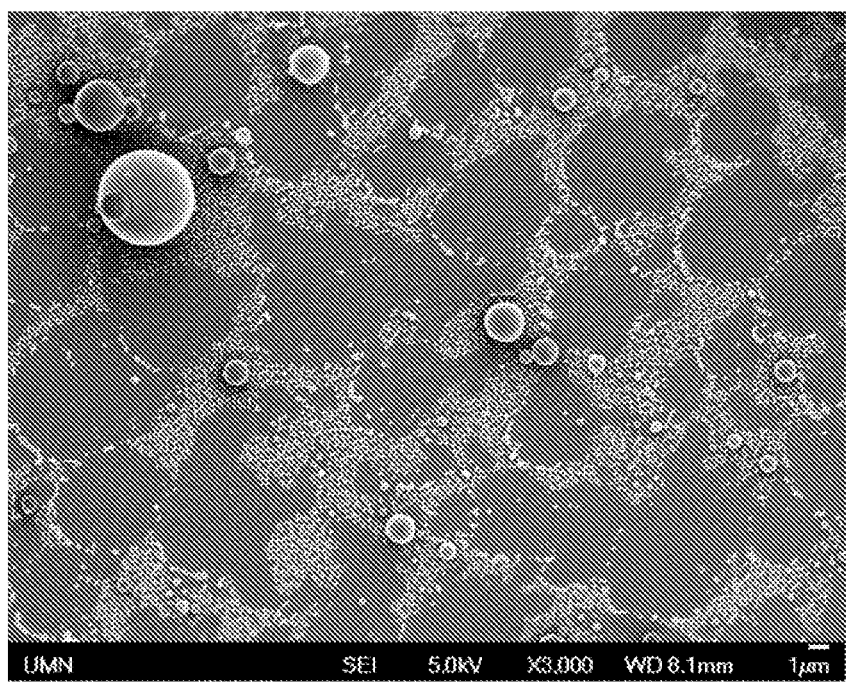
FIG. 12 shows scanning electron microscopy (SEM) images of the growth of selenium nanomaterials on an exemplary silicon surface using Method #7, described in Example 3.
Figure 12:
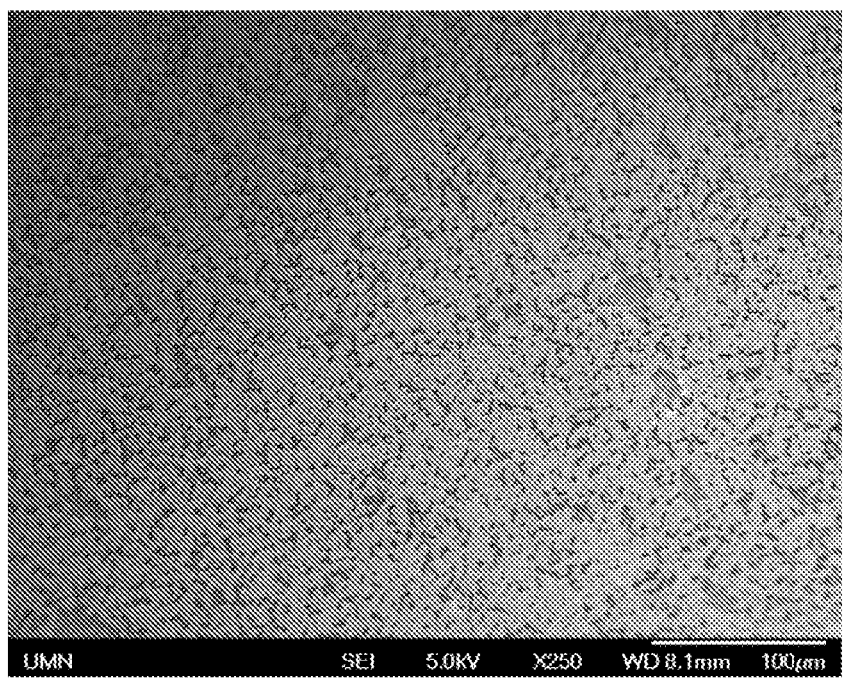

In a modification of Method #7, described below, a selenium nanofilm was formed on a silicon surface. Results are shown in FIG. 12.

Figure 13:
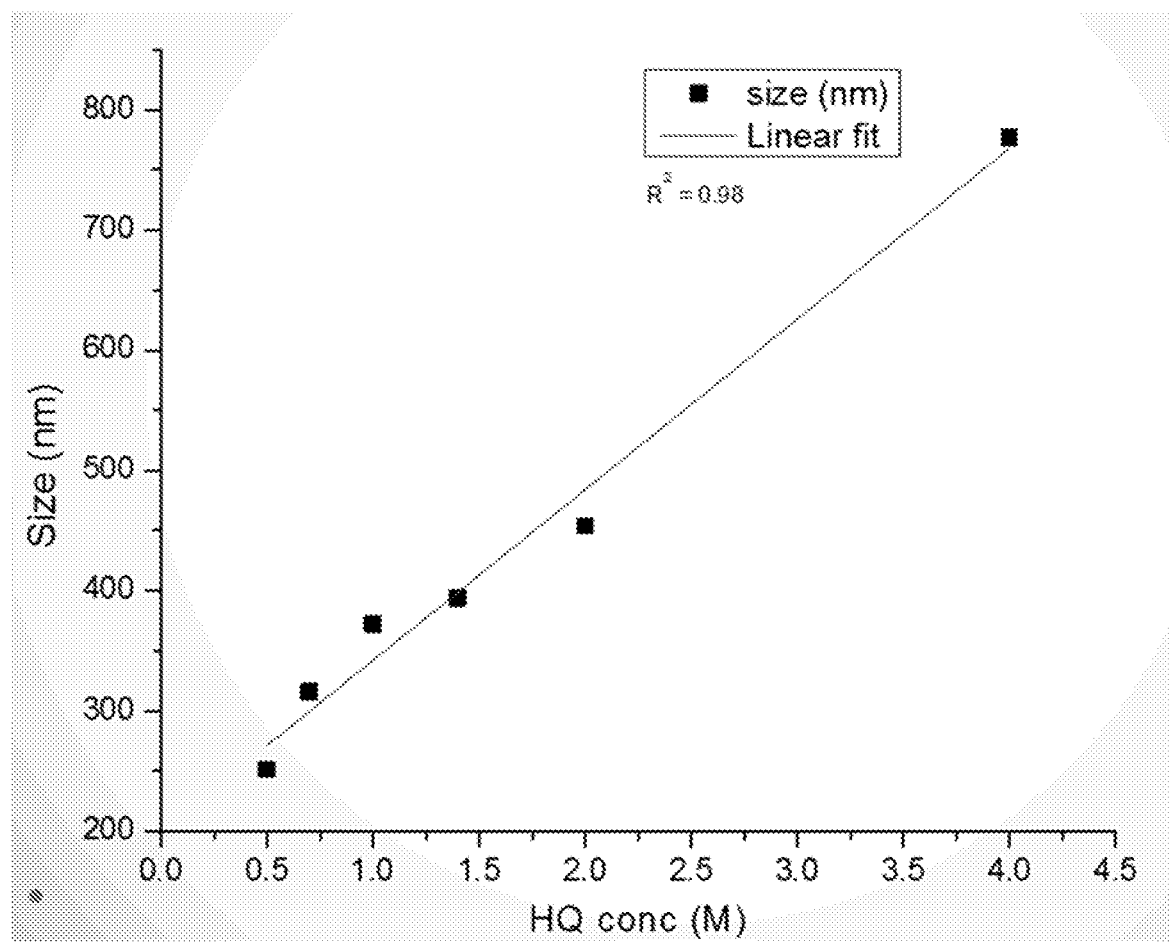
FIG. 13 shows the size of selenium nanospheres that result in one embodiment when the concentration of hydroquinone (HQ) is varied. The size of the nanospheres was measured by dynamic light scattering and confirmed by scanning electron microscopy.

Method #7: A natural honeycomb sponge was first coated with sucrose. The sponge was then put in a 1.4 M selenous acid solution for 30 minutes before being dried in an oven without squeezing at 110° C. The sponge was then added to a hydroquinone (HQ) solution (at different concentrations between 0.1M and 5.5M) for 10 minutes. More selenous acid was added to the sponge after exposure to HQ. A wide range of nanospheres sizes (e.g., 50 nm to 1000 nm) can be obtained by altering the concentration of hydroquinone, as shown in FIG. 13.

Figure 14:
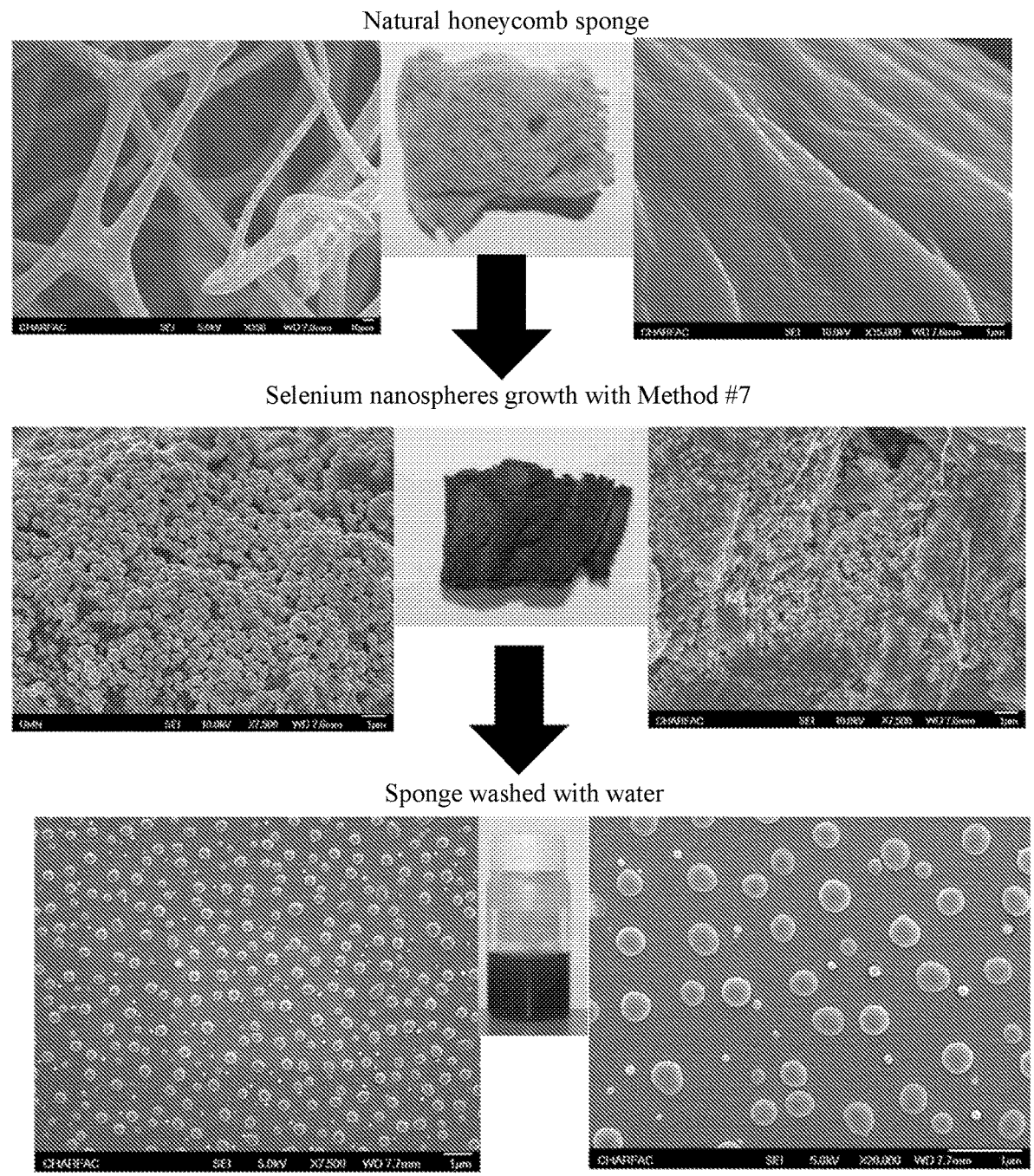
FIG. 14 shows a schematic representation of one embodiment of selenium nanosphere formation on a sponge and then removal from the sponge.

Nanospheres synthesized on a natural honeycomb sponge using Method #7 can be retrieved from the sponge by washing with water, as shown in schematic form in FIG. 14.

Example 4

Figure 15:
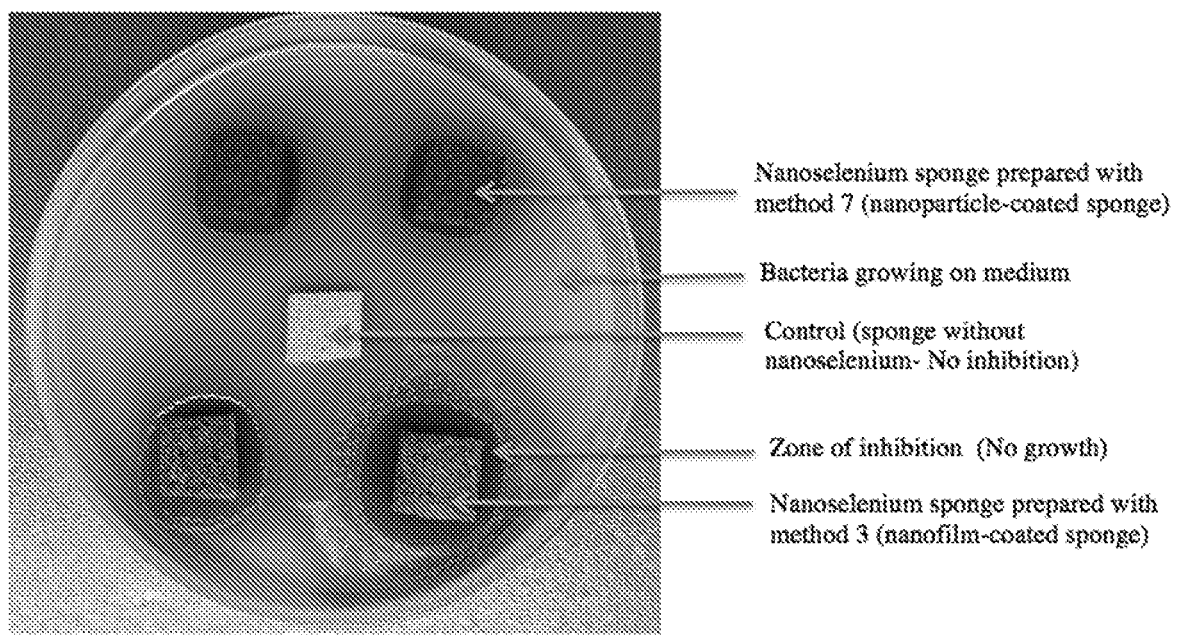
FIG. 15 shows a sensitivity test using exemplary nanoselenium-coated sponges and *E. coli* bacteria.

Antimicrobial Activity of Selenium Nanomaterials:

A sensitivity test was performed to evaluate the antimicrobial properties of a nanoselenium-coated sponge using *E. coli* bacteria. A high anti-microbial activity was observed, as demonstrated by the appearance of an inhibition zone, as shown in FIG. 15.

Example 5

Described is a novel approach for rapid synthesis and long-term preservation of selenium nanospheres (SeNS) on a solid microporous support by combining a mild hydrothermal process with chemical reduction. By using a natural sponge as a solid 3-dimensional matrix for nanoparticle growth, highly monodisperse spherical nanoparticles can be synthesized with a wide size range (10 nm to 1000 nm) and extremely high yield in a relatively short period of time (1 hour). Additionally, the synthesized SeNS can be stored and retrieved as needed by washing the sponge in water. Keeping the nanospheres in the support offers remarkable long-term stability because particles left on the sponge preserve their morphological and colloidal characteristics even after 8 months of storage. Furthermore, the selenium nanospheres can be used for efficient mercury capture from contaminated waters with a record-breaking mercury removal capacity of up to 1900 mg/g.

Results and Discussion

The need for a stabilizing agent provides main limitation of synthesizing colloidal nanoparticles in the liquid phase when in the subsequent long-term stability of the nanoparticles in solution. The use of a sponge provides a means to overcome these limitations and provides increased surface to volume ratio for nanoparticle growth, thus increasing the yield. Also, the sponges offer a confined environment to facilitate diffusion and enhance chemical interactions. Furthermore, the sponge can be used not only for nanoparticle growth but also for long-term storage. Such advantages overcome the need for nanoparticle preservation through daunting and costly lyophilization processes (Alkilany et al. *Langmuir*, 2014, 30, 13799-13808; Abdelwahed, et al., *Advanced Drug Delivery Reviews*, 2006, 58, 1688-1713) or nanoparticle storage in solutions prone to changes in pH and unstable aqueous environments (Fang et al. Small (Weinheim an der Bergstrasse, Germany), 2009, 5, 1637-1641).

Sponge-Supported Synthesis. The first challenge in this work was to find a sponge with a suitable interface that can adsorb selenous acid and allow nanoparticle growth, while offering a weak interaction with the nanoparticles to allow easy retrieval of the nanoparticles in solution. To favor isotropic nanoparticle growth on the sponge fibers and not in solution, a process that follows two major phases was designed: (1) immobilization of selenous acid on the sponge fibers, and (2) nanoparticle growth on the sponge surface. The immobilization is performed by immersion of the sponge in a 25% sucrose solution. The sponge is then squeezed before being immersed in selenous acid solution and dried in a vacuum oven for 10 minutes at 110° C. These steps provide a homogeneous sucrose coating on the sponge to allow isotropic immobilization of the selenous acid ions by interaction with the sucrose hydroxyl groups, thus promoting a homogenous growth of nanoparticles. The drying step is intended to remove excess liquid from the sponge and induce the attachment of the sucrose-Se ions into the sponge fibers. After drying, the sponge is immersed in a reducing agent solution such as hydroquinone to convert the adsorbed Se ions into elemental selenium ($Se^0$). Further immersion of the sponge in additional Se ions solution leads to SeNS surface growth on the sponge fibers.

Figure 16:
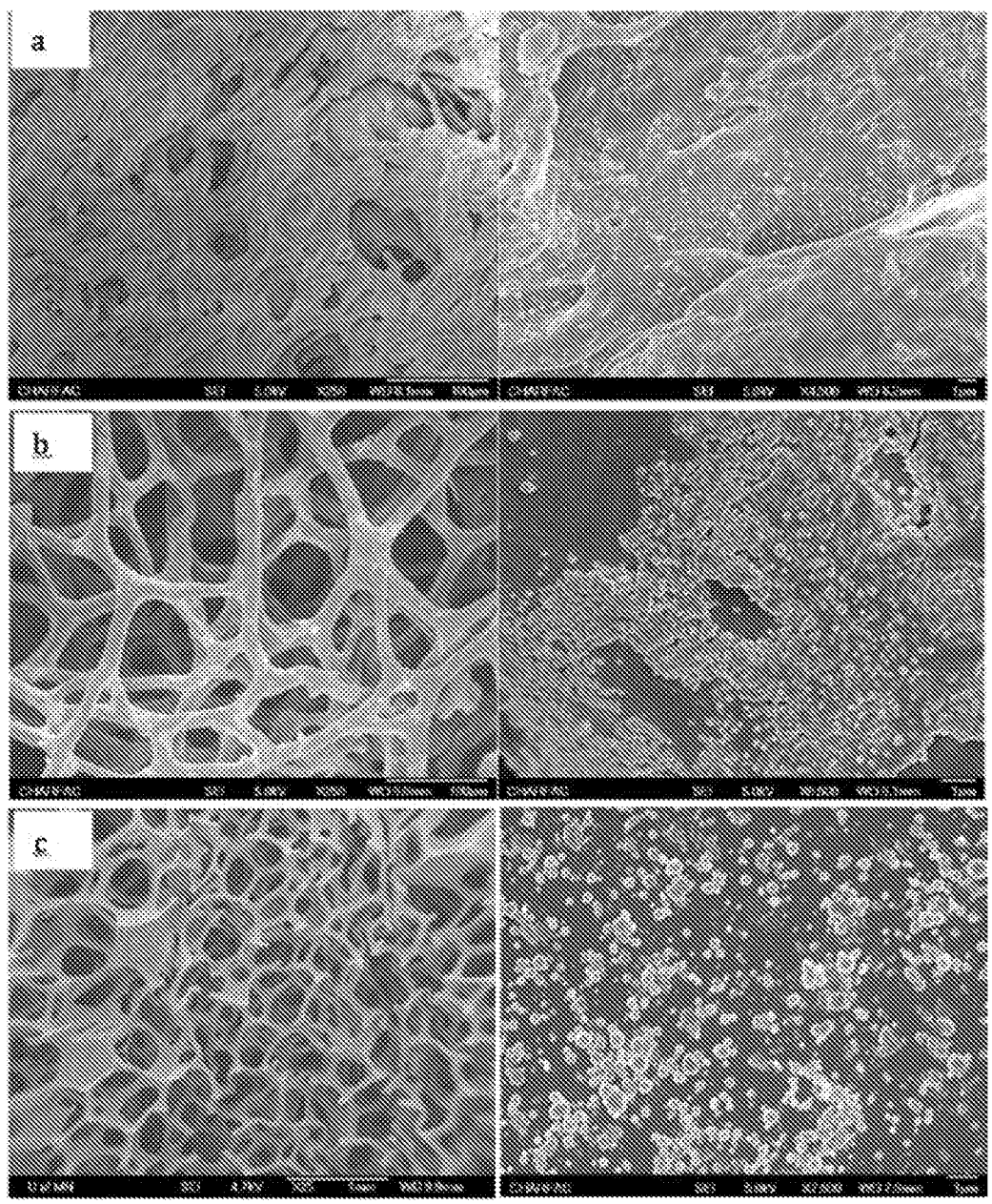
FIG. 16 shows exemplary scanning electron microscopy (SEM) images of selenium nanoparticles grown on (a) a polyvinyl alcohol sponge, (b) a natural silk sponge, and (c) a polyurethane sponge using the process described in Example 5.
Figure 17:
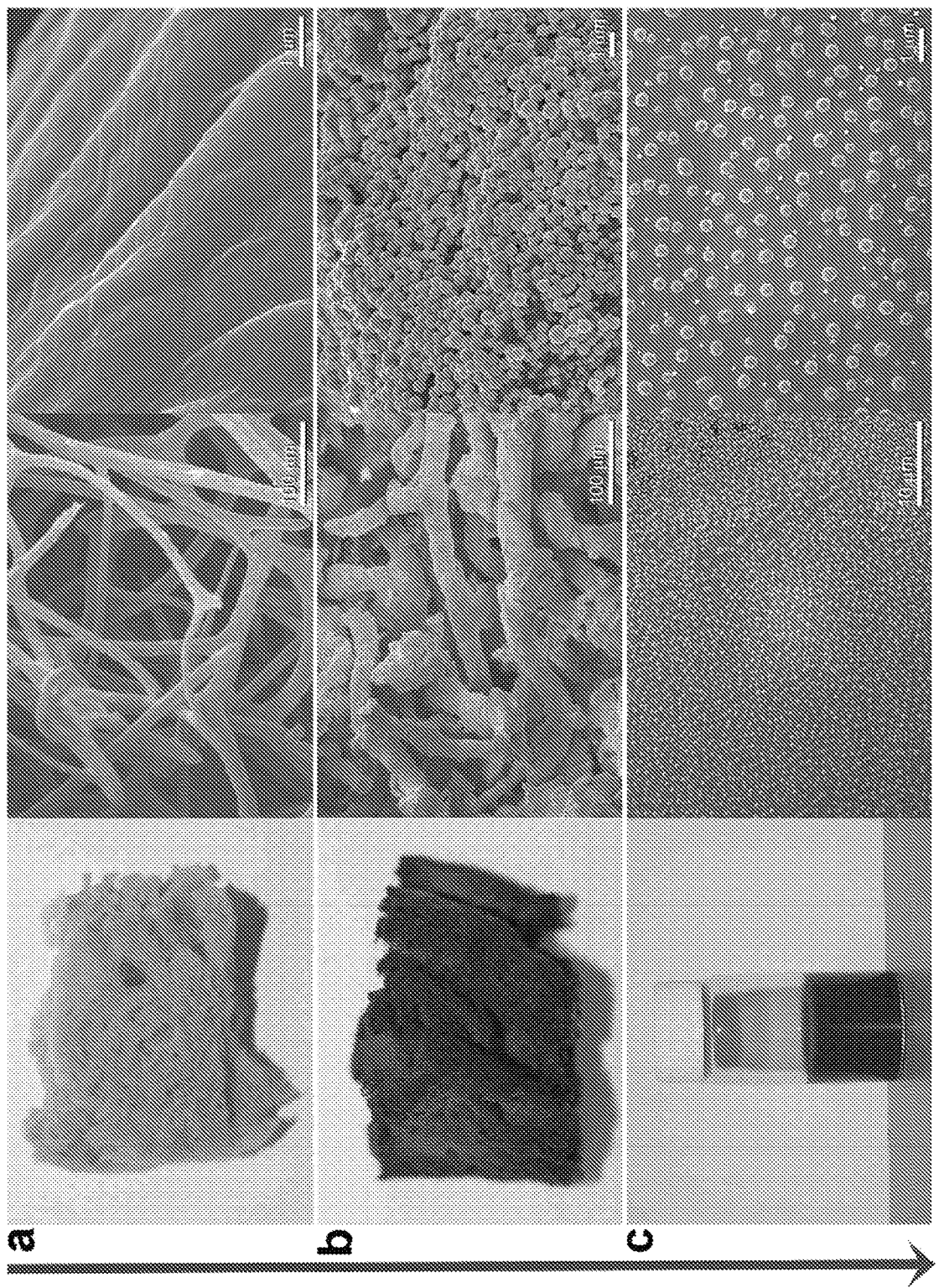
FIG. 17 shows sponge-supported growth of colloidal selenium nanospheres (SeNS). (a) A photograph of a polyamide honeycomb sponge and corresponding SEM images. (b) A polyamide honeycomb sponge after growth of SeNS with a combined hydrothermal/chemical reduction process, and corresponding SEM images. (c) Retrieval of SeNS from the sponge into a colloidal solution and corresponding SEM images after deposition on a silicon substrate for visualization purposes.
Figure 18:
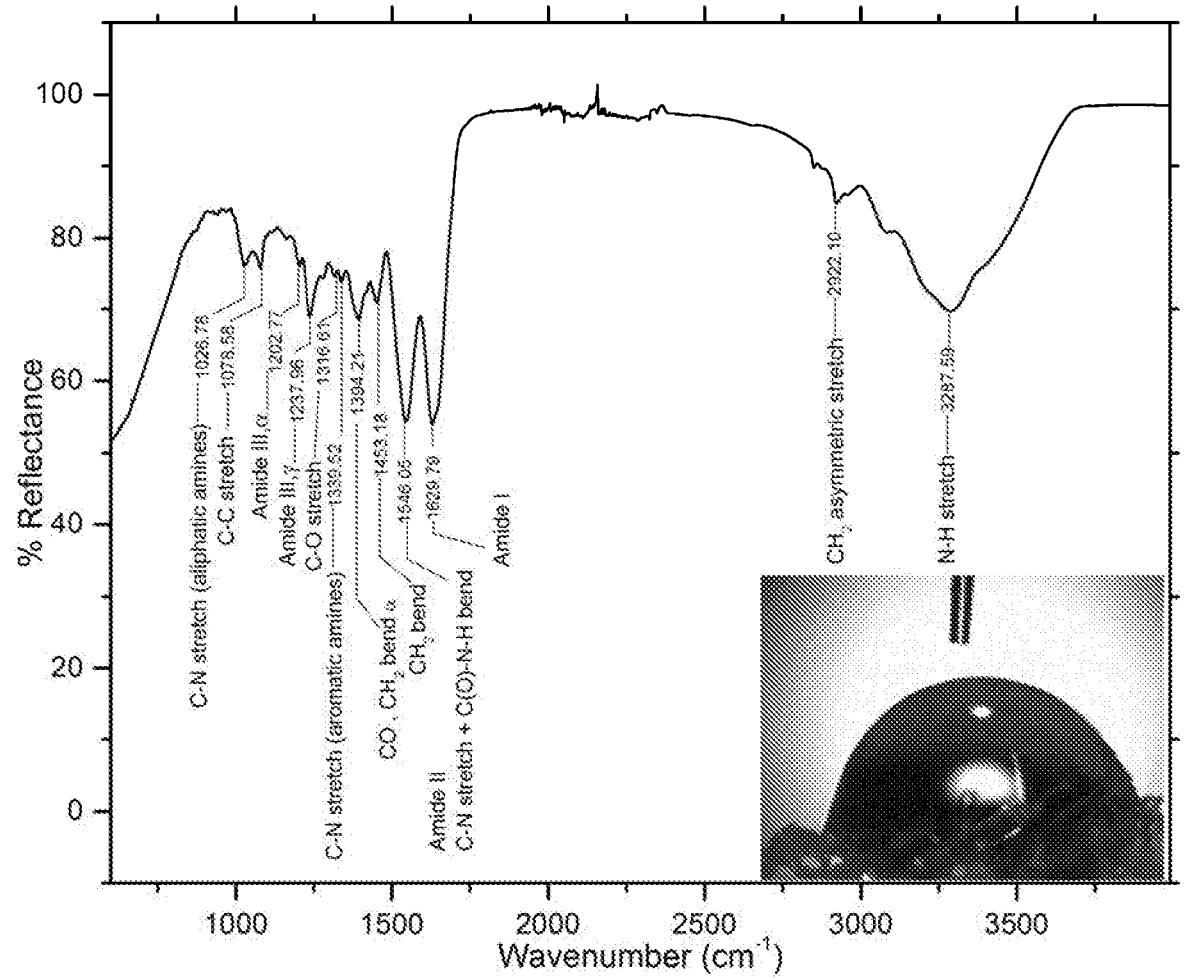
FIG. 18 shows a Fourier transform infrared (FTIR) spectrum of an exemplary honeycomb sponge showing a mainly polyamide composition. The inset depicts a water contact angle of 77°±5° for the same sponge.

Sponge Properties. To select an adequate sponge, the synthesis process was conducted on a number of synthetic and natural sponges including polyvinyl alcohol (PVA), polyurethane (PU), silk (composed of fibroin proteins) and honeycomb (composed of spongin scleroproteins) sponges. Scanning electron microscopy (SEM) images showed that PVA, PU, and silk sponges performed poorly (Supporting Information, FIG. 16). After synthesis, all sponges changed color to dark brown indicating the growth of nanoparticles. While the PVA sponge showed small nanoparticles with low density, PU and silk sponges showed aggregates. In addition, harvesting the particles from the sponges was unsuccessful due to a strong adsorption to the sponge fibers but also due to low thermal stability of PVA and silk sponges during the hydrothermal process at 110° C. The honeycomb sponge revealed remarkable growth of perfectly spherical nanoparticles (FIG. 17). The SEM images (FIGS. 17a and 17b) showed that the sponge fibers were completely and densely covered with monodisperse nanospheres. A simple washing of the sponge with room temperature water resulted in an instantaneous release of most of the nanoparticles into solution with very low amount of sucrose fibers (FIG. 17c). The yield and quality of SeNS can be explained by a combination of morphological, chemical and interfacial properties of the honeycomb sponge but also by the growth mechanism discussed later. Unlike the PVA, PU and silk sponges that all have water contact angles higher than 110°, the honeycomb sponge composed mainly of polyamide shows a hydrophilic surface with a contact angle of 77°±5° (FIG. 18). This hydrophilicity favors the interaction of sucrose and selenous acid with the sponge fibers through intermolecular hydrogen bonds (O—H . . . Se), and prevents the aggregation of nanoparticles as observed with other sponges. In addition to the interfacial properties, the polyamide composition of honeycomb sponge offers a high heat and chemical resistance and good mechanical properties. The yield of SeNS is particularly remarkable and could be explained by the multiple growth mechanisms that will be addressed in the following sections, as well as the 3D matrix of the sponge. The sponge fibers (10 µm to 30 µm in diameter and 10 nm to 20 nm in surface roughness) provide a high surface to volume ratio, which is of importance as the nanoparticle growth mechanism can depend on surface diffusion. Also, the hydrophilicity of the sponge allows absorption of up to 20±3 mL water/g sponge.

Figure 19:
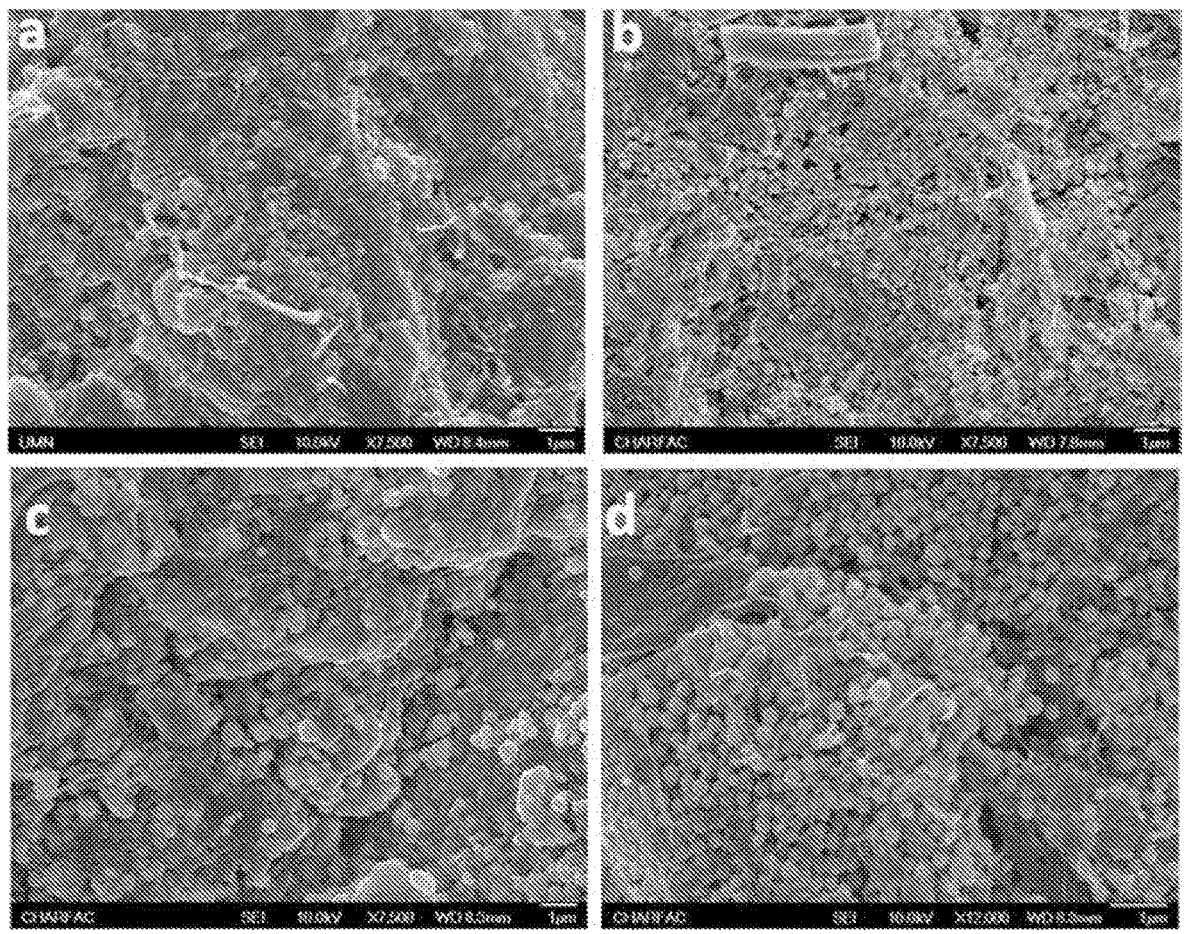
FIG. 19 shows scanning electron microscope (SEM) images of one embodiment of sponge-supported growth of SeNS using different saccharides: (a) lactose, (b) fructose, (c) glucose, and (d) sucrose as a sponge coating before synthesis.
Figure 20:
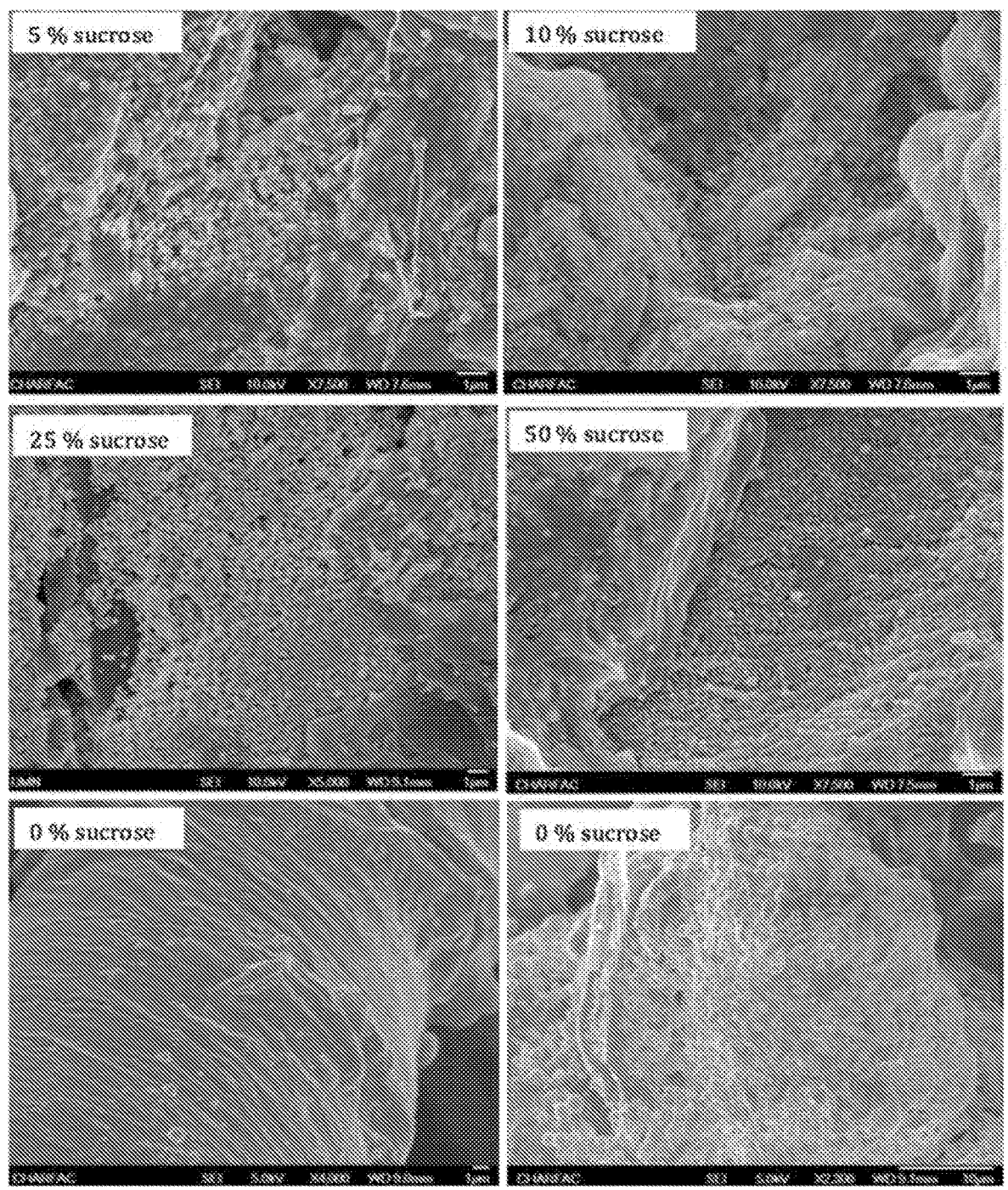
FIG. 20 shows SEM images showing the effect of different sucrose concentrations on the growth of SeNS on the sponge.

Role of Sucrose. Sucrose was used to provide a uniform surface for the initial reduction of selenium. To gauge the effect of other saccharides and the impacts of both mono- and disaccharides, the synthesis was conducted with four different sugars: fructose, glucose, lactose and sucrose. Only treatment with fructose resulted in particle growth with similar quality than sucrose, with regard to particle size, monodispersity and surface coverage (FIG. 19). Lactose and glucose yielded fused, non-spherical particles. These results along with the composition of sucrose (a combination of a fructose and glucose units), and lactose (a combination of a glucose and galactose units) could suggest that the efficiency of sucrose in this process may be due to its fructose unit. An additional experiment was conducted to ascertain the proper level of sucrose loading. Briefly, sponges soaked in varying sucrose concentrations (5%, 10%, 25%, and 50%) were used in the synthesis described above, and the sponges analyzed with SEM imaging. The results depicted in FIG. 20 indicate that a sucrose concentration of 5% is sufficient to provide the optimum growth condition for SeNS, and the increase in sucrose concentration up to 25% does not affect the quality of the nanoparticles. However, nanoparticle retrieval seems to be easier at a concentration of 25% sucrose. Without any saccharide coating, SeNS appeared in non-uniform patches with a poor yield, high polydispersity, and significant agglomeration.

Figure 21:
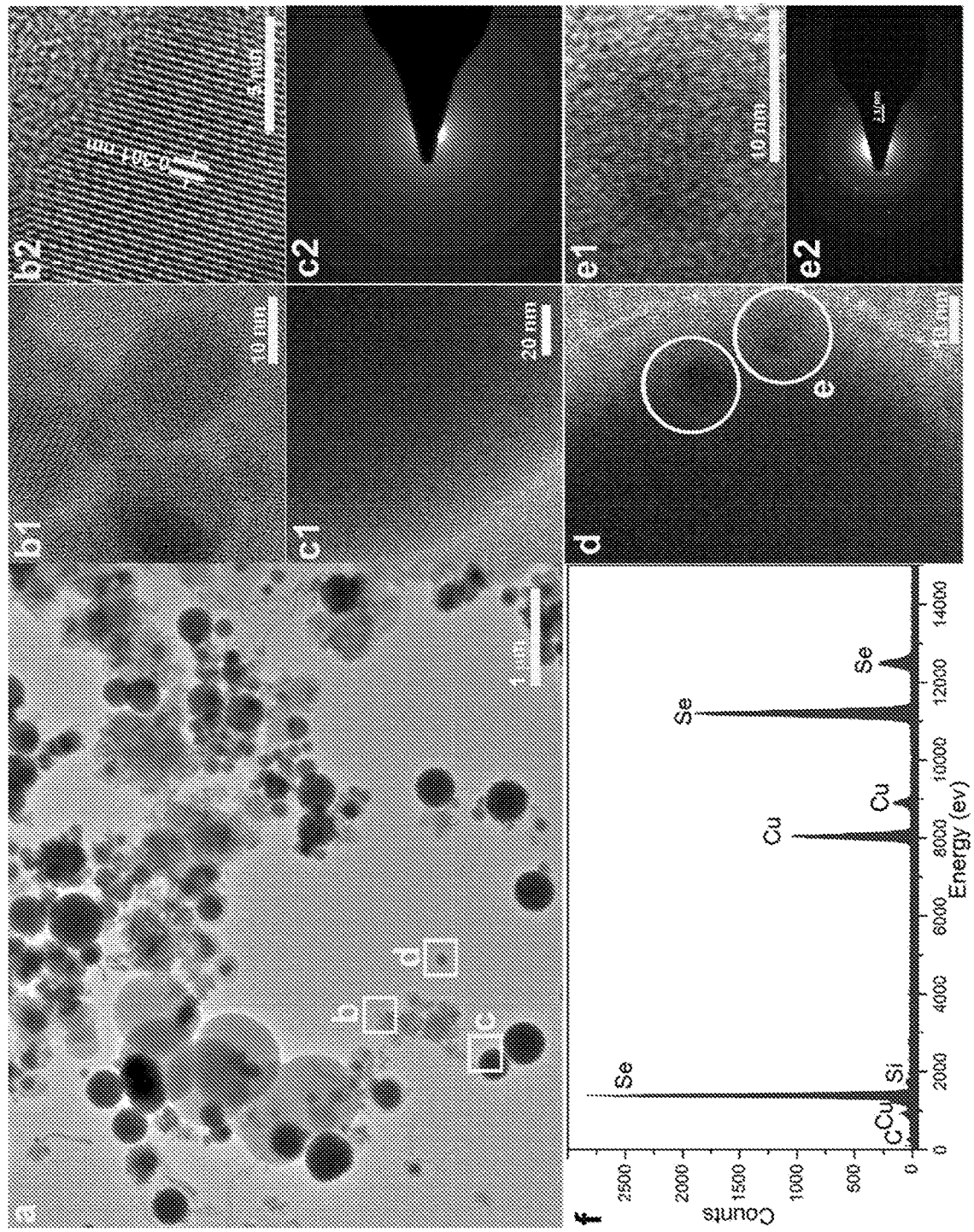
FIG. 21 shows the structure and composition of SeNS synthesized by the combined hydrothermal/chemical reduction process. (a) TEM image of SeNS during growth. Three types of nanoparticles can be identified in the high-resolution transmission electron microscopy (HRTEM) images: small crystalline SeNS (b1 and b2), large amorphous SeNS (c1 and c2), and medium size amorphous SeNS (d). These particles incorporate small crystalline SeNS (e1, and e2). (f) EDX spectra showing the composition of the three types of SeNS.
Figure 22:
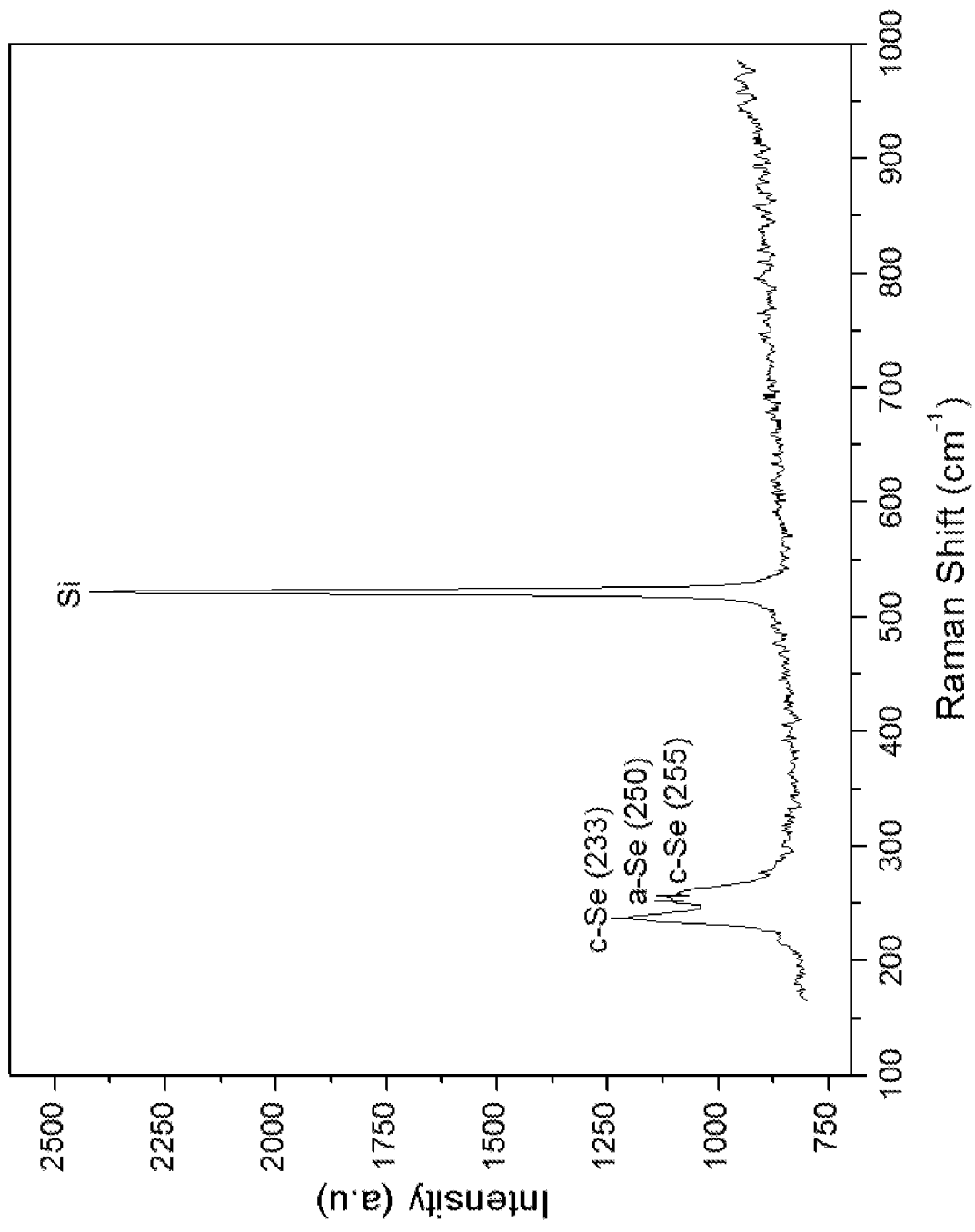
FIG. 22 shows Raman spectroscopy of exemplary selenium nanospheres showing two peaks at 233 $cm^{-1}$ and 250 $cm^{-1}$ corresponding to crystalline selenium (c-Se) and amorphous selenium (a-Se) respectively. A shoulder peak was also observed at 255 $cm^{-1}$ which corresponds to c-Se.

Growth Mechanism and Size Control of SeNS. In the process of this Example, SeNS synthesis involves two major steps: an initial hydrothermal growth, followed by growth through chemical reduction using hydroquinone. FIG. 21$a$ shows the composition of the growth medium during the combined hydrothermal/chemical reduction process. Three types of nanoparticles can be distinguished: (i) a highly dense network of small SeNS of 5-10 nm, (ii) medium-size SeNS or 50-150 nm, and larger particles of 200-1000 nm. When the sponge is observed after the hydrothermal process and without chemical reduction, only small and medium-size particles are found. FIG. 21($b1$-$d$) also reveals that the small SeNS are crystalline (d(021)=0.301 nm), while all other particles in the medium are amorphous. This result is also confirmed by Raman analysis (FIG. 22). Another unexpected result is shown in FIG. 21($d1$ and $d2$). The small crystalline SeNS seem to be internalized by the medium-size particles, which represent the first hint of one of the growth mechanisms. The energy dispersive X-ray (EDX) spectrum demonstrates that all nanoparticles are solely composed of pure selenium (FIG. 21$f$). The observed copper and trace carbon and silicon are caused by the TEM grid.

Figure 23:
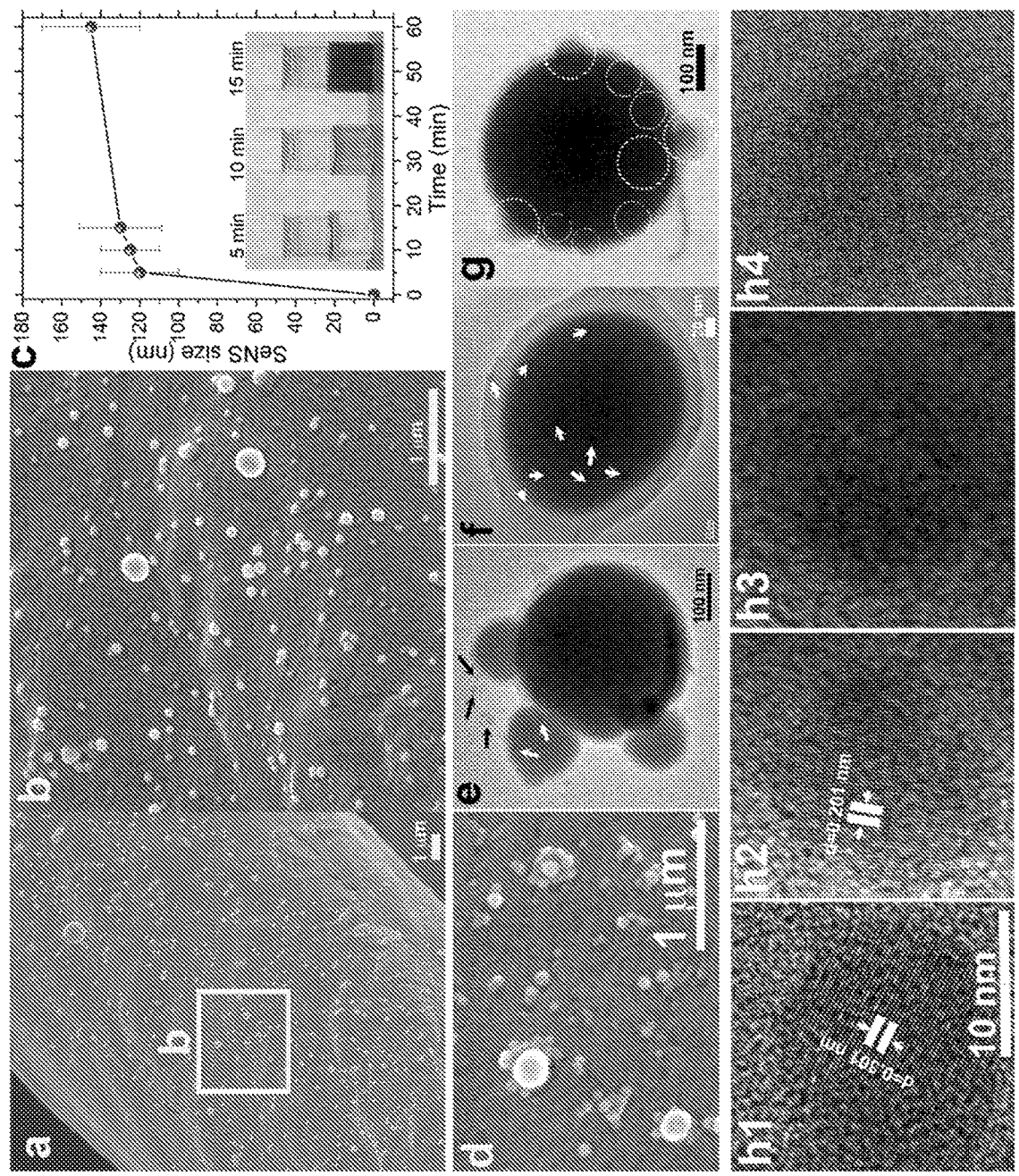
FIG. 23 shows growth mechanism of exemplary SeNS by diffusion-internalization of smaller nanoparticles during the hydrothermal process. (a, b) SEM images of an exemplary sponge fiber after the growth of SeNS with the hydrothermal process. (c) Evolution of the size of SeNS as a function of the incubation time of the sponge at 110° C. The inset shows the corresponding SeNS solution retrieved from the sponges after incubation at different times. (d) SEM image showing the agglomeration of small SeNS around particles. (e) TEM images show 10 nm crystalline SeNS (arrows) incorporated by 100 nm amorphous SeNS, while 100 nm SeNS are internalized by bigger particles. (f) TEM images of amorphous SeNS internalizing a large number of crystalline SeNS (5-10 nm). (g) TEM image of large amorphous SeNS internalizing smaller amorphous SeNS. (h1, h2, h3, h4) HRTEM images showing the change in the crystalline structure or phase of 10 nm crystalline SeNS over time after internalization in bigger amorphous SeNS.
Figure 24:
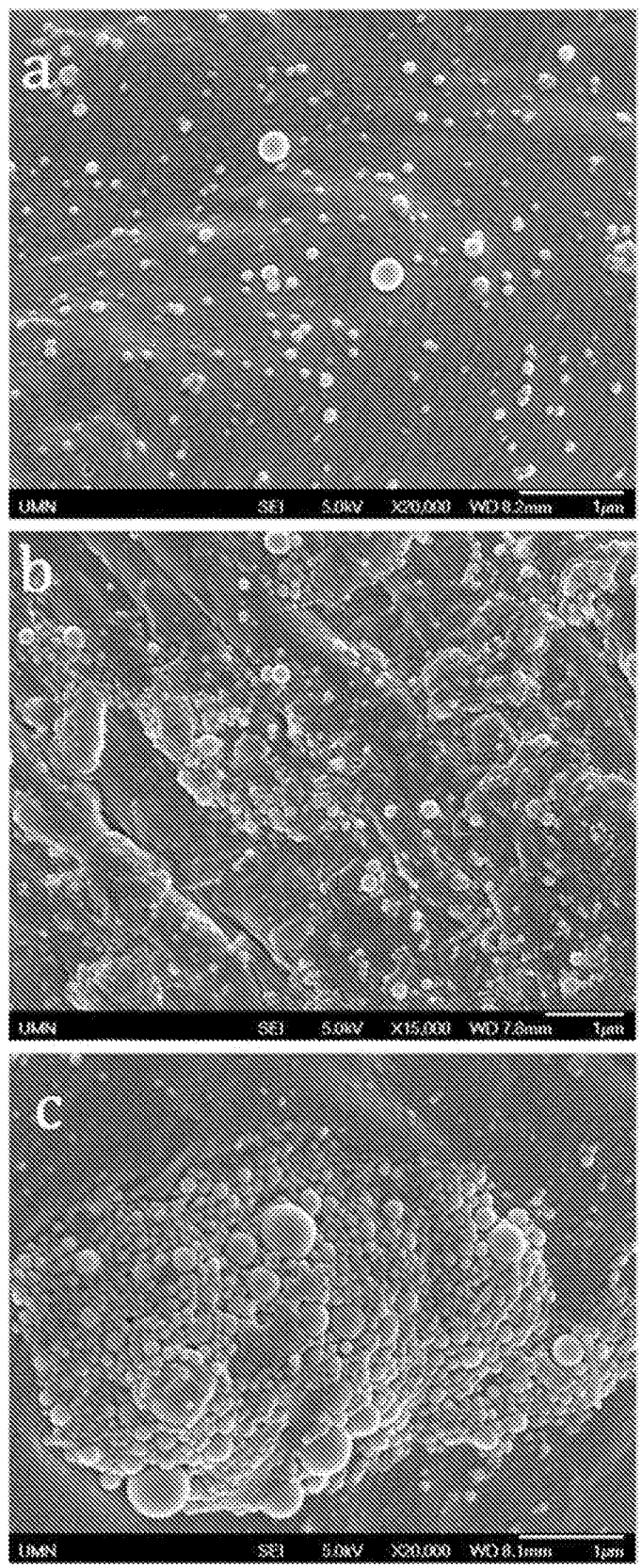
FIG. 24 shows an exemplary hydrothermal synthesis of SeNS at 110° C. for different incubation times: (a) 5 minutes, (b) 10 minutes, and (c) 15 minutes.

The composition of the growth medium provides some insight into the growth mechanism where surface diffusion of different growth species plays a role. When the selenous acid soaked sponge is heated, the selenium ions present in the sponge matrix are reduced to elemental selenium ($Se^0$). The reduction is believed to be primarily caused by the heating, the mild vacuum conditions were used in this synthesis to expedite evaporation of water from the sponge. The reduced selenium ions then diffuse and crystalize on the surface of the sponge fibers under the effect of heat (110° C.) and rapid water evaporation. The surface diffusion results in instantaneous growth of 5 nm to 10 nm crystalline SeNS. The small crystalline SeNS reach a maximum size of 10 nm to 15 nm, probably due to diffusion-limited growth. The second set of SeNS observed after the hydrothermal process are around 50 nm to 150 nm (FIG. 23$a$, $b$). These particles grow and reach their maximum size within the first 5 minutes of the hydrothermal process. When the sponge is incubated for different times under hydrothermal conditions, the retrieved SeNS solutions exhibit different colors depending on the incubation time (FIG. 23$c$). However, the change in color after different incubation times (5 minutes, 10 minutes, 15 minutes) may be more indicative of a change in nanoparticle concentration and distribution rather than nanoparticle size, as shown by SEM images (FIG. 24).

As for the amorphous SeNS with a size range of 50 nm to 150 nm, their growth is likely mediated by two concurring mechanisms. First, surface diffusion of elemental selenium under heating results in amorphous agglomeration due to interfacial forces generated by rapid water evaporation. The resulting SeNS then continue their growth up to around 150 nm by internalizing the small crystalline SeNS that come into contact due to surface diffusion. FIG. 21($d$, $e$, $f$, $g$) reveal that both small crystalline SeNS and medium-size amorphous particles diffuse and are internalized by bigger "phagosome" nanoparticles. This mechanism could explain the high monodispersity of the synthesized nanoparticles, as big particles grow by internalizing small ones. A close look at the internalized small crystalline nanoparticles shows that the particles are not only internalized but also undergo a phase change from crystalline to amorphous within the host particle. FIG. 23$h1$-$h4$ represents crystalline SeNS before (h1) and after internalization (h2-h4). Images h1-h4 were taken from nanoparticles localized at different distances from the center of the phagosomal particle. Nanoparticles that are closer to the center are particles that were internalized first and thus have a longer residence time inside the phagosomal particle. The high-resolution transmission electron microscopy (HRTEM) imaging reveals that the internalization process immediately affects the crystalline structure by decreasing the fringe spacing from d(021)=0.301 nm (FIG. 23$h1$) to d(230)=0.201 nm (FIG. 23$h2$). Over time, the internalized SeNS become amorphous and cannot be distinguished from the surrounding material.

Figure 25:
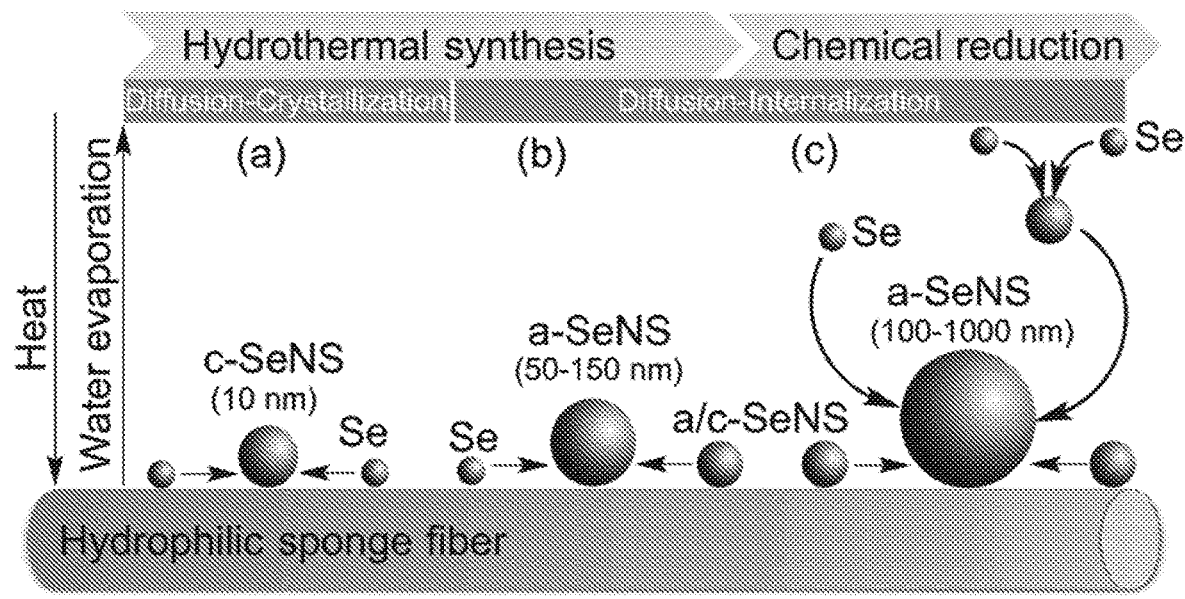
FIG. 25 shows a scheme representing one embodiment of a mechanism of sponge-supported synthesis of crystalline (a) and amorphous (b, c) SeNS, during the combined hydrothermal and chemical reduction process. The arrows show the direction of surface diffusion of the nanoparticles or growth species under the effect of heat and water evaporation.
Figure 26:
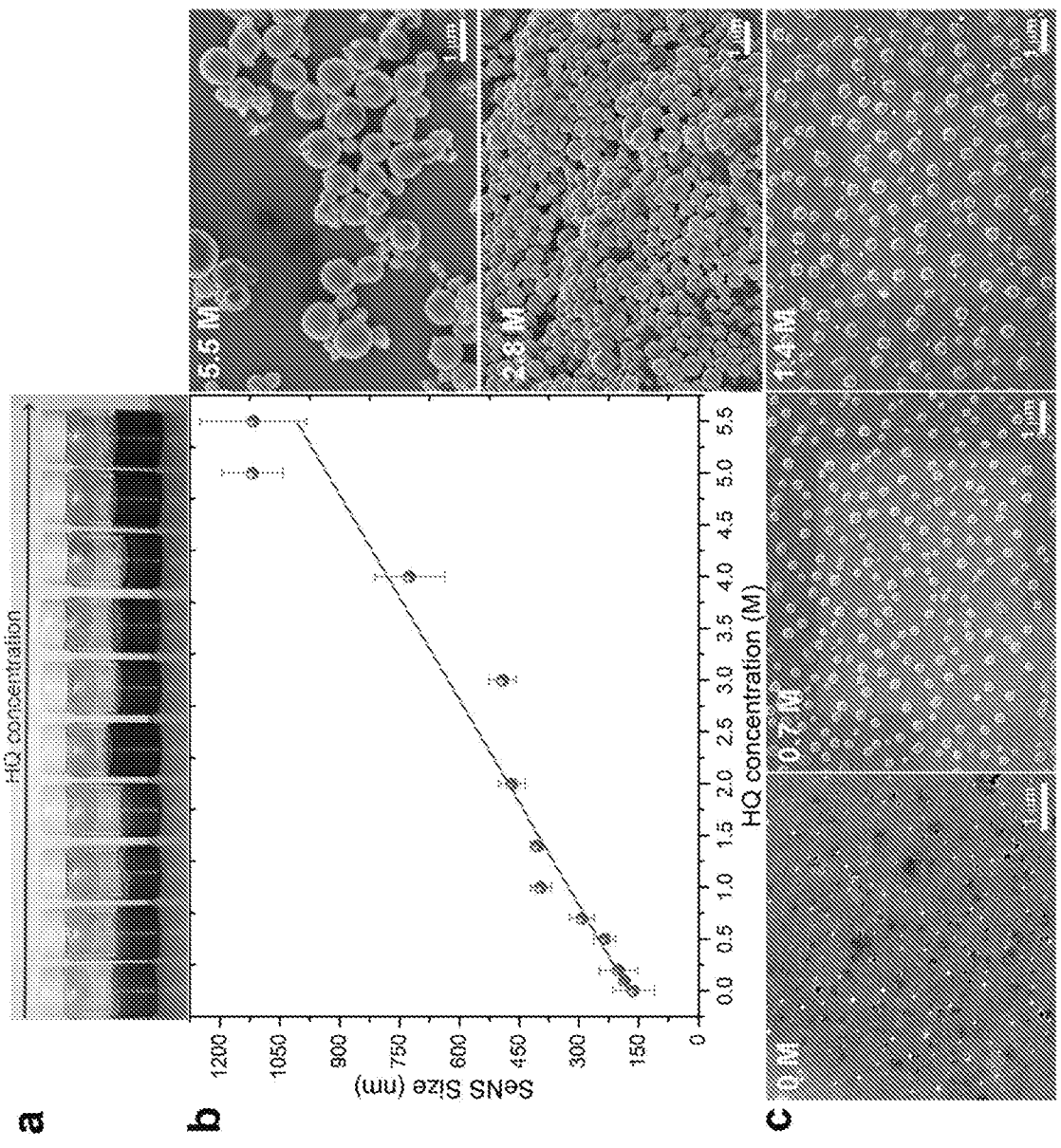
FIG. 26 shows size control of SeNS grown by the combined hydrothermal/chemical reduction process. (a) An image of SeNS obtained from exemplary sponges treated with different hydroquinone (HQ) concentrations. (b) Correlation curve of the SeNS size as a function of HQ concentration. (c) SEM images of the corresponding SeNS after retrieval from the sponge and deposition on a silicon substrate.
Figure 27:
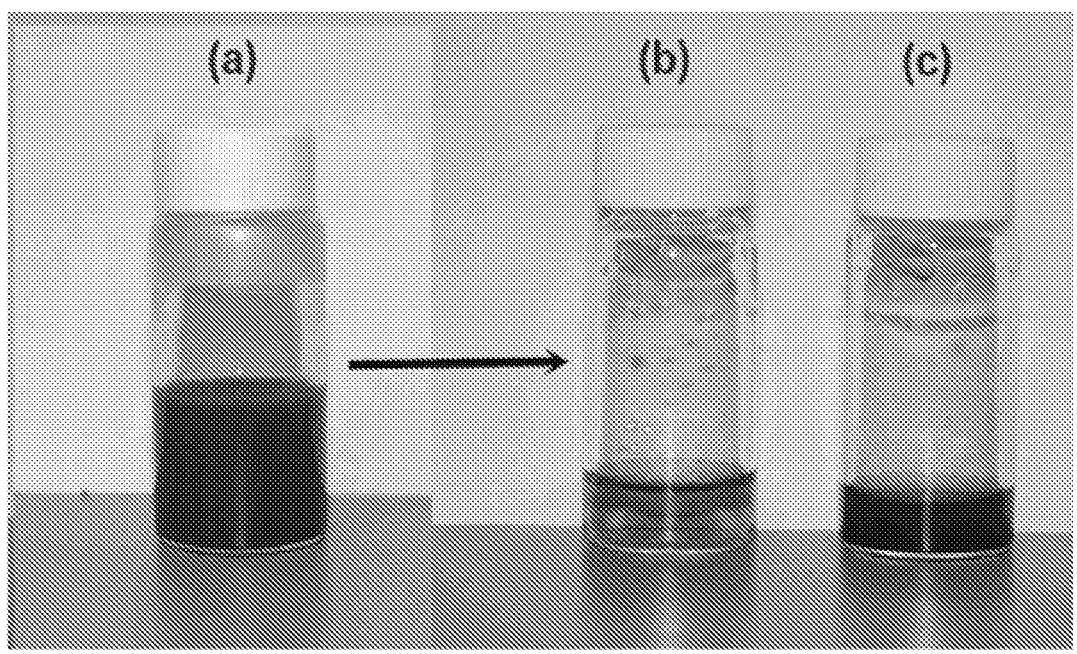
FIG. 27 shows a solution of SeNS obtained with an exemplary combined hydrothermal process/chemical reduction at hydroquinone concentration of 5 M (a). The extrusion of the solution shown in (a) through a 400 nm filter results in the separation of (b) small SeNS from (c) micrometric SeNS.
Figure 28:
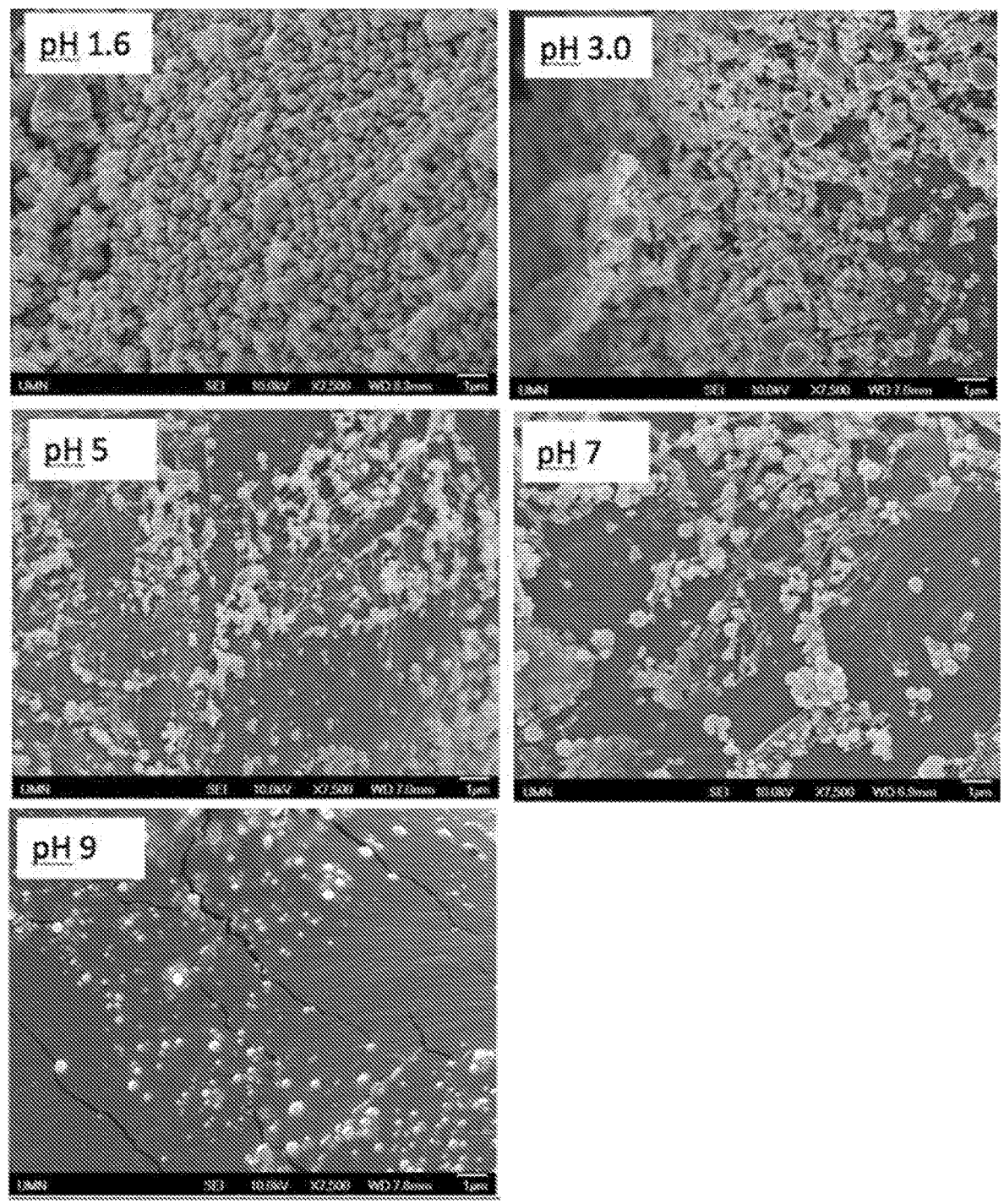
FIG. 28 shows scanning electron microscope (SEM) images of exemplary sponge-supported growth in a selenous acid solution having a pH from 1.6 to 9.
Figure 29:
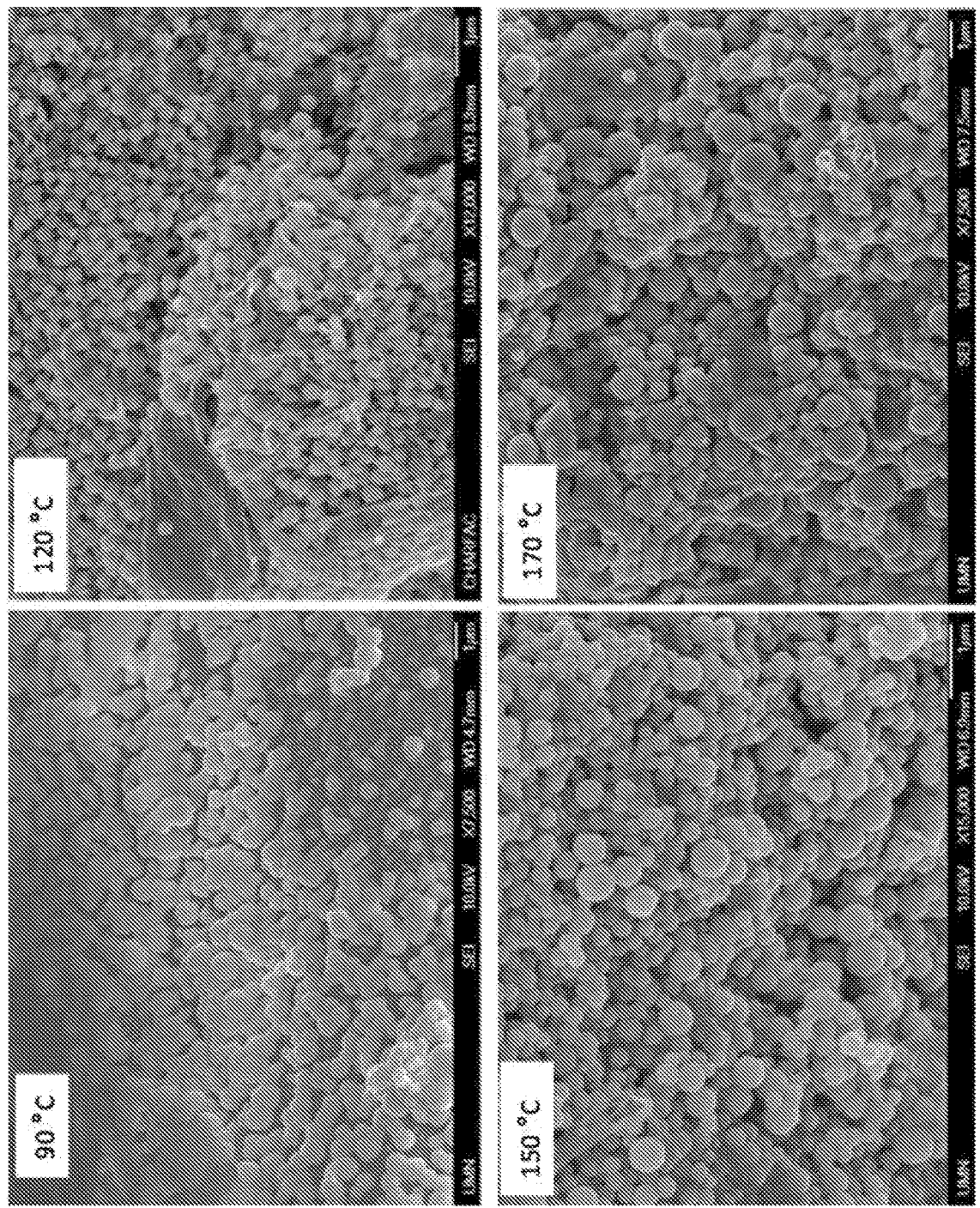
FIG. 29 shows the effect of temperature on exemplary sponge-supported growth of SeNS during the hydrothermal process.

Once the sponge is removed from the vacuum oven (hydrothermal process), the sponge contains mainly small crystalline SeNS and medium-size amorphous SeNS. To allow further growth of the nanoparticles, the sponge is immersed in hydroquinone as a reducing agent, then exposed to a solution of selenous acid. The chemical reduction promotes further binding to the nanoparticles present on the sponge. From this point, SeNS growth on the sponge fibers likely occurs via two main reaction pathways (FIG. 25). Selenium ions present in solution can be reduced at the vicinity of the sponge surface and either diffuse and condense on already grown nanoparticles on the surface, or agglomerate in solution into small amorphous particles that will be internalized once they reach the surface. Concurrently, large SeNS can grow by surface diffusion/internalization of medium-size nanoparticles as described earlier. These reaction pathways are non-exclusive, as particles can form via one or many of these processes simultaneously. The chemical reduction not only allows further growth of SeNS but also enables size control from 100 nm to 1000 nm by varying hydroquinone concentration (FIG. 26). This size control can allow control of catalytic, biological and optical properties of nanoparticles dependent on their size. Increasing the concentration of HQ in solution resulted in greater reduction and consequently, larger particles on the surface of the sponge. It should be noted that the relationship between HQ concentration and SeNS size is linear with an $R^2=0.93$. At concentrations above 3 M, however, the polydispersity index increases slightly. A simple centrifugation or filtration can easily separate the big particles from the rest (FIG. 27). When concentrations at 3 M and above are not considered the statistical correlation improves slightly ($R^2=0.97$). This correlation is obtained at an optimum of pH 1.6 for the growth medium. The increase in pH dramatically affects nanoparticle growth and results in low surface coverage (FIG. 28). Since the reduction of selenous acid into elemental selenium also occurs during the hydrothermal process, the effect of temperature on the growth and size of SeNS was investigated. The SEM images reveal that temperatures of 110-120° C. represent the optimum conditions for the synthesis of SeNS smaller than 150 nm, without any chemical reduction. A decrease in temperature to 90° C. results in the formation of fused nanospheres, while an increase in temperature leads to an increase in nanoparticle size but also in a significant increase in polydispersity (FIG. 29).

Figure 30:
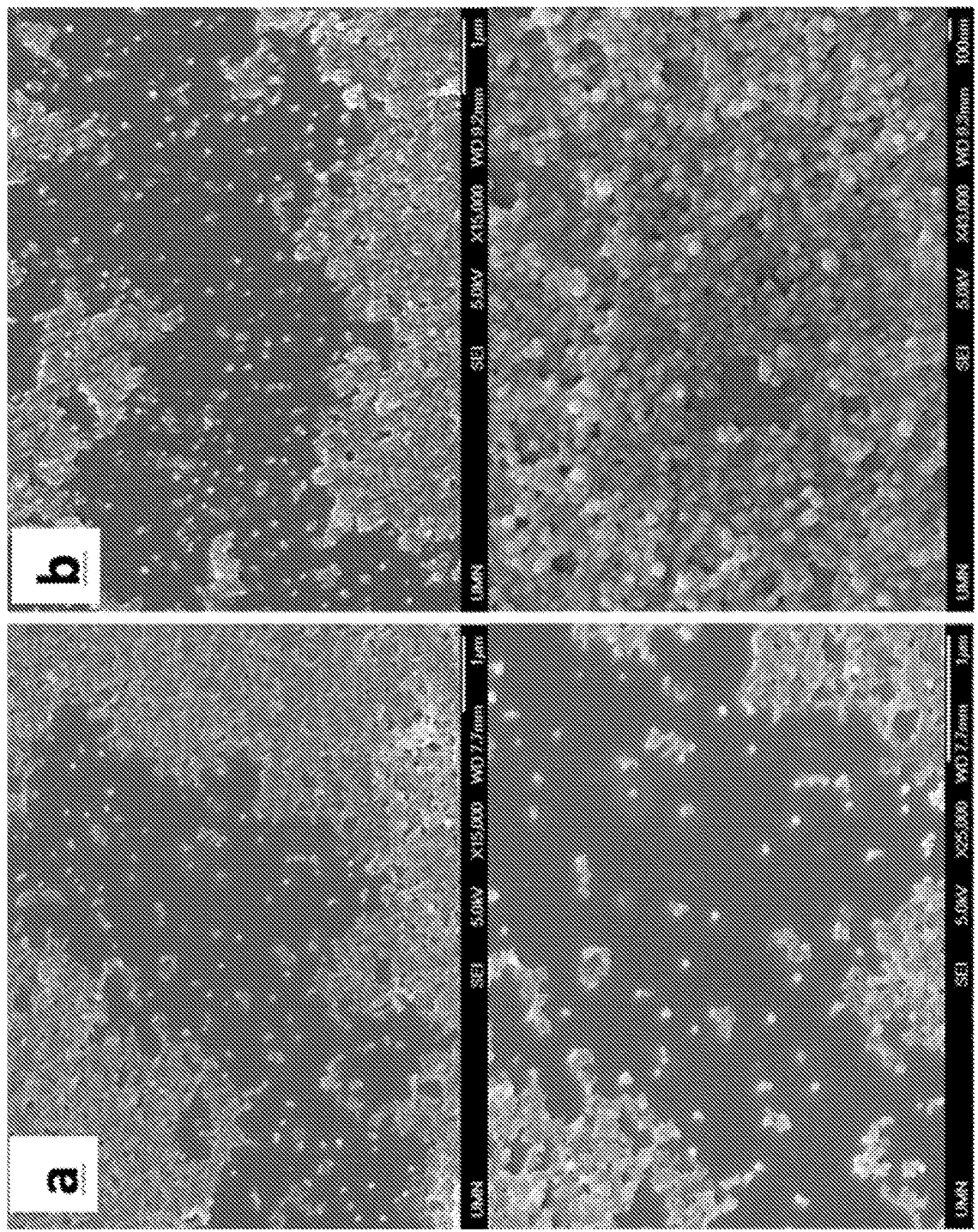
FIG. 30 shows SEM images of commercially available selenium nanospheres. The solution was drop-casted on silicon substrate before (a) or after (b) 1.5 month of storage in solution.

Long-Term Stability of SeNS. One of the major benefits of the sponge-supported synthesis described herein compared to the methods shown in Table 3 is that particles can be harvested from the support whenever needed by simple washing with water. Sucrose also promotes stability of the harvested particles as it enters into solution when the particles are retrieved from the sponge. To assess the long-term stability of the SeNS when stored on the sponge, SeNS solution obtained from the sponge immediately after synthesis was compared with a SeNS solution obtained from a sponge stored for 8 months (Table 4). The results show that the nanoparticles stored in the sponge for 8 months are remarkably preserved with no change to their size, zeta potential and polydispersity index. The nanoparticle retrieved immediately after synthesis show significant changes in all parameters with noticeable nanoparticle aggregation after 3 months of storage in solution. More dramatic changes and nanoparticle aggregation are observed for the commercial SeNS after only 1.5 month of storage in solution (FIG. 30).

TABLE 3

Comparison of different synthesis methods of selenium nanospheres

| Parameter | Solution-phase synthesis | Microbial-mediated synthesis | Hydrothermal synthesis | Irradiation-assisted synthesis | Sponge-supported synthesis (this Example) |
|---|---|---|---|---|---|
| Process time | 2 h | 12-24 h | N/A | 30 min | 1 h |
| Diameter (nm) | 5-300 nm | 1-500 nm | 10-20 nm | 5-120 nm | 10-1000 nm |
| PDI | Monodisperse | Polydisperse | Monodisperse | Polydisperse | Monodisperse |
| Zeta potential | −59 to +59 mV | −25 to +25 mV | — | — | +25 mV |
| Long term stability at room temperature | 1 day to 3 months | Not Published | Not Published | Not Published | >8 months on the sponge |
| Structure | Mostly amorphous | Crystalline, amorphous | Crystalline | NA | Crystalline, amorphous |

Solution-phase synthesis: Gates et al., Advanced Functional Materials, 2002, 12, 219-227.; Jeong et al., Advanced Materials, 2005, 17, 102-106; Nie et al., Journal of Materials Chemistry B, 2016, 4, 2351-2358;Chen et al., Crystal Growth & Design, 2009, 9, 1327-1333; Kumar et al., Journal of Colloid and Interface Science, 2014, 416, 119-123; Stroyuk et al., Colloids and Surfaces A. Physicochemical and Engineering Aspects, 2008, 320, 169-174; Shah et al., Nanotechnology, 2007, 18, 385607; Zhang et al., Langmuir, 2010, 26, 17617-17623.
Microbial-mediated synthesis: Oremland et al., Applied and Environmental Microbiology, 2004, 70, 52-60; Shirsat et al., RSC Advances, 2015,5, 92799-92811; Jain et al., Environmental Science & Technology, 2015, 49, 1713-1720
Hydrothermal synthesis: Shin et al., Materials Letters, 2007, 61, 4297-4300.
Irradiation-assisted synthesis: Yu et al., New Journal of Chemistry, 2016, 40, 1118-1123.

TABLE 4

Comparison of the long-term stability of SeNS after 8 months of storage in the sponge (Sample B) or in solution (Sample C) at room temperature as compared to Sample A (as synthesized SeNS). The results are also compared to the stability of a commercial SeNS solution.

| | Sample A As synthesized in the sponge | Sample B After 8 months in the sponge | Sample C After 3 months in solution | Commercial SeNS As purchased | After 1.5 months |
|---|---|---|---|---|---|
| Size (nm) | 277 ± 20 (100%) | 291 ± 26 (96%) | 3,260 (50%) 907 (50%) | 565 ± 111 (6%) 2,079 ± 768 (14% ± 7) 139 ± 25 (50%) 16 ± 1 (29%) | 548 ± 191(63%) 4,100 ± 2,000 (35 %) 126 ± 1 (2%) |
| Zeta potential | 24 ± 2 | 26 ± 1 | −17 ± 3 | −42 ± 1 | 88 ± 2 |
| PDI | 1.04 | 1.17 | 7.10 | — | — |

Figure 31:
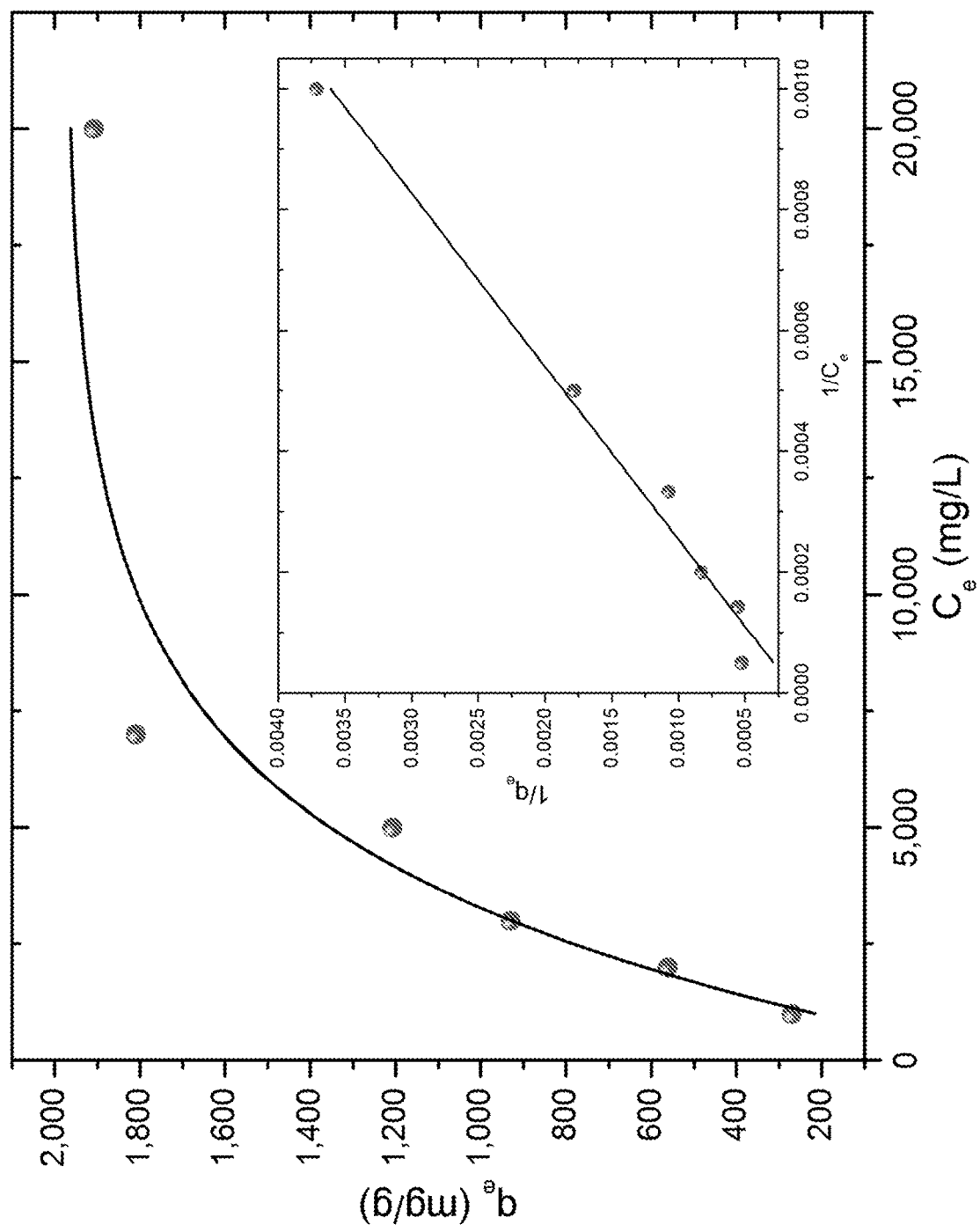
FIG. 31 shows an exemplary $Hg^{2+}$ adsorption isotherm for selenium nanospheres. The inset depicts the linear regression obtained by fitting the adsorption isotherm data with the Langmuir adsorption model.

Selenium Nanospheres as Mercury Sorbent. One of the major properties of selenium is its strong interaction and affinity to mercury. To evaluate the ability of selenium nanospheres to sequestrate mercury from water, SeNS solution was mixed with a solution of mercury ions ($Hg^{2+}$) with different concentrations. The mercury adsorption isotherm showed in FIG. 31 indicates that the adsorption follows a Langmuir model with $R^2$ equal to 0.94. The adsorbate maximum load or maximum removal capacity of SeNS ($Q_e$) at equilibrium was calculated from Equation 1.

$$Q_e = \frac{C_i - C_f}{m} \times V \qquad \text{Equation 1}$$

where $C_i$ is the initial concentration of mercury ions in the solution (mg/L), $C_f$ is the final concentration of mercury ions in the solution (mg/L), m is the mass of adsorbent (g/L), V is the volume of the solution (L), and $Q_e$ is the amount of metal ion adsorbed in gram per gram of adsorbent at equilibrium (g/g).

The maximum removal capacity ($Q_e$) was found to be 1.907 g/g or 1907 mg/g. This value is two times higher than the best results reported for metal-organic frameworks for mercury capture (Zhang et al., *Nat. Commun.*, 2014, 5:5537). In addition, this value means that 74.8% of selenium atoms interact with mercury (the maximum theoretical load of mercury with a 1:1 stoichiometry is 2540 mg of mercury per gram of selenium), which is a 7-fold improvement as compared to the performance reported in literature for selenium nanoparticles (Johnson et al. *Environmental Science & Technology*, 2008, 42, 5772-5778).

The favorability of the interaction between mercury and selenium nanospheres was evaluated by calculating the separation factor ($R_L$) as indicated in Equation 2.

$$R_L = \frac{1}{1 + K_L C_0} \qquad \text{Equation 2}$$

where the parameter $K_L$ is the Langmuir adsorption constant corresponding to the inverse of the intercept in the linear plot in FIG. 5, and $C_o$ refers to initial concentration of adsorbate.

The value of $0 < R_L$ was found to be equal to 0.3, which indicates a highly favorable interaction ($0 < R_L < 1$).

Materials and Methods

All chemicals including selenous acid (98%), sucrose (>99.5%), lactose (>99%), fructose (>99%), glucose (>99.5%) and hydroquinone (99%) were purchased from Sigma Aldrich (St. Louis, Mo., USA). Natural, unbleached honeycomb sponges (5-6 in), polyvinyl alcohol sponges, and natural silk sponges were purchased from various online suppliers. All aqueous solutions were prepared in nanopure water.

Characterization of natural honeycomb sponge. The natural sea sponge was characterized using scanning electron microscopy (JEOL 6500, 6700 SEM) and Fourier transform infrared spectroscopy (Nicolet Series II Magna IR-System FTIR, Thermo Fisher Scientific, Waltham, Mass.). Average surface roughness and microscopic contact angle were measured using a KLA-Tencor P-7 and an MCA-3 (Kyowa Interface Science Co., Japan) respectively. Absorption capacity was estimated via water uptake in sponges of uniform size.

Synthesis of Selenium nanospheres on natural honeycomb sponge. A natural sea sponge was first soaked in 25% sucrose in nanopure water for 15 minutes. The sponge was then submerged in a selenous acid solution (1.4 M) for 25 minutes. After removal of the sponge the remaining solution was stored at room temperature and used later in the synthesis process. The soaked sponge was then carefully removed and dried in a vacuum oven (−2.6 kPa) at 110° C. (Isotemp vacuum oven Model 280A, Thermo Fisher, Scientific, Waltham, Mass.) for 10 minutes. After drying, the sponge was added to a hydroquinone solution (at different concentrations depending on the desired nanosphere size) for 10 minutes. The remaining selenous acid from the previous step was added to the sponge after exposure to hydroquinone. The sponge was then washed with nanopure water to retrieve the selenium nanospheres for further characterization or use.

Nanoparticle characterization. Selenium nanoparticles were recovered from the sponge via washing in water and used for characterization. Smaller particles were drop casted onto silicon wafers directly from solution. Larger particle solutions were centrifuged (14000 rpm for 10 minutes) and suspended in fresh nanopure water prior to drop casting. Scanning electron microscopy (SEM) imaging was performed using JEOL 6500. Dynamic light scattering (DLS) was conducted using a Microtrac NanoFlex particle analyzer to determine the size, zeta potential and polydispersity index of the recovered nanospheres solution. Energy dispersive X-ray analysis (EDXA) and high resolution transmission electron microscopy (HRTEM) were conducted using a FEI Tecnai $G^2$ F30 electron microscope (Thermo Fisher, Scientific, Waltham, Mass.). Samples for TEM imaging were prepared by drop-casting 3 μL sample on a carbon copper grid (Carbon square mesh, CU, 200 mesh from Electron Microscopy Sciences, Hatfield, Pa.). Raman spectroscopy was performed using an Alpha300R confocal Raman microscope (WITec Instruments Corp., Knoxville, Tenn.) with a UHTS300 spectrometer and a DV401 CCD detector with an Omnichrome Argon ion laser with 532 nm excitation and 50 mW output power was used. For Raman sample preparation, nanoparticles were centrifuged at 12,000 rpm for 30 minutes and the pellet was re-suspended in water. Then 20 was drop casted on a Si substrate and dried at room temperature for subsequent analysis.

Nanoparticle filtration. The separation of micrometric SeNS from smaller SeNS (FIG. 24) was performed by membrane filtration. After recovery of SeNS from the sponge via washing in water, solutions were passed through 0.4 μm polycarbonate filter membranes (WHATMAN Nucleopore Track-Etch Membrane) using an extrusion device (Mini-Extruder Set, Avanti Polar Lipids Inc., Alabaster, Ala.).

In this work, a novel method of SeNS synthesis on a porous solid support is presented. Different natural and synthetic sponges with different saccharide coatings have been studied as 3-diemensional supports to host nanoparticle growth. By using a sucrose-coated natural honeycomb sponge, monodisperse selenium nanospheres with a wide size range (0.01 μm to 1 μm) and remarkable yield have been successfully synthesized. In addition, the synthesized SeNS can be harvested whenever needed by washing the sponge in water, without any loss or change in nanoparticle size, zeta potential, or monodispersity. Furthermore, scanning and transmission electron microscopy imaging revealed the growth of SeNS with a number of different mechanisms that have not been previously reported including nanoparticle protuberance and nanoparticle internalization where large particles grow by incorporating smaller ones.

Example 6

At the time of the invention, selective removal of aqueous mercury to levels below 10 nanograms per liter (ng·L$^{-1}$) or part per trillion (ppt) remained an elusive target for public health and environmental agencies. This example shows that new levels of selective mercury removal can be reached using a rapid and cost-effective technology.

A store-bought polyurethane sponge was used as a 3D matrix to grow selenium (Se) nanomaterials on the surface and in the bulk of the sponge fibers. The nanoselenium sponge exhibits a record breaking-mercury ions (Hg$^{2+}$) removal rate, regardless of the pH. The exposure of aqueous solutions containing 10 parts per million (ppm) to 1 parts per billion (ppb) Hg$^{2+}$ to the sponge results in clean water with mercury levels undetectable by the state of the art analytical methods (detection limit<0.2 parts per trillion (ppt)). Such performance is not only far below the acceptable limits in drinking water standards (2 micrograms per liter (μg·L$^{-1}$) or 2 ppb) and industrial effluents (0.2 ppb), but also surpasses the most stringent surface water quality standards (1.3 ppt). The sponge shows unique selectivity towards Hg, does not retain any water nutrients, and can significantly reduce the concentration of zinc, copper and nickel. Furthermore, the sponge shows no cytotoxic effect on mammalian cells while exhibiting strong anti-microbial properties. The high affinity of Hg for Se results in irreversible sequestration of mercury by the sponge, yielding a biologically inert and non-toxic Se—Hg complex. Leaching experiments show no significant desorption, confirming the suitability for landfill disposal.

Growing selenium nanomaterials directly onto and inside a polyurethane sponge by a combined hydrothermal reduction and wet chemical synthesis yields mercury sorbent only overcomes the limitations of the existing selenium nanomaterials at the time of the invention. To evaluate the sponge performance and understand the mode of mercury adsorption, the adsorption kinetics and isotherms were analyzed and the selectivity to mercury and other waterborne elements was investigated. The anti-microbial properties and the ability to sequestrate other water pollutants were also studied. The growth of selenium nanomaterials on the sponge was expected to overcome the need of stabilizing ligands and allow the use of single nanostructures and not aggregates, thus dramatically increasing the surface area for mercury capture. To verify such assumption, growing nanostructures were grown with different shapes and sizes and mercury removal experiments were perfomed. Unexpectedly, the morphology and size of the nanomaterials and thus the surface-to-volume ratio has no significant effect on the performance. This unexpected result was explained by microscopic and spectroscopic analysis of the NanoSe sponge. The analysis revealed that selenium nanomaterials grow not only on the surface of the sponge fibers but also in the bulk material, and that mercury undergoes subsurface and bulk diffusion to interact with both selenium and polyurethane functional groups in the whole material, resulting in remarkable removal kinetics and capacity and irreversible mercury binding. Because of the confusion surrounding the dual health benefits and toxic effects of selenium, the health risk was addressed by studying the cytotoxicity of both the NanoSe sponge and the produced Se—Hg complex, and by ensuring that the sponge presents negligible desorption and leaching risk during use. Standard testing protocols were also used to evaluate the non-hazardous nature of the waste sponge and suitability for landfill disposal.

Results and Discussion

Figure 32:
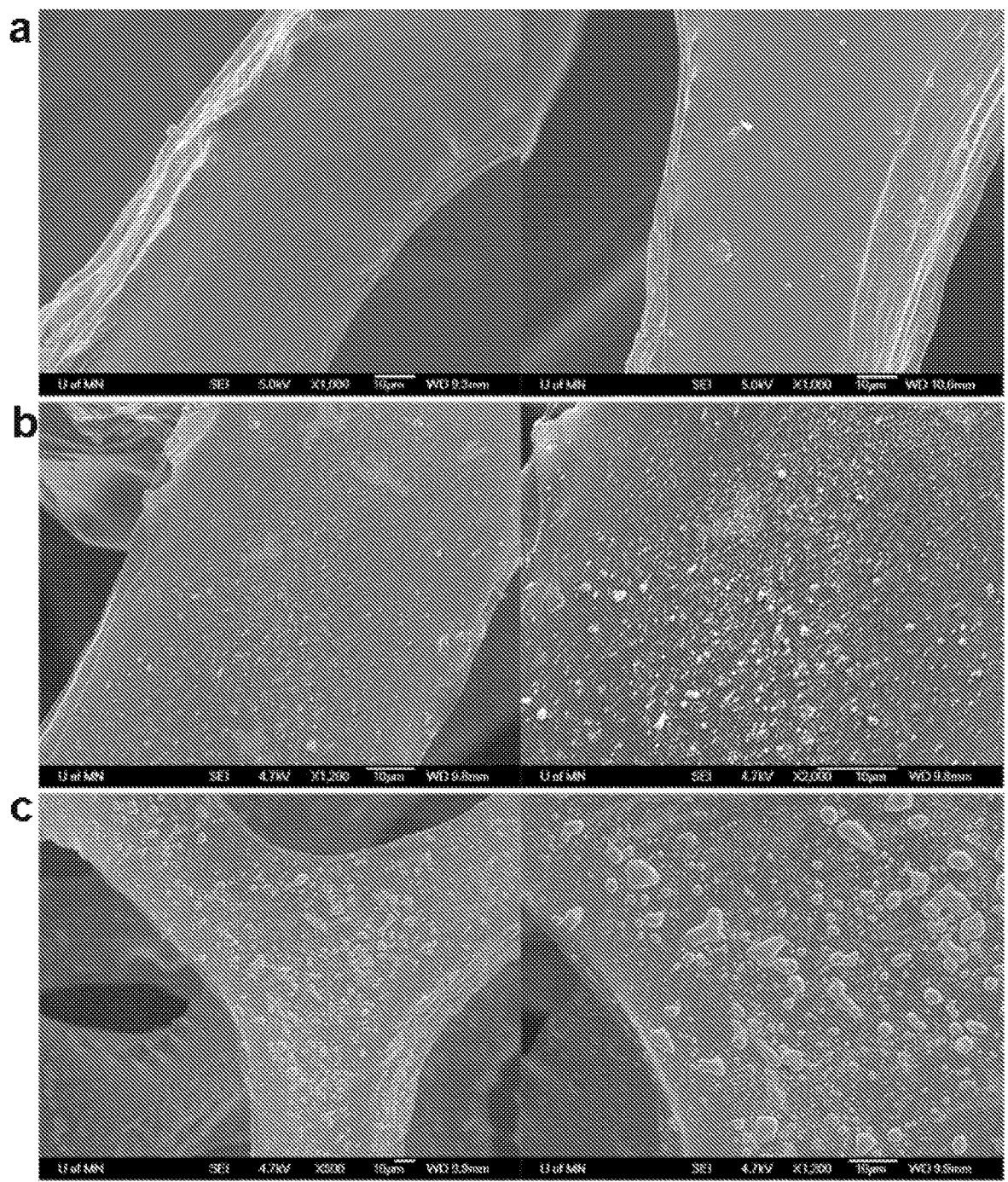
FIG. 32 shows an exemplary polyurethane (PU) sponge (a) before and (b,c) after soaking (dip-coating) in a solution of selenium nanoparticles. Dip coating yields surfaces with inhomogeneous coverage and nanoparticle aggregates.

Initial experiments to coat a sponge with selenium nanoparticles were performed by either soaking the sponge in a pre-synthesized SeNP solution (dip-coating) or immersing the sponge in the growth solution during the synthesis following known protocols (Kumar et al. *Journal of Colloid and Interface Science* 2014, 416:119-123). As expected, the results depicted in FIG. 32 show a poor and inhomogeneous coverage of the sponge by anisotropic selenium nanoparticles and aggregates. Additionally, the nanoparticles exhibit high desorption from the sponge after washing.

Figure 33:
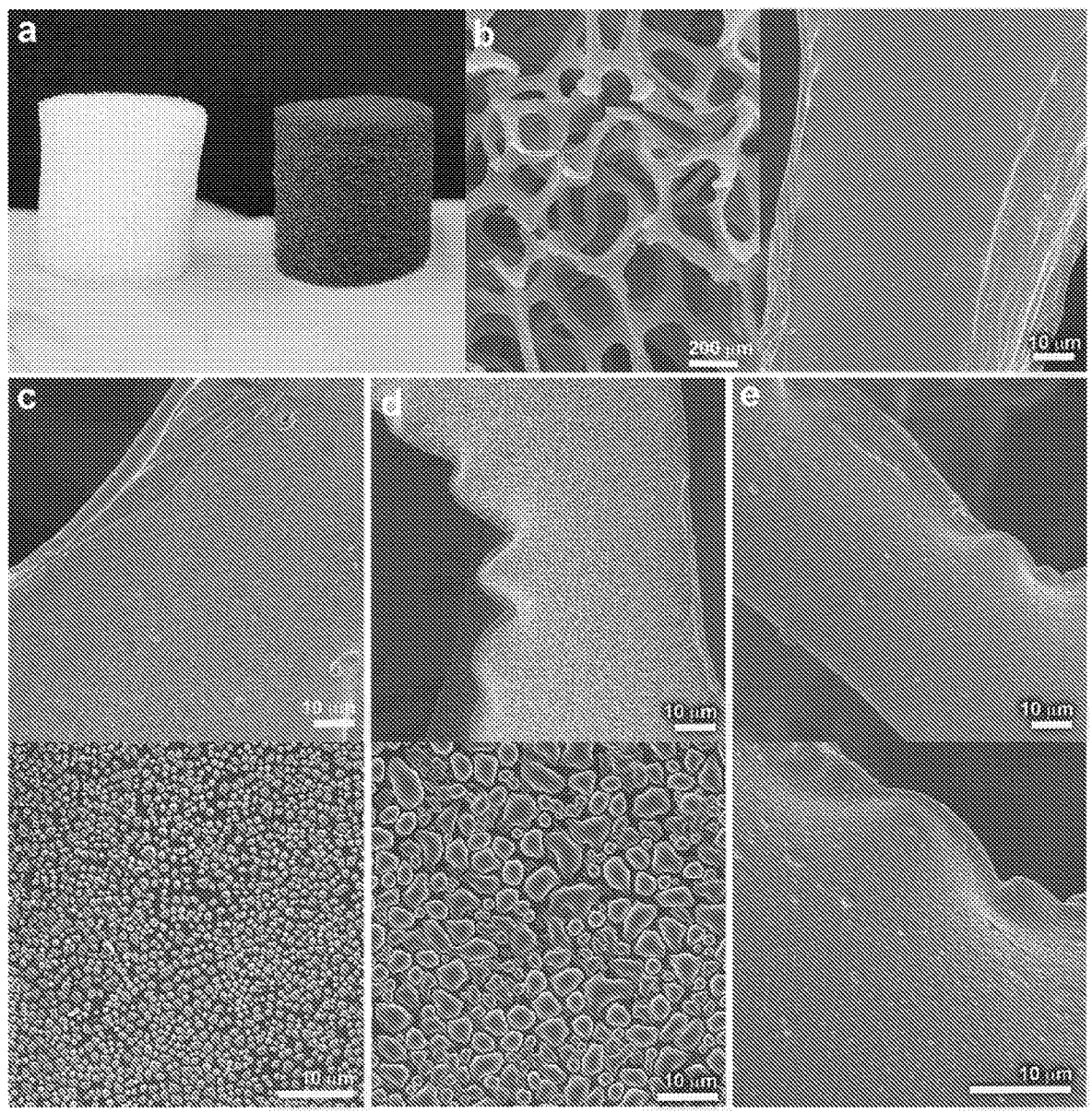
FIG. 33 shows images of polyurethane (PU) and nanoselenium (NanoSe) sponges. (a) Photography of exemplary PU sponges before (white) and after the growth of nanoselenium (brown). (b) SEM image of an exemplary PU sponge. (c-e) SEM images of an exemplary NanoSe sponge. The nanoselenium sponge can contain (c) selenium nanoparticles, (d) selenium nanodomes, (e) or selenium nanofilms.

To avoid these drawbacks, selenium nanostructure was grown directly on the sponge fibers by soaking the sponge in seleneous acid then drying it at 100° C. to allow both water evaporation and adsorption of the selenium atoms on the sponge as well as their thermal reduction to elemental selenium. The growth can be followed or not by a wet chemistry synthesis at 65° C. to generate the desired nanostructures including nanoparticles, nanodomes and nanofilms (FIG. 33). The variety of morphologies obtained is likely due to the fact that both the hydrothermal and wet syntheses occur at temperatures higher than the glass transition temperature of amorphous selenium 31±0.5. At temperatures over 60° C., selenium is in a rubbery state (Su et al. *Journal of Materials Research* 2010, 25(06):1015-1019), and the deformation behavior of amorphous selenium near its glass transition temperature can lead to amorphous domes or thin nanoselenium layers.

Figure 34:
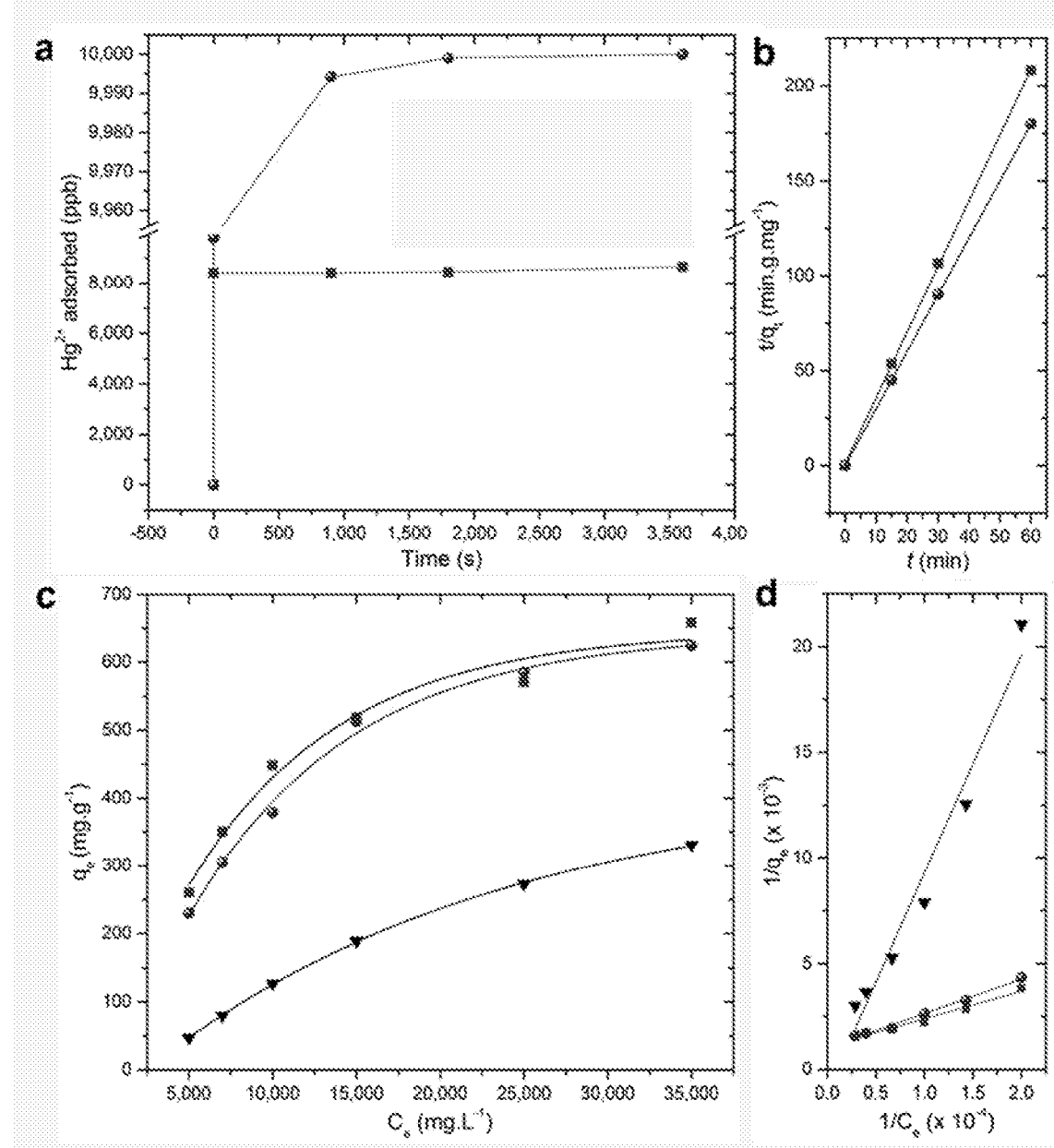
FIG. 34 shows an exemplary adsorption process and kinetics for exemplary PU and NanoSe sponges. a) Adsorption kinetics of $Hg^{2+}$ by PU (squares) and NanoSe sponges (circles) at an initial $Hg^{2+}$ concentration of 10 mg·$L^{-1}$. b) Plots of the pseudo-second order kinetic for $Hg^{2+}$ adsorption. c) Adsorption isotherm of $Hg^{2+}$ for an PU (squares) and a NanoSe sponge with 3% selenium (circles), and a NanoSe sponge with 50% selenium (triangles), and (d) the corresponding linear regression fitted using the Langmuir adsorption model.

Adsorption kinetics and isotherm. One of the major parameters of mercury sorbents is the contact time which largely defines the adequate flow rate for sample cleaning and the subsequent cost of the process. The impact of contact time on Hg$^{2+}$ removal is investigated by immersing the sponge on the mercury solution for a period of time ranging from 1 second to 60 minutes (FIG. 34a, b). The results show that Hg$^{2+}$ adsorption can reach an equilibrium state after 1 second for the PU sponge with a maximum removal rate of around 84%. Within the same time frame (1 second), a NanoSe sponge loaded with 3% w/w selenium removes over 98% of mercury. This rate improves to 99.94% after 15 minutes and reaches 100% (undetectable levels) after 1 hour.

The affinity of the NanoSe sponge for mercury can be evaluated by the distribution coefficient ($K_d$) defined as:

$$K_d = \frac{(C_0 - C_f)}{C_f} \times \frac{V}{m} \qquad \text{(Equation 3)}$$

where $C_0$ is the initial Hg$^{2+}$ concentration, $C_f$ is the final equilibrium Hg$^{2+}$ concentration. Since removal rate for NanoSe sponge is 100%, the concentration of 0.2 ng·L$^{-1}$ was taken as $C_f$ since it represents the limit of detection of the equipment used for mercury detection. V is the volume of the solution in mL, and m is the mass of sorbent in g. While the $K_d$ value for the PU sponge is relatively low (1.33×10$^2$ milliliters per gram (mL·g$^{-1}$)), the value of $K_d$ for NanoSe sponge is 1.67×10$^9$ mL·g$^{-1}$, two orders of magnitude higher than the best values reported for Hg$^{2+}$ sorbents so far (Zhang et al. *Nat. Commun.* 2014, 5:5537). Sorbents with $K_d$ around 10$^7$ mL·g$^{-1}$ are usually considered excellent.

The changes in mercury sorption over time exhibit an excellent fit with the pseudo-second-order kinetic model (Equation 4), with a correlation coefficient of 0.999 and 1 for the PU and the NanoSe sponge respectively (FIG. 34b):

$$\frac{t}{q_t} = \frac{1}{k_2 q_e^2} + \frac{t}{q_e} \quad \text{(Equation 4)}$$

where $q_t$ (milligrams per gram ($mg \cdot g^{-1}$)) is the amount of $Hg^{2+}$ adsorbed at time t (minutes (min)), $k_2$ (grams per milligram per minute ($g \cdot mg^{-1} \cdot min^{-1}$)) is the rate constant of pseudo-second order adsorption, and $q_e$ ($mg \cdot g^{-1}$) is the amount of adsorbed $Hg^{2+}$ at equilibrium. The rate constants were calculated to be respectively 10.96 $g \cdot mg^{-1} \cdot min^{-1}$ and 713.81 $g \cdot mg^{-1} \cdot min^{-1}$. The extremely high constant rate for NanoSe sponge reveals that the adsorption is two orders of magnitude faster than the one obtained with the state of the art mercury sorbents (Zhang et al. *Nat. Commun.* 2014, 5:5537).

Figure 35:
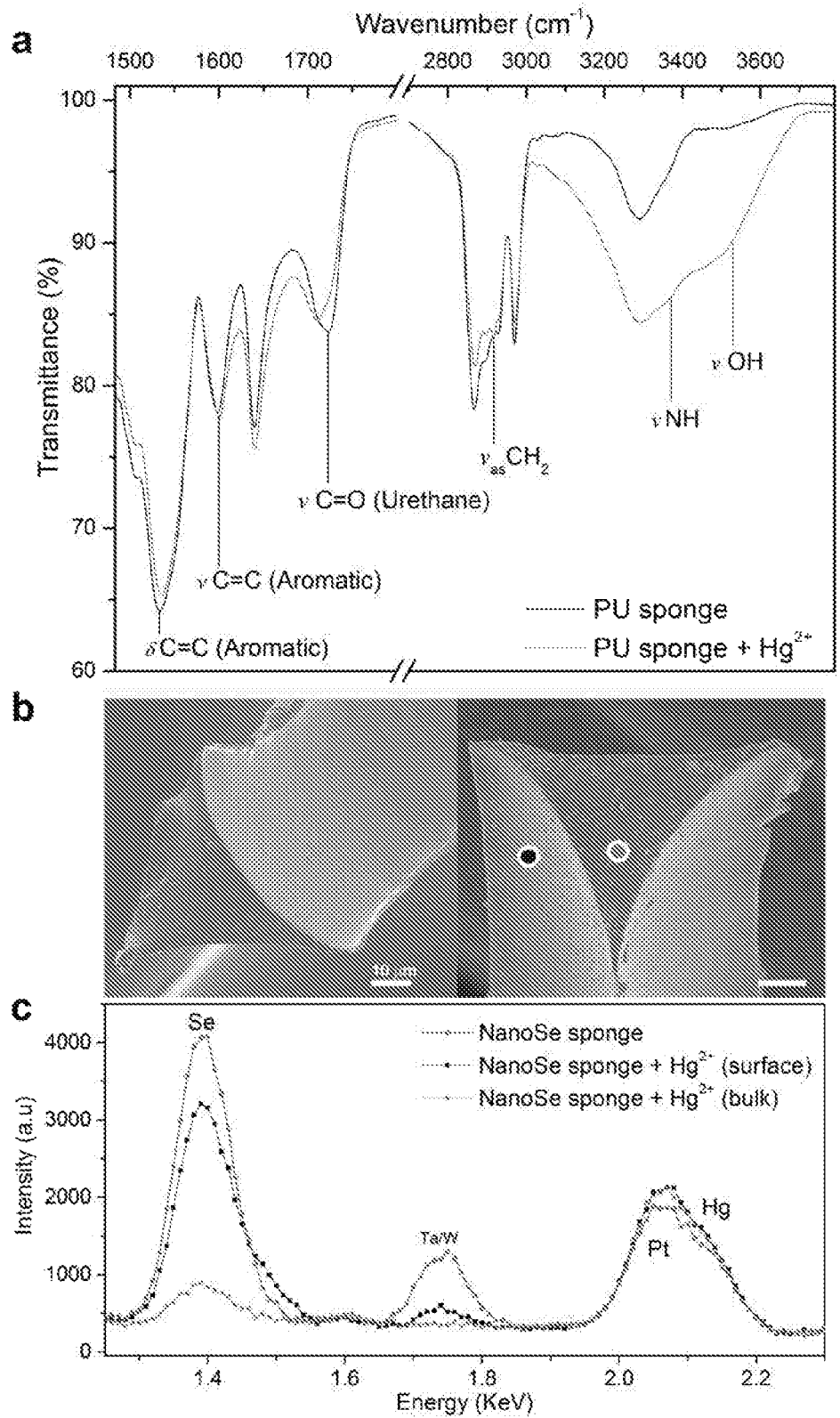
FIG. 35 shows (a) $Hg^{2+}$ binding interactions with the PU and NanoSe sponges. (b) SEM image of a cross-section of the PU and NanoSe sponge fibers. The dots show the localization of the energy-dispersive X-ray spectroscopy analysis (c) FTIR spectra of the PU sponge before and after $Hg^{2+}$ adsorption.

To determine the adsorption process and the sponge uptake capacity for $Hg^{2+}$ ions, adsorption experiments were performed with initial mercury concentrations ranging from 10 ppb to 50 ppm using a PU sponge, a NanoSe sponge loaded with 3% w/w selenium, and a NanoSe sponge loaded with 50% w/w selenium. (FIG. 34c). Linear, Langmuir, Freundlich and BET adsorption isotherm models are used to fit the experimental data of $Hg^{2+}$ adsorption. The adsorption isotherm was found to follow a Langmuir model with a respective correlation coefficient of 0.97, 0.99, and 0.96 for the PU, NanoSe sponge loaded with 3% w/w selenium, and NanoSe sponge loaded with 50% w/w selenium sponges (FIG. 34d). The mercury maximum uptake capacity at equilibrium state was calculated from Equation 5.

$$q_e = \frac{c_i - c_f}{m} \times V \quad \text{(Equation 5)}$$

where $q_e$ is the amount of metal ion adsorbed in gram per gram ($g \cdot g^{-1}$) of adsorbent at equilibrium or maximum uptake capacity, $C_i$ is the initial concentration of $Hg^{2+}$ in the solution (milligrams per liter (mg/L)), $C_f$ is the final concentration of $Hg^{2+}$ in the solution (milligrams per liter ($mg \cdot L^{-1}$)), m is the mass of adsorbent (grams per liter ($g \cdot L^{-1}$)), V is the volume of the solution (L). The maximum uptake capacity ($q_e$) was calculated to be respectively 654 $mg \cdot g^{-1}$ and 624 $mg \cdot g^{-1}$ for the PU and NanoSe sponges, which is higher or similar to the values reported in literature. These numbers reveal two points. The first is that despite the slow adsorption, bare PU sponge exhibits a mercury uptake capacity. FTIR analysis showed that PU captures mercury through interaction with its functional groups, including amine, hydroxyl and carbonyl groups (FIG. 35a). The FTIR spectra also suggest that the aromatic groups are involved in this adsorption possibly through π-interactions. The second observation is that the modification of the size or shape of the selenium nanomaterials did not show any noticeable change in uptake capacity, suggesting that the surface-to-volume ratio does not play a major role in the uptake capacity. These results can be explained by the fact that mercury can undergo subsurface penetration and bulk diffusion to populate internal sites. SEM imaging reveals that selenous acid penetrates inside the PU sponge fibers resulting in internal growth of selenium nanoparticles (FIG. 35b). EDX spectroscopic analysis of a PU fiber cross-section confirmed the presence of selenium inside the material but also revealed the presence of mercury, thus confirming bulk diffusion of both Se and Hg (FIG. 35c). Mercury bulk diffusion can occur inside the PU fibers even when they are coated with a NanoSe thin film.

Figure 36:
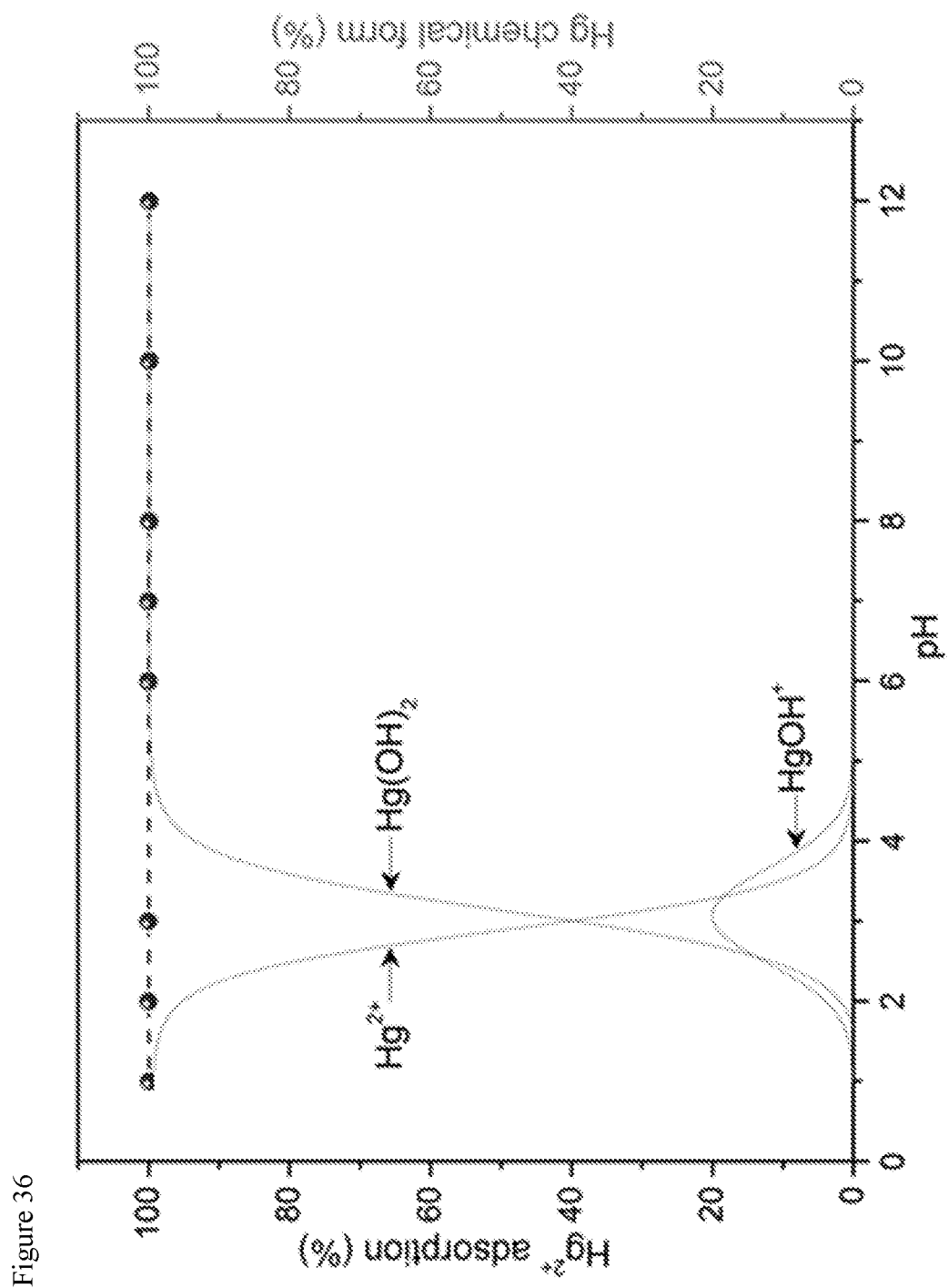
FIG. 36 shows the effect of pH on $Hg^{2+}$ sorption (left axis) for a NanoSe sponge. The continuous lines (right axis) show the distribution of $Hg^{2+}$ chemical species depending on the pH.

The presence of selenium nanomaterials at a concentration of 3% w/w on the PU sponge decreases instead of increasing the uptake capacity (FIG. 34c). To further verify this result, a NanoSe sponge with 50% selenium was produced and tested. As shown in FIG. 34c, the increase in selenium load from 3% w/w to 50% w/w results in a significant drop in the mercury uptake capacity by 50%. Without wishing to be bound by theory, it is believed that the increased selenium concentration results in a significant decrease in the water uptake capacity of the sponge. These results indicate that 3% of selenium in the PU sponge is sufficient to induce extremely fast adsorption of mercury while maintaining high uptake capacity.

pH Stability and selectivity. The implementation of new mercury sorbents to real-world samples such as surface waters, rain water and industrial wastewater requires from the sorbent to be stable in different pH conditions and selective against interfering compounds. The effect of pH on the capture of mercury ions (10 ppm) was investigated over a pH range of 1-12. As showed in FIG. 36, the sponge exhibits optimum performance over the entire pH range. Mercury uptake capacity slightly drops from 100% (undetectable levels) to 99.9% at a pH below 1 or higher than 8. This slight variation is likely caused by the ionic strength and does not seem to have any correlation with $Hg^{2+}$ chemical form in solution.

Figure 37:
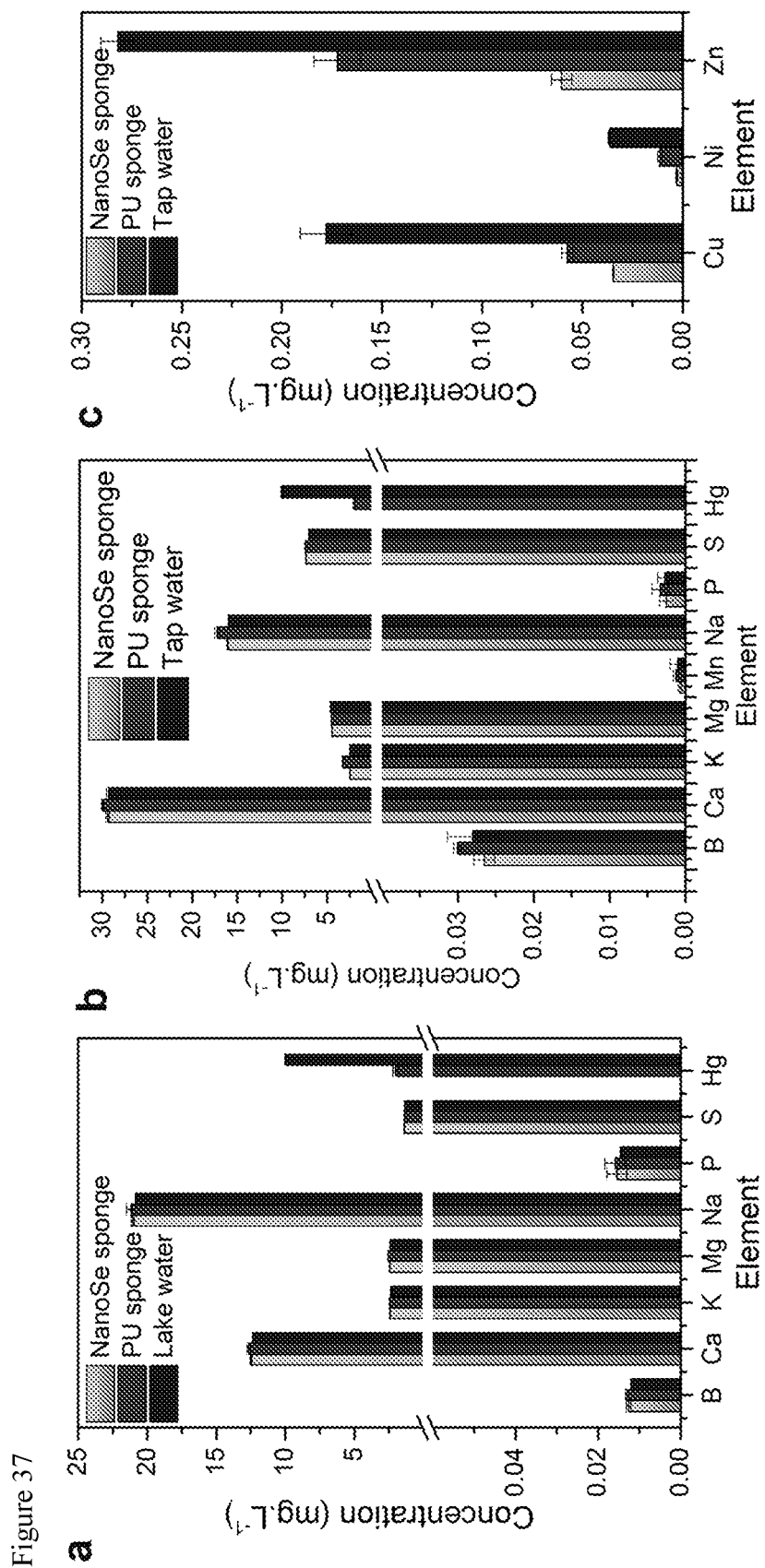
FIG. 37 shows the selectivity of $Hg^{2+}$ adsorption for PU and NanoSe sponges. The same analysis was performed with (a) lake water and (b) drinking water. (c) Adsorption of other metal contaminants (Cu, Ni, Zn) by PU and NanoSe sponges. In all samples, the water was spiked with 10 ppm mercury.

To evaluate the selectivity of the NanoSe sponge and the effect of interfering ions, the content of tap water and lake water was analyzed in terms of 20 different chemical elements before and after exposure to the PU and NanoSe sponge for 60 minutes (FIG. 37). The results show that both sponges did not retain any of the water nutrients including N, P, S, $K^+$, $Mg^{2+}$, $Na^+$ and $Ca^{2+}$, that are important when treating drinking or surface waters. Only three other transition metal pollutants, namely Zn, Cu, and Ni, showed a significant decrease by respectively 78%, 81% and 90% when using the NanoSe sponge. Moreover, the mercury removal capacity of the NanoSe sponge was not affected by the presence of these three elements even at extremely low mercury concentrations.

To further demonstrate the applicability of the NanoSe sponge for mercury sequestration in real samples, tap and lake waters spiked with 5 ppm and 12 ppt mercury were analyzed. Given the ultralow concentration of mercury analyzed, sample collection, storage and analysis followed ultraclean protocol according to the US Environmental Protection Agency (US-EPA) Method 1669. Both samples showed no detectable mercury after treatment with the NanoSe sponge. The results demonstrate not only the ability to clean environmental samples with no pretreatment, but also the ability to capture extremely low concentrations of aqueous mercury, which opens up new avenues in cleaning rain and surface waters.

Cytotoxicity and anti-microbial properties. Antimicrobial properties of selenium are well known and documented. These properties can be of importance when the NanoSe sponge is used in aqueous or humid environments, where biofouling can reduce sponge performance. To assess the antimicrobial activity of the NanoSe sponge, cytotoxicity experiments were performed by either exposing a microbial plate growth to the sponge or immersing the sponge in the microbial growth solution. As showed in FIG. 38a, the NanoSe sponge exhibits strong antifungal properties against *Aspergilus niger* (mold), *Candica guilliermondii* (yeast) and antibacterial properties against *lactobacillus*. The growth of *E. coli* seems to be less affected by the NanoSe sponge.

Figure 38:
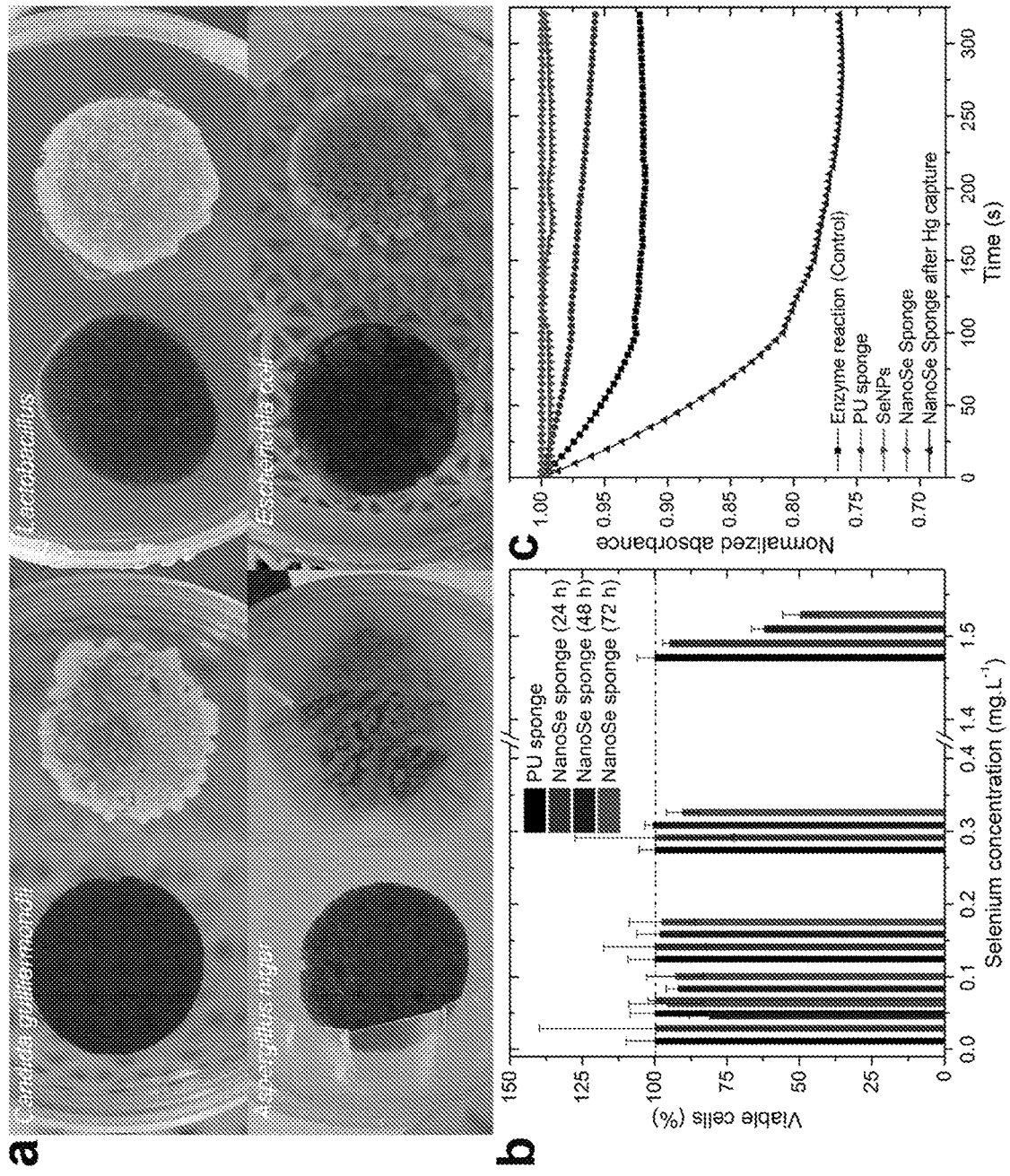
FIG. 38 shows the antimicrobial properties and cytotoxicity of PU (right, blue) and NanoSe (left, brown) sponges. (a) antimicrobial tests using molds (*C. guilliermondi*), yeast (*A. niger*), gram-positive bacteria (*Lactobacillus*) and gram-negative bacteria (*E. coli*). (b) Cytotoxicity of PU and NanoSe sponges on mammalian cells with different exposure times. (c) Effect of the PU and NanoSe sponges, SeNPs, and NanoSe sponge laded with mercury on the catalytic activity of the enzyme glutathione peroxidase.
Figure 39:
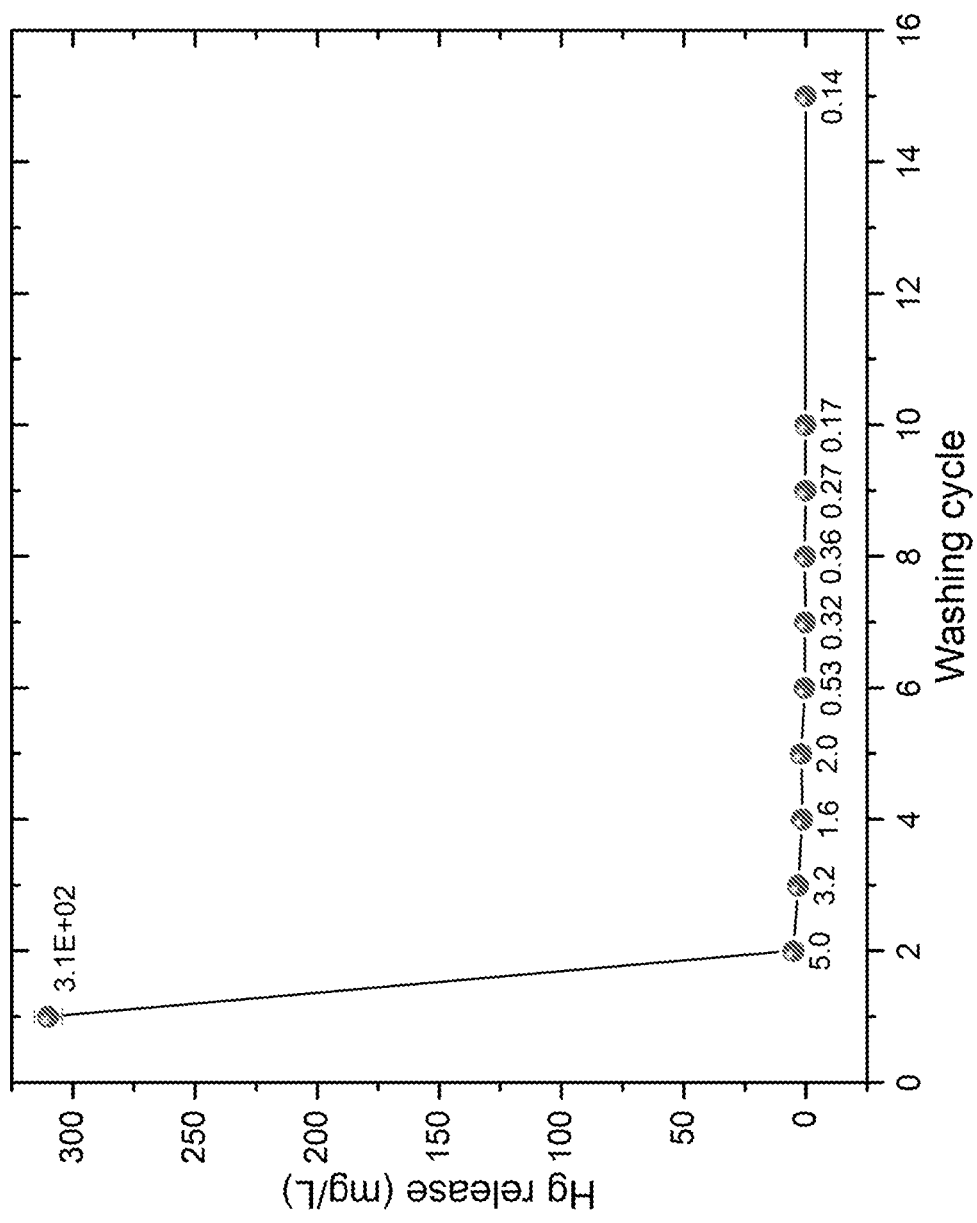
FIG. 39 shows mercury ions released by the sponge after being washed with nanopure water from 1 to 15 times. Each wash included soaking the sponge in nanopure water for a 5 seconds then squeezing it.

The potential use of the sponge to clean surface waters requires the sponge to be biocompatible and have minimum effect on aquatic life. The NanoSe sponge toxicity could be caused by a potential release of selenium. This risk was studied by exposing the sponge to mammalian cells. The sponge was incubated with cell culture media for 24 hours to 72 hours, then different dilutions of the contaminated media were prepared and their effect on mammalian cell growth measured. The diagrams in FIG. 38b show that the sponge has no effect on cell viability when the released selenium concentrations are below 1 mg·L$^{-1}$. A decrease in cell viability becomes noticeable at selenium concentrations of 1.5 mg·L$^{-1}$ after exposure of the cell for 72 hours. These results highlight the importance of washing the sponge after the NanoSe is grown on the material and before the sponge is exposed to mercury. FIG. 39 shows that the sponge can be easily washed to drop the selenium released by the sponge to values below 0.14 mg·L$^-$, far below a toxic concentration.

In addition to the evaluation of the biocompatibility of the NanoSe sponge, the toxicity of the mercury-loaded sponge and, specifically, of the Se—Hg complex was investigated. One of the proven routes of mercury poisoning is the irreversible interaction of mercury with biogeneic selenium-dependant enzymes such as thioredoxin reductase and glutathione peroxidase. FIG. 38c shows different levels of enzyme activity of glutathione peroxidase following an exposure to a PU sponge and to a NanoSe sponge before and after complexation with mercury. The results show that the enzyme activity can be totally inhibited when the enzyme is exposed to selenium nanoparticles (SeNPs) or NanoSe sponge. A PU sponge seems to slow down the reaction but the enzyme remains active. However, when the enzyme is exposed to a NanoSe sponge that was already used to capture 10 ppm of mercury, the enzyme exhibited a remarkable 3-fold increase in activity as compared to the normal enzyme reaction. This unexpected result suggests that not only the complexed Se—Hg present in the sponge is not toxic but that the presence of the sponge may improve the enzyme reaction conditions.

ments conventionally used for sorbent regeneration from mercury, including the use of thiourea, and sodium hydroxide or 12 M hydrochloric acid. These results along with those obtained with the leaching experiments described below suggest the irreversibility of the mercury capture by the NanoSe sponge.

TABLE 5

| Treatment | Starting concentration of Hg | Released Hg |
| --- | --- | --- |
| 12M HCl for 12 hrs on NanoSe sponge | 10 ppm | 0.529 ppm |
| 12M HCl for 12 hrs on PU sponge | 10 ppm | 0.653 ppm |
| 0.25M thiourea, 1M HCl for 1 hr on nSe sponge | 10 ppm | 0 |
| NaOH (pH 12) | 10 ppm | 0.00426 ppm |

To evaluate the non-hazardous nature of the mercury sponge after use, and the suitability for waste disposal, the leaching risk of the sponge waste was assessed using the EPA established protocols. Mercury and selenium extraction from waste sponges were performed using both the Toxicity Characteristic Leaching Procedure (TCLP), used to simulate sanitary landfill conditions, and the Synthetic Precipitation Leaching Procedure (SPLP), used to evaluate the leaching potential of land-disposed wastes under acid rainfall. Table 6 shows that a sponge loaded with 10 ppm mercury released only 2±0.2 ppb mercury with both TCLP and SPLP, far below the EPA regulatory limits for waste disposal (Maximum Concentration of Contaminants for Toxicity Characteristic) of 200 ppb. Since the same sponge was loaded with 5±0.5 mg selenium, the leaching experiment was also performed on selenium. Table 6 show a release of 0.5 ppm, below the EPA limit of 1 ppm. Similar results were obtained for the PU sponge without selenium, indicating that the NanoSe sponge is non-hazardous and can be disposed by landfilling.

TABLE 6

| Treatment | Starting concentration of Hg | Starting concentration of Selenium (mg) | Released Hg | Released Selenium | EPA limits for environment release |
| --- | --- | --- | --- | --- | --- |
| TCLP on NanoSe sponge | 10 ppm | 5.45 | 2.29 ppb | | Hg 200 ppb Se 1 ppm |
| TCLP on PU sponge | 10 ppm | NA | 7.95 ppb | NA | Hg 200 ppb Se 1 ppm |
| SPLP on NanoSe sponge | 10 ppm | 4.28 | 1.80 ppb | | Hg 200 ppb Se 1 ppm |
| SPLP on PU sponge | 10 ppm | NA | 7.13 ppb | NA | Hg 200 ppb Se 1 ppm |

Sorbent Regeneration, Leaching and disposal. Potential issues for newly developed sorbents include their suitability for regeneration or disposal—potentially significant factors in determining the final cost of the technology and meeting regulatory requirements. Table 5 shows that that the NanoSe sponge releases only from 0% to 6% of the adsorbed mercury (10 ppm) when exposed to harsh chemical treat- Materials and Methods All chemicals including selenous acid (98%), sucrose (>99.5%), hydroquinone (99%), tryptic soy broth, tryptic soy agar, yeast mold (YM) broth, YM agar, glutathione peroxidase, nicotinamide adenine dinucleotide phosphate (NADPH), glutathione, sodium azide, hydrogen peroxide, glutathione reductase, buffers were purchased from Sigma Aldrich (St. Louis, Mo., USA). Polyurethane sponges were die cut from high density upholstery foam (FOAMTOUCH). All aqueous solutions were prepared in nanopure water. The mercury analyses were done using an atomic absorption spectrometer (ThermoFischer Scientific iCE 3300, LOD 0.2 ppb). Mercury samples were also sent to the University of Minnesota Research Analytical Lab and analyzed using a cold vapor atomic adsorption on a Tekran 2600 (Tekran Instruments Corporation, limit of detection: 0.2 ppt). All mercury analyses referred to in this report are total mercury analyses. Finally, cytotoxicity experiments were performed at the University of Minnesota Institute for Therapeutics Discovery and Development.

Characterization of polyurethane sponge. The polyurethane sponge was characterized using scanning electron microscopy coupled with energy dispersive x-ray analysis (EDXA) (JEOL 6500, 6700 SEM), Fourier transform infrared spectroscopy (Nicollet Series II Magna IR-System FTIR) and Raman scattering using a Alpha300R confocal Raman microscope (WITec Instruments Corp., Knoxville, Tenn.) and DV401 CCD detector (using a wavelength of 514 nm). Average surface roughness and microscopic contact angle were measured using a KLA-Tencor P-7 and an MCA-3 (Kyowa Interface Science Co., Japan), respectively. Absorption capacity was estimated via water uptake in sponges of uniform size.

Synthesis of Selenium nanoparticles on polyurethane sponge. The polyurethane sponge was first soaked in 25% sucrose in nanopure water for 15 minutes. The sponge was then submerged in a selenous acid solution (1.4 M) for 30 minutes. After removal of the sponge the remaining solution was stored at room temperature and used later in the synthesis process. The soaked sponge was then carefully removed without squeezing and left in an oven at 100° C. (Model SGO1E, Shel Lab, Cornelius, Oreg.) for 2 minutes. After this brief incubation, the sponge was added to a hydroquinone solution (2.2 M) for 5 minutes. The remaining selenous acid from the previous step was added to the sponge after exposure to hydroquinone at 65° C. The sponge was then quenched in an ice bath for 1 hour and washed with nanopure water to remove excess solution.

Cytotoxicity experiment. Supplemented fibroblast growth medium-2 (FGM-2) media (500 mL, Lonza, Walkersville, Md.) was incubated with a nanoselenium (nSe or NanoSe) sponge, a PU sponge without particles (control sponge), and free selenium nanoparticles (SeNP) alone at 4° C. Each culture was performed in duplicate making a total of 9 media preparations including a control consisting of plain medium. Aliquots (10 mL) were removed from each of the 9 media preps at 12 hours, 24 hours, 36 hours and 48 hours and frozen at −20° C. until use. Normal adult human dermal fibroblasts (Lonza) were cultured in supplemented FGM-2 media according to supplier's instructions in T-75 flasks at 37° C., 5% $CO_2$. The adherent cells were trypsinized (0.25%) free and washed with FGM-2 medium. Cells ($5\times10^3$) were plated into each well (0.1 mL total volume) of a 96-well plate and returned to 37° C., 5% $CO_2$ for 24 hours. After 24 hours, the culture medium was removed from each well and replaced with 0.1 mL of fresh FGM-2. Aliquots from the 9 media preps taken at 48 hours were thawed and then added to appropriate wells (0.2 mL total volume) to final dilutions of ½ (0.5), ¼ (0.25), ⅛ (0.125) and 1/16 (0.083). The plate was then returned to 37° C., 5% $CO_2$, for an additional 24 hours. After the additional 24 hours, 0.015 mL 3-(4,5-dimethylthiazol-2-yl)-2,5-diphenyltetrazolium bromide (MTT) dye (CELLTITER 96 Non-Radioactive Cell Proliferation Assay, Promega, Madison, Wis.) was added to each well and the plate was incubated at 37° C., 5% $CO_2$. After 1 hour, 0.1 mL stop solution was added to each well and the plate was returned to 37° C., 5% $CO_2$ for an additional 1 hour. The plate was then read in a Molecular Dynamics SpectraMax multi-mode spectrophotometer at 538 nm.

Absorbance units read by the SpectraMax correlate with the number of viable cells present. MTT is reduced by NADPH-dependent oxidoreductase enzymes largely in the cytosolic compartment of the cells and results in the formation of formazan (purple precipitate). Therefore, reduction of MTT and other tetrazolium dyes depends on the cellular metabolic activity due to NADPH flux.

Effect of Contact Time-Adsorption kinetics. An adsorption kinetics experiment was conducted in order to estimate the time required to reach the steady state for the efficient removal of Hg by the nSe sponge. The concentration of Hg used in the experiment was 10 ppm (10 mg/L). Contact times between the sponge and the solution of 1, 5, 30, 60, 180, 300, 900, 1800 and 3600 seconds were used in this experiment.

Antimicrobial Experiment. The antimicrobial experiments were conducted following the ASTM D2020 protocol. Briefly, spores were harvested from one yeast species (*Candida guilliermondii*) and one mold (*Aspergillus niger*) and $\sim10^4$ spores were plated on separate potato dextrose agar (PDA) plates. Next, 0.5 cm-thick disks were cut from both the nSe and control sponge and autoclaved. Under aseptic conditions the discs were transferred to the plates and incubated at the ideal conditions for each species. Specifically, for *Candida guilliermondii* the plates were incubated at 25° C. for 3 days and for *Aspergillus niger* the plates were incubated for 5 days at 24° C. Similarly, gram negative bacteria (*E. coli* spp) and gram positive bacteria (*Lactobacillus* spp) were diluted to a concentration of $10^5$ cells and spread on tryptic soy agar (TSA) plates and MRS agar plates respectively. Again, 0.5 cm disks were taken from the nSe sponge and were transferred to the plates. The plates were then incubated at 37° C. for 24 hours (*E. coli* spp) and 72 hours (*Lactobacillus* spp).

Effect of pH of Hg Adsorption. The effect of pH on Hg adsorption by the nSe sponge was studied. For the experiment a 10 ppm (10 mg/L) Hg solution was prepared from a stock solution of 1000 mg/L (AAHG-1, Inorganic Ventures, Christiansburg, Va.). The pH was adjusted using an Accumet AB150 pH meter in a range from 1-8, 10, and 12. Serial dilutions of 50 mL were used to ensure minimal error while preparing dilutions. After preparation of the mercury solution, the pH was adjusted with sodium hydroxide and hydrochloric acid. Sponges were treated in a similar manner described above in the adsorption kinetics experiment with a contact time of 1 minute.

Adsorption isotherm. To study the adsorption behavior of Hg on the adsorbent, a range of concentrations of Hg (1 mg/L to 50 mg/L) was used. The Langmuir adsorption isotherm model was used to fit the experimental data of $Hg^{2+}$ sorption onto nSe sponge. The mercury solutions were again prepared from the stock solution and the pH was adjusted to 6. Then, 75 mg of the nSe or control sponge was put in a vial with 10 mL of the mercury solution. The vials were placed in a rotator (Thermo Scientific Tube Revolver) and mixed for 18 hours at 40 rpm. The samples were then analyzed for mercury as described above.

Selectivity. To study the uptake behavior of Hg of the adsorbent in the presence of other interfering elements, a selectivity experiment was performed. Copper, nickel and zinc are known to be adsorbed by the selenium. Both nSe and control sponges were treated with 10 ppm of $CuCl_2$, $Ni(SO_3)_2$ and $Zn(SO_3)_2$ separately following a similar procedure describe above with a contact time of 5 minutes. Next, sponges were treated a combination of these salts and 10 ppm Hg to assess competitive element capture (5 minutes contact time).

Application on real samples (lake and tap waters). To test the efficiency of the nSe sponge on real world samples, lake water samples were taken from Como Lake (St. Paul, Minn., USA) following the United States Environmental Protection Agency (EPA) Method 1669. For the sampling, 40 mL VOA EPA certified vials were used. The samples were preserved with 6M HCl prior to analysis. After collection, lake water and tap water samples were spiked with 12 ppt and 5 ppm of Hg. The spiked solutions were treated with nSe sponge and control sponge with a contact time of 1 minute. The samples were then measured for trace Hg.

Toxicity of the Se—Hg complex: enzyme activity experiment. The sample sponge was treated with Hg. The activity of glutathione peroxidase (GPx) was analyzed according to the protocol of Esworthy et al., Current Protocols in Toxicology. Wiley, USA. 7.1.1-7.1.32; 1999. Thus, 100 µL of 50 U/mL GPx were mixed with 630 µL sodium phosphate buffer (50 mM, pH 7.0), 100 uL glutathione (GSH) (10 mM), 100 µL NADPH (2 mM), 10 µL sodium azide (1.125 mM), and 10 µL of glutathione reductase (GR) (100 U/mL). The well-mixed enzyme solution was then added to the sponge for a total contact time of 2 minutes. Upon liquid sample collection, 50 µL of 5 mM $H_2O_2$ was added as the substrate. The decrease in NADPH was measured using a UV spectrophotometer (Shimadzu UV-1800) at 340 nm for 7.5 minutes and was used to study GPx activity. Control experiments include untreated nSe sponges and polyurethane sponges without Se or Hg. The enzyme assay was also tested against a free Hg solution (10 ppm) and as well as free selenium nanoparticles (SeNP).

Leaching Experiment. To model the effect of Hg treated sponges in municipal waste systems, EPA methods 1311 and 1312 were used. Method 1311, the Toxicity Characteristic Leaching Protocol (TCLP), models the leaching behavior of a particular waste material. Briefly, Hg treated sponges were cut into small pieces with a diameter less the 1 mm and placed in an extraction fluid consisting of glacial acetic acid and sodium hydroxide (pH 4.93). This solution was rotated end over end on a rotator (Thermo Scientific Tube Revolver) at 30 rpm for 18 hours. Next, method 1312, the Synthetic Precipitation Leaching Procedure (SPLP), models leaching characteristics of a waste material in the natural environment. Again, Hg treated sponges were cut into small pieces, added to an extraction fluid (60/40 weight percent sulfuric and nitric acids with pH 4.20) and then rotated for 18 hours at 30 rpm. After the 18 hour treatment, all extract solutions were separated from the sponge pieces, acidified to a pH<2 with nitric acid and analyzed for Hg.

Mercury Regeneration. In order to assess the recyclability and/or reusability of the sponges, Hg treated sponges were treated with a variety of regeneration agents. Control and Hg treated sponges (10 ppm) were treated for 1 hour in a glass beaker with a 10 mL mixture of 0.25 M thiourea and 1 M hydrochloric acid. Additionally, regeneration was assessed under acidic (10 mL 12 M HCl) and basic conditions (10 mL NaOH, pH 12).

Example 7

To use the methods described herein for mercury capture in flue gas such as emissions from coal-fired plants, selenium nanomaterials were grown on activated carbon (AC) pellets and AC scrubbers/filters.

Briefly, AC pellets or an AC filter (the material) was first soaked in 25% sucrose in nanopure water for 15 minutes. The material was then submerged in a selenous acid solution (1.4 M) for 25 minutes. After removal of the material the remaining solution was stored at room temperature and used later in the synthesis process. The soaked material was then carefully removed and dried in a vacuum oven (−2.6 kPa) at 110° C. (Isotemp vacuum oven Model 280A, Thermo Fisher, Scientific, Waltham, Mass.) for 10 min. After drying, the material was added to a hydroquinone solution (0.7 M) for 10 minutes at 65° C. The remaining selenous acid from the previous step was added to the material after exposure to hydroquinone. The material was then washed with nanopure water.

Figure 40:
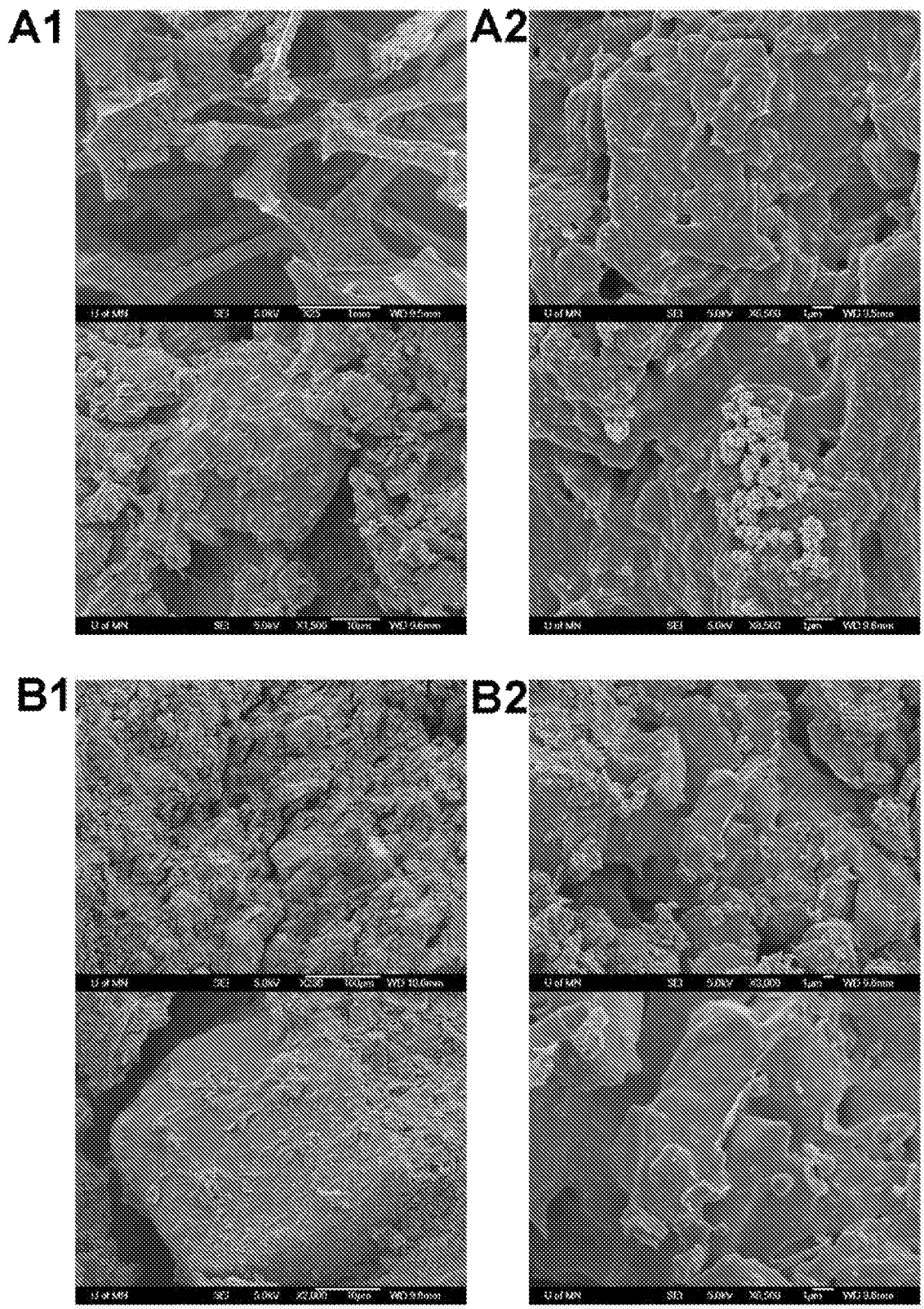
FIG. 40 shows growth of selenium nanomaterials on exemplary activated carbon materials. SEM images of activated carbon filter before (A1) and after (A2) growth of nanoselenium. The image depicts the successful growth of selenium nanoparticles and selenium nanofilms. SEM images of activated carbon pellets before (B1) and after (B2) growth of nanoselenium. The images in B1 and B2 were obtained from a cross section of the activated carbon pellet, indicating that nanoselenium grows also inside the pellet bulk material.

The SEM images of FIG. 40 show the successful growth of selenium nanospheres and nanofilms on these two supports (AC pellets and AC filters). The images were obtained after thorough washing of the materials showing that the selenium nanomaterials are strongly attached to the supports. The images in FIG. 40B1 and FIG. 40B2 show that the selenium nanomaterials also grow inside the bulk material of the AC pellet.

The complete disclosure of all patents, patent applications, and publications, and electronically available material (e.g., GenBank amino acid and nucleotide sequence submissions; and protein data bank (pdb) submissions) cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a selenium nanomaterial comprising:
    forming a saccharide coating on a surface of and within a solid porous support material,
    treating the solid porous support material having the saccharide coating on the surface of and within the solid porous support material with a selenous acid solution, and
    heating the solid porous support material to form the selenium nanomaterial on the surface of and within the solid porous support material.

2. The method of claim 1 wherein the surface comprises a sponge, a film, a fabric, a non-woven material, or a metal-organic framework (MOF), or a combination thereof.

3. The method of claim 2 wherein the sponge comprises a hydrophilic surface, a polyamide, a polyurethane, or fibers having a diameter in a range of 10 µm to 30 µm, or a combination thereof.

4. The method of claim 1 wherein the surface comprises activated carbon.

5. The method of claim 1 wherein the surface has a water contact angle of less than 90 degrees.

6. The method of claim 1 wherein the saccharide comprises a monosaccharide, a disaccharide, or a polysaccharide, or a combination thereof.

7. The method of claim 6 wherein the saccharide comprises sucrose, or fructose, or a combination thereof.

8. A method of preparing a selenium nanomaterial comprising:
    combining an aqueous solution of selenous acid with an aqueous solution of a reducing agent in the presence of a solid porous support material under conditions effective to form the selenium nanomaterial on a surface of the solid porous support material and within the solid porous support material.

9. The method of claim 8 wherein the surface comprises a saccharide-treated material, and wherein the saccharide comprises a monosaccharide, a disaccharide, or a polysaccharide, or a combination thereof.

10. The method of claim 9 wherein the saccharide comprises sucrose, or fructose, or a combination thereof.

11. The method of claim 8 wherein the method comprises forming a saccharide coating on the surface of the solid porous support material.

12. The method of claim 8 wherein the surface comprises a sponge, a film, a fabric, a non-woven material, or a metal-organic framework (MOF), or a combination thereof.

13. The method of claim 12 wherein the sponge comprises a hydrophilic surface, a polyamide, a polyurethane, or fibers having a diameter in a range of 10 μm to 30 μm, or a combination thereof.

14. The method of claim 8 wherein the surface comprises activated carbon.

15. The method of claim 8, wherein the surface has a water contact angle of less than 90 degrees.

* * * * *